United States Patent
Sriram et al.

(10) Patent No.: US 11,941,887 B2
(45) Date of Patent: Mar. 26, 2024

(54) SCENARIO RECREATION THROUGH OBJECT DETECTION AND 3D VISUALIZATION IN A MULTI-SENSOR ENVIRONMENT

(71) Applicant: NVIDIA Corporation, Santa Clara, CA (US)

(72) Inventors: Parthasarathy Sriram, Los Altos, CA (US); Ratnesh Kumar, Campbell, CA (US); Farzin Aghdasi, East Palo Alto, CA (US); Arman Toorians, San Jose, CA (US); Milind Naphade, Cupertino, CA (US); Sujit Biswas, San Jose, CA (US); Vinay Kolar, Cupertino, CA (US); Bhanu Pisupati, Santa Clara, CA (US); Aaron Bartholomew, San Francisco, CA (US)

(73) Assignee: NVIDIA Corporation, Santa Clara, CA (US)

( * ) Notice: Subject to any disclaimer, the term of this patent is extended or adjusted under 35 U.S.C. 154(b) by 0 days.

(21) Appl. No.: 17/943,489

(22) Filed: Sep. 13, 2022

(65) Prior Publication Data

US 2023/0016568 A1    Jan. 19, 2023

Related U.S. Application Data

(63) Continuation of application No. 16/896,431, filed on Jun. 9, 2020, now Pat. No. 11,443,555, which is a
(Continued)

(51) Int. Cl.
*G06V 40/20* (2022.01)
*G06F 18/231* (2023.01)
(Continued)

(52) U.S. Cl.
CPC ............ *G06V 20/54* (2022.01); *G06F 18/231* (2023.01); *G06F 18/24143* (2023.01);
(Continued)

(58) Field of Classification Search
CPC ........... G06K 9/00335; G06K 9/00771; G06K 9/00785; G06K 9/00825; G06K 9/209;
(Continued)

(56) References Cited

U.S. PATENT DOCUMENTS

| 8,284,258 B1 | 10/2012 | Cetin et al. |
| 9,235,766 B2 | 1/2016 | Li et al. |

(Continued)

FOREIGN PATENT DOCUMENTS

WO    2019070535 A1    4/2019

OTHER PUBLICATIONS

"Mean Shift" [online]. Wikipedia, 2023 [retrieved on Aug. 3, 2023]. Retrieved from the Internet: <URL: https://en.wikipedia.org/wiki/Mean_shift> (5 pages) (Year: 2023).*

(Continued)

*Primary Examiner* — David F Dunphy
(74) *Attorney, Agent, or Firm* — Taylor English Duma L.L.P.

(57) ABSTRACT

The present disclosure provides various approaches for smart area monitoring suitable for parking garages or other areas. These approaches may include ROI-based occupancy detection to determine whether particular parking spots are occupied by leveraging image data from image sensors, such as cameras. These approaches may also include multi-sensor object tracking using multiple sensors that are distributed across an area that leverage both image data and spatial information regarding the area, to provide precise object tracking across the sensors. Further approaches relate to various architectures and configurations for smart area
(Continued)

monitoring systems, as well as visualization and processing techniques. For example, as opposed to presenting video of an area captured by cameras, 3D renderings may be generated and played from metadata extracted from sensors around the area.

20 Claims, 18 Drawing Sheets

Related U.S. Application Data continuation of application No. 16/365,581, filed on Mar. 26, 2019, now Pat. No. 11,182,598.

(60) Provisional application No. 62/648,339, filed on Mar. 26, 2018.

(51) Int. Cl.

| | |
|---|---|
| *G06F 18/2413* | (2023.01) |
| *G06T 7/246* | (2017.01) |
| *G06T 7/292* | (2017.01) |
| *G06T 7/70* | (2017.01) |
| *G06T 7/73* | (2017.01) |
| *G06V 10/147* | (2022.01) |
| *G06V 10/20* | (2022.01) |
| *G06V 10/25* | (2022.01) |
| *G06V 10/762* | (2022.01) |
| *G06V 10/764* | (2022.01) |
| *G06V 10/82* | (2022.01) |
| *G06V 20/52* | (2022.01) |
| *G06V 20/54* | (2022.01) |
| *G06V 20/58* | (2022.01) |
| *H04N 5/247* | (2006.01) |
| *H04N 23/90* | (2023.01) |
| *G06V 20/62* | (2022.01) |

(52) U.S. Cl.
CPC .............. *G06T 7/246* (2017.01); *G06T 7/292* (2017.01); *G06T 7/70* (2017.01); *G06T 7/73* (2017.01); *G06V 10/147* (2022.01); *G06V 10/25* (2022.01); *G06V 10/255* (2022.01); *G06V 10/7625* (2022.01); *G06V 10/764* (2022.01); *G06V 10/82* (2022.01); *G06V 20/52* (2022.01); *G06V 20/584* (2022.01); *G06V 40/20* (2022.01); *H04N 23/90* (2023.01); *G06T 2207/10016* (2013.01); *G06T 2207/20081* (2013.01); *G06T 2207/30201* (2013.01); *G06T 2207/30232* (2013.01); *G06T 2207/30241* (2013.01); *G06T 2207/30264* (2013.01); *G06V 20/625* (2022.01); *G06V 2201/08* (2022.01)

(58) Field of Classification Search
CPC .. G06K 9/3241; G06K 9/6219; G06K 9/6274; G06K 2209/15; G06K 2209/23; G06T 7/292; G06T 7/246; G06T 7/73; G06T 7/70; G06T 2207/10016; G06T 2207/20081; G06T 2207/30201; G06T 2207/30232; G06T 2207/30241; G06T 2207/30264; H04N 5/247
See application file for complete search history.

(56) References Cited

U.S. PATENT DOCUMENTS

| | | | |
|---|---|---|---|
| 9,623,905 B2 | 4/2017 | Shashua et al. | |
| 10,365,658 B2 | 7/2019 | Fridman | |
| 10,824,909 B2 | 11/2020 | Ros Sanchez et al. | |
| 10,996,069 B2 | 5/2021 | Qiao et al. | |
| 11,104,269 B2 | 8/2021 | Karol | |
| 11,216,888 B2 | 1/2022 | Perl et al. | |
| 11,443,555 B2 | 9/2022 | Sriram et al. | |
| 2014/0132786 A1 | 5/2014 | Saitwal et al. | |
| 2015/0086071 A1 | 3/2015 | Wu et al. | |
| 2015/0131851 A1 | 5/2015 | Bernal et al. | |
| 2016/0125621 A1 | 5/2016 | Saitwal et al. | |
| 2016/0275801 A1 | 9/2016 | Kopardekar | |
| 2016/0307047 A1* | 10/2016 | Krishnamoorthy | .......................... G06Q 30/0185 |
| 2017/0256165 A1 | 9/2017 | Pennington et al. | |
| 2018/0096595 A1 | 4/2018 | Janzen et al. | |
| 2018/0134215 A1 | 5/2018 | Kim et al. | |
| 2018/0232583 A1* | 8/2018 | Wang | ..................... G06V 10/82 |
| 2018/0232584 A1 | 8/2018 | Pathangay et al. | |
| 2019/0034794 A1 | 1/2019 | Ogale et al. | |
| 2019/0101924 A1 | 4/2019 | Styler et al. | |
| 2019/0147368 A1* | 5/2019 | Pinel | ..................... G06N 5/022 706/12 |
| 2020/0169662 A1 | 5/2020 | Watanabe et al. | |

OTHER PUBLICATIONS

Non-Final Office Action dated Aug. 13, 2021 in U.S. Appl. No. 16/363,869, 25 pgs.
Pawar, K., and Attar, V., "Deep learning based detection and localization of raod accidents from traffic surveillance videos", Science Direct, pp. 1-9 (Nov. 7, 2021).
Final Office Action dated Dec. 7, 2021 in U.S. Appl. No. 16/363,869, 30 pgs.
Notice of Allowance dated Feb. 24, 2022 in U.S. Appl. No. 16/363,869, 12 pgs.
Fernando, T., et al., "Soft+ hardwired attention: An LSTM Framework for Human Trajectory Prediction and Abnormal Event Detection", Cornell University Library, pp. 1-25 (2017).
Ling, X., et al., "Identifying parking spaces & detecting occupancy using vision-based IoT devices", IEEE, pp. 1-6 (2017).
Masmoudi, I., et al., "Multi agent parking lots modelling for anomalies detection while parking", IET Computer Vision, pp. 407-414 (2016).
Xue, H., et al., "Bi-prediction: Pedestrian Trajectory Prediction Based on Bidirectional LSTM classification", IEEE, pp. 1-8 (2017).
Restriction requirement dated Jul. 21, 2020 in U.S. Appl. No. 16/365,581, 5 pages.
Preinterview First Office Action dated Aug. 28, 2020 in U.S. Appl. No. 16/365,581, 12 pgs.
Restriction requirement dated Sep. 17, 2020 in U.S. Appl. No. 16/363,869, 6 pgs.
International Preliminary Report on Patentability received for PCT Application No. PCT/US2019/024145, dated Oct. 8, 2020, 13 pgs.
First Action Interview Office Action dated Oct. 26, 2020 in U.S. Appl. No. 16/365,581, 11 pgs.
Non Final Office Action dated Dec. 18, 2020 in U.S. Appl. No. 16/363,869, 16 pgs.
Final Office Action dated Apr. 14, 2021 in U.S. Appl. No. 16/363,869, 21 pgs.
Notice of Allowance dated Jul. 13, 2021 in U.S. Appl. No. 16/365,581, 7 pgs.
Notice of Allowance dated Sep. 16, 2021 in U.S. Appl. No. 16/365,581, 2 pgs.
Notice of Allowance dated Oct. 20, 2021 in U.S. Appl. No. 16/365,581, 2 pgs.

* cited by examiner

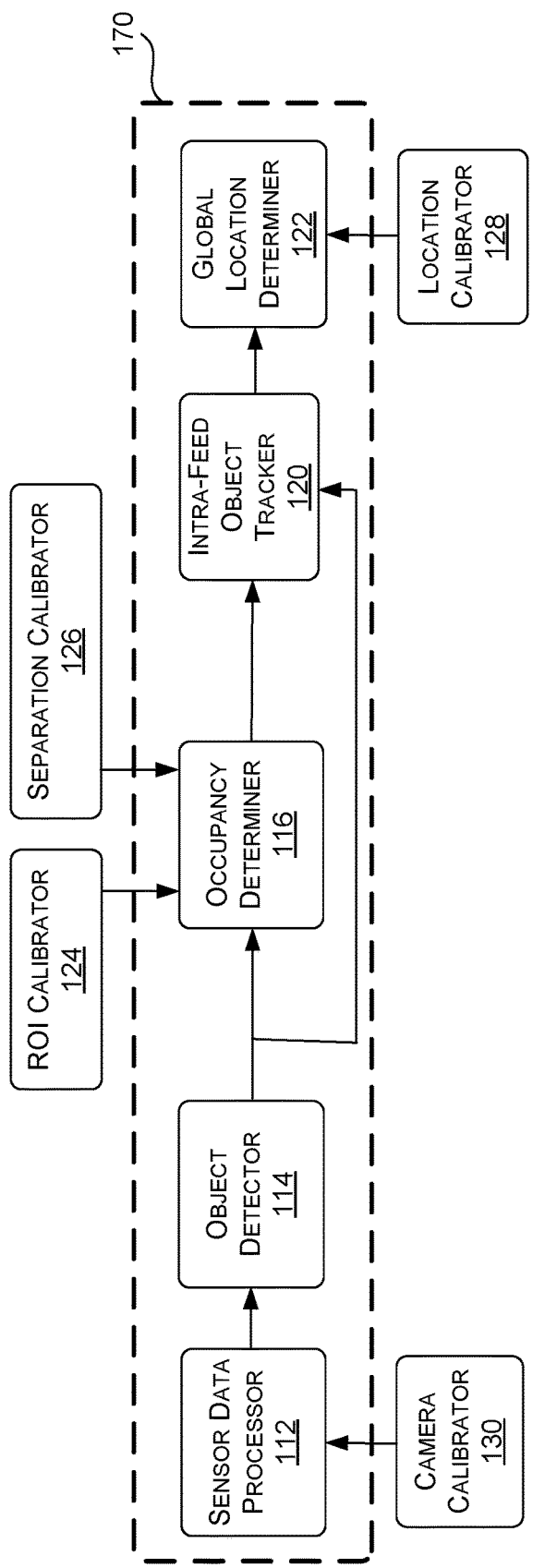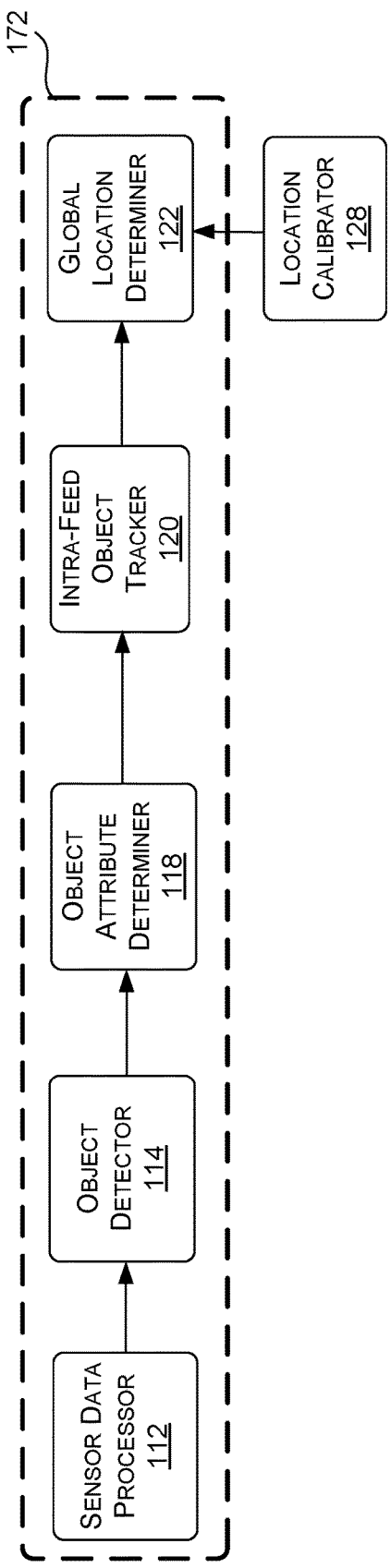
FIGURE 1B
FIGURE 1C

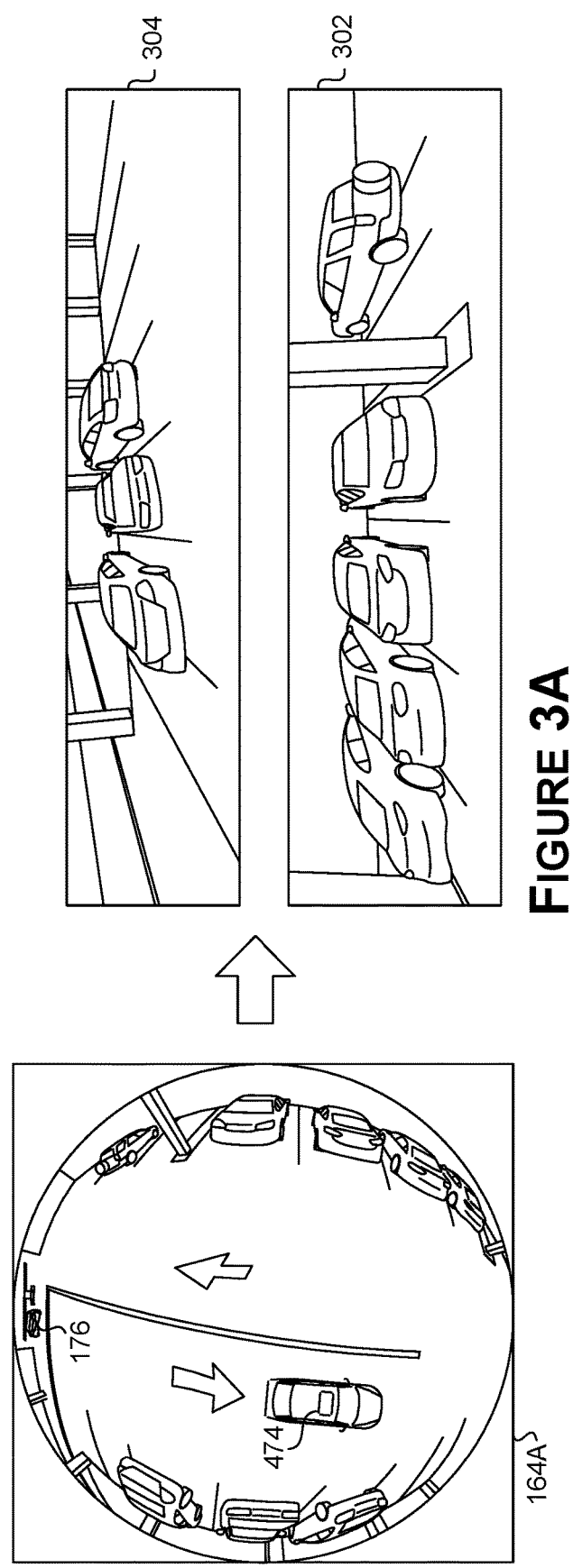
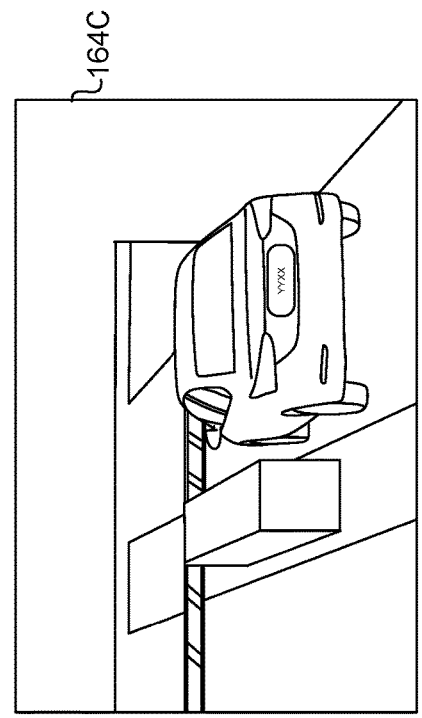
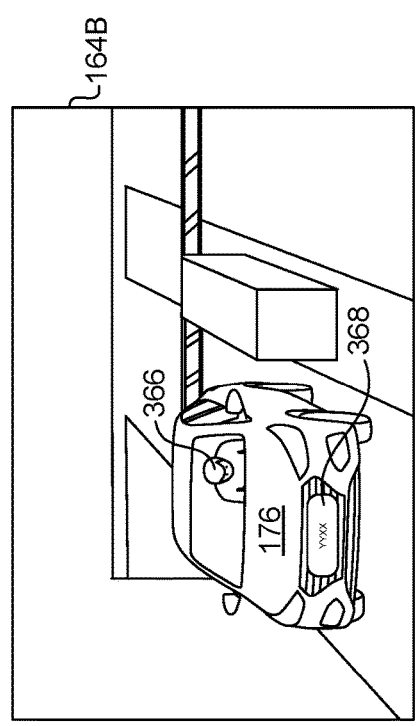
FIGURE 3A
FIGURE 3B
FIGURE 3C

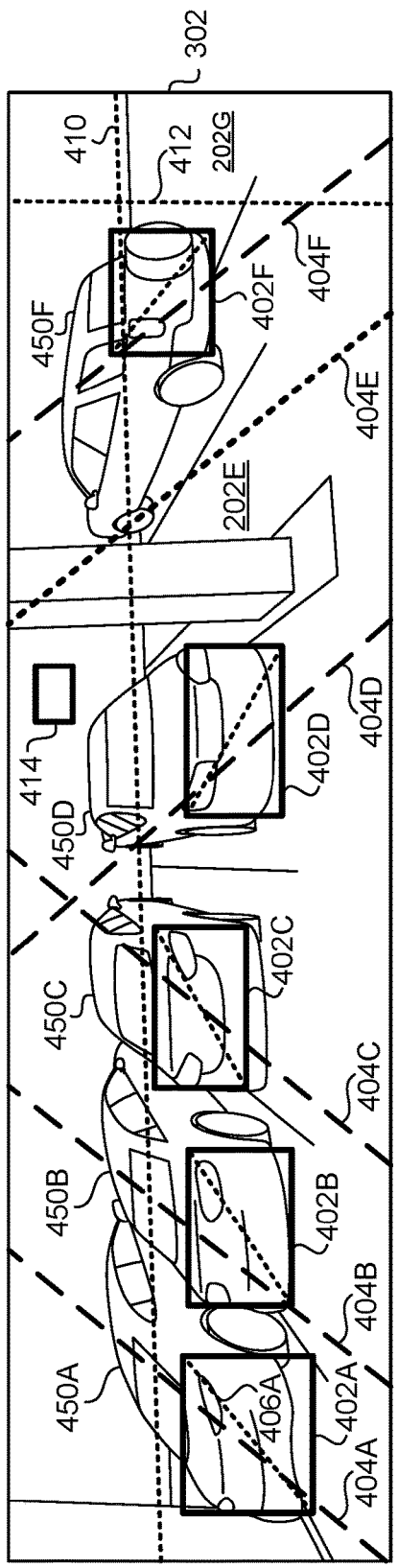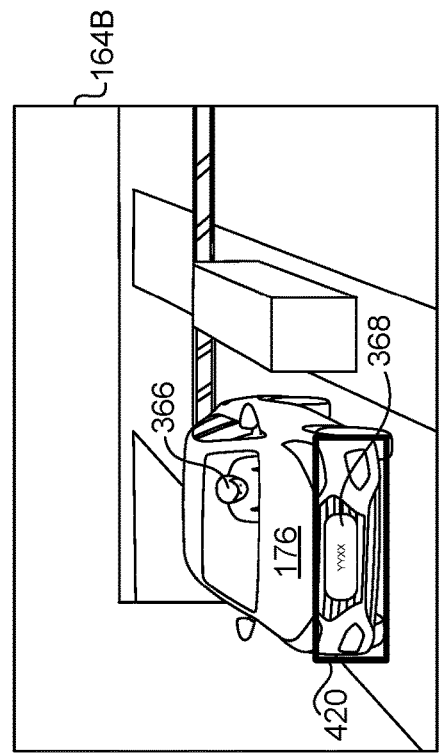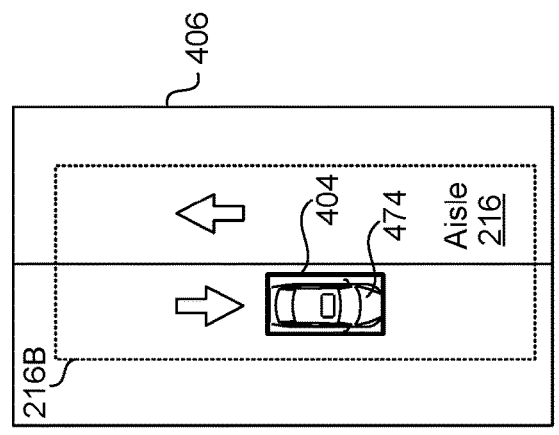
FIGURE 4A
FIGURE 4C
FIGURE 4B

SCENARIO RECREATION THROUGH OBJECT DETECTION AND 3D VISUALIZATION IN A MULTI-SENSOR ENVIRONMENT

CROSS-REFERENCE TO RELATED APPLICATIONS

This application is a continuation of U.S. patent application Ser. No. 16/896,431, filed Jun. 9, 2020, which is a continuation of U.S. patent application Ser. No. 16/365,581, filed Mar. 26, 2019, which issued into U.S. Pat. No. 11,182,598 issued on Nov. 23, 2021, which claims the benefit of U.S. Provisional Application No. 62/648,339, filed on Mar. 26, 2018. Each of these applications is hereby incorporated by reference in its entirety.

BACKGROUND

Conventional approaches for monitoring areas of the environment, such as parking structures, employ cameras installed at multiple locations. For example, outdoor parking lots may be monitored with surveillance cameras installed at higher elevations, such as 20 or more feet above the ground. This allows larger fields of view due to wider viewing angles and longer viewing distances, and greater per-camera coverage of vehicles and people on the ground. However, due to the viewing angle and occluding elements such as pillars, ordinary surveillance cameras in areas such as indoor parking garages may be able to view only a few vehicles or other objects at a time. Moreover, indoor structures typically do not provide the same amount of elevation to allow broader fields of view. For example, multi-story parking garages have ceilings that are often only about 8-9 feet above the floor.

To monitor the areas, camera data may be recorded, with a live feed being simultaneously displayed to a monitoring guard or attendant. A single monitoring agent (e.g., security guard) or relatively small team of agents may be responsible for monitoring multiple camera feeds at once. However, it is practically impossible to constantly monitor each of the cameras simultaneously for large areas and/or for several camera feeds. As a result, the effectiveness of existing approaches to monitoring areas is generally limited to ex post facto review of past events. To monitor activity in real-time, effective monitoring may generally be limited to specific deployments having only a small number of feeds suitable for small or narrows areas, or highly critical posts with a low ratio of attendants per camera display. Furthermore, to react to risks or security concerns effectively, area administrators may need real-time monitoring tools to quickly detect and identify different kinds of anomalies within the areas, such as vehicles going in the wrong direction, exceeding speed limits, stalled or abandoned in an aisle, etc.

Parking structure monitoring has been extended to usage monitoring (e.g., occupancy/vacancy signaling). To detect occupied parking spots, non-imaging sensors (e.g., puck-shaped magnetometers) may be located in each spot to detect parked vehicles. Colored light indicators installed on the ceiling may visually indicate the occupancy of each parking spot in real time. A vehicle's driver approaching a row of parking spots may thus ascertain the availability of parking spots for an entire row at a time. However, not only are such systems expensive to deploy, non-imaging sensors cannot discern if a non-metallic object such as a cardboard box is occupying the location; are incapable of communicating to a driver who is not physically present at that particular row of vehicles; and are unable to distinguish if a vehicle has parked poorly and is occupying multiple spots, etc.

SUMMARY

Embodiments of the present disclosure relate to smart area monitoring suitable for parking garages. In particular, the present disclosure relates to various approaches for monitoring one or more areas of an environment, such as parking garages.

Disclosed approaches may allow for efficient, real-time monitoring and detection of vehicles, persons, and/or other objects in a wide variety of environments or areas. The disclosed approaches may be well suited for deployment in parking structures, or other areas of high congestion in metropolitan and other dense urban areas, but are not limited to these types of areas. In various examples, cameras with fisheye optics may be installed on the ceiling of a structure, such as a parking garage, tunnel, or other partially enclosed structure or thoroughfare. The cameras may be deployed such that the field of view of one or more of the cameras may each includes at least portions of one or more rows of parking spots as well as driving aisles.

Images of the fields of view of the cameras may be segmented into distinct regions which may be referred to as "surfaces" using automated artificial intelligence techniques, such as computer vision or neural network inferencing. One or more surfaces may include a row of parking spots, and one or more other surfaces may include aisles. Each surface may be dewarped and processed to derive useful information via video analytics. For example, the number of vehicles parked at any moment may be obtained by installing enough cameras such that their combined field of view covers the parking structure, then dewarping all the relevant surfaces in real-time showing the parked vehicles, and using automated methods to detect whether a parking spot is occupied by a vehicle or is vacant.

Other useful information or anomalous behavior may also be detected. These occurrences may include, for example, which vehicles were parked in a spot less than a minimum threshold of time (e.g., 5 minutes), which vehicles parked in the same position longer than a maximum threshold (e.g., overnight), if a vehicle has parked poorly (occupying portions of 2 or more spots), or if unauthorized vehicles are parked in designated or reserved spots (e.g., parking spots designated for electric vehicles, handicapped passengers, visitors, etc.). Other information that may be tracked and applied include information to assist drivers to relocate their vehicle after parking, or to detect unusual activity or suspicious behavior in a parking structure (e.g., small child wandering alone). Detecting, monitoring, communicating, and visualizing this information to vehicle owners—both parked and in transit, structure operators, and (when necessary) law enforcement agencies extend a myriad of benefits to the community including enhanced security, increased convenience, and reduced traffic congestion and pollution.

BRIEF DESCRIPTION OF THE DRAWINGS

The present systems and methods for smart area monitoring are described in detail below with reference to the attached drawing figures, wherein:

FIG. 1B is a diagram illustrating an example of a data processing pipeline, which may be used by a smart area monitoring system, in accordance with some embodiments of the present disclosure;

FIG. 1C is a diagram illustrating another example of a data processing pipeline, which may be used by a smart area monitoring system, in accordance with some embodiments of the present disclosure;

FIG. 3A is a diagram of a fisheye image and example surfaces that may be generated by dewarping the fisheye image for perception analysis by a smart area monitoring system, in accordance with some embodiments of the present disclosure;

FIG. 3B is a diagram of an image of an entrance to an area which may be used for perception analysis by smart area monitoring system, in accordance with some embodiments of the present disclosure;

FIG. 3C is a diagram of an image of an exit to an area which may be used for perception analysis by smart area monitoring system, in accordance with some embodiments of the present disclosure;

FIG. 4A is a diagram used to illustrate examples of detecting the occupancy of ROIs, in accordance with some embodiments of the present disclosure;

FIG. 4B is a diagram used to illustrate examples of detecting the occupancy of ROIs, in accordance with some embodiments of the present disclosure;

FIG. 4C is a diagram used to illustrate examples of detecting the occupancy of ROIs, in accordance with some embodiments of the present disclosure;

DETAILED DESCRIPTION

Figure 1A:
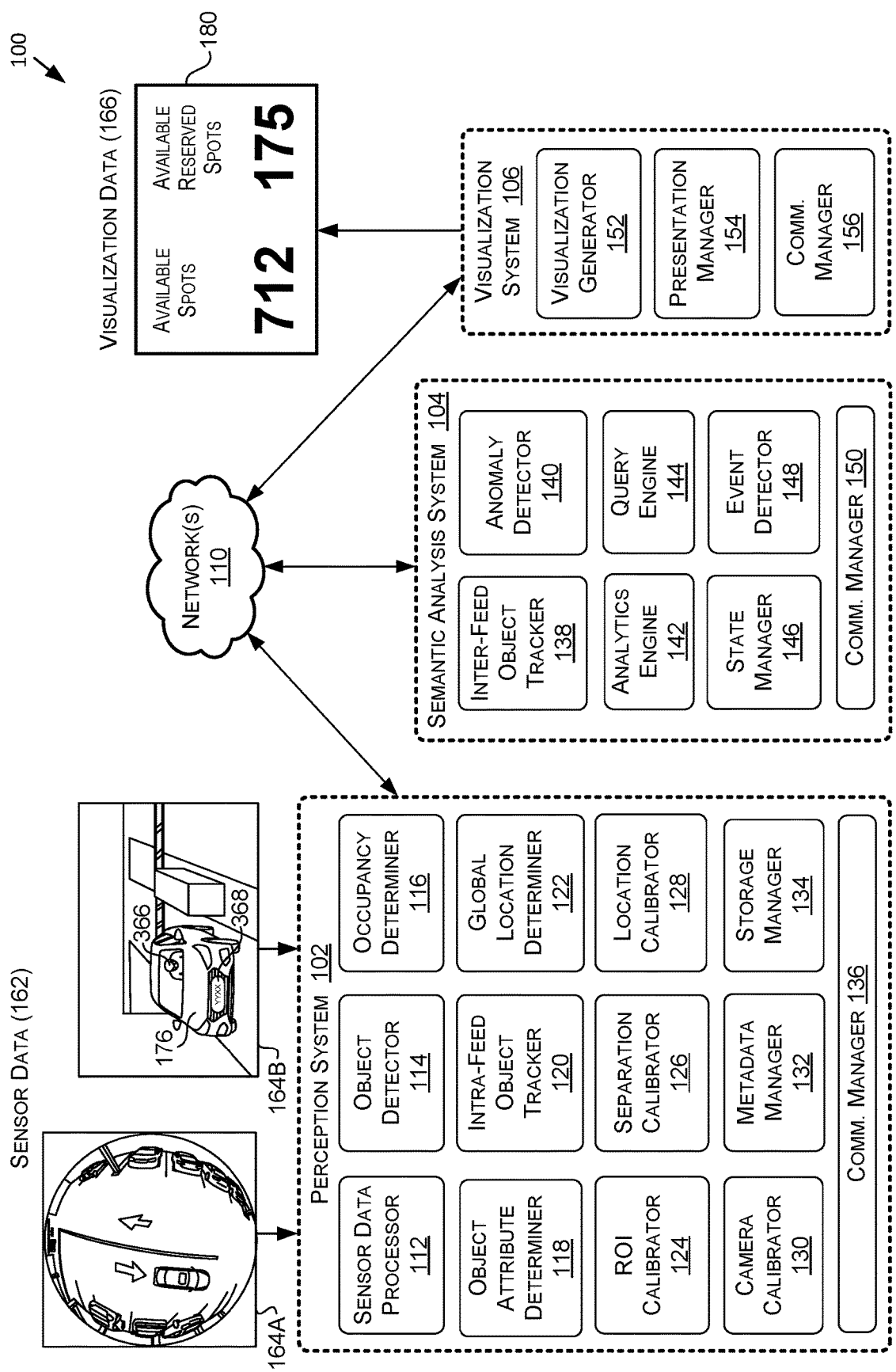
FIG. 1A is an example system diagram of a smart area monitoring system, in accordance with some embodiments of the present disclosure.

Embodiments of the present disclosure relate to smart area monitoring in an environment. In particular, the present disclosure relates to various approaches for monitoring one or more areas of an environment, such as parking garages.

Various aspects of the present disclosure relate to region of interest (ROI)-based occupancy detection. Conventional systems for determining whether particular parking spots are occupied use sensors (e.g., puck-shaped sensors) located at each parking spot. When an object triggers a sensor associated with a particular parking spot, the parking spot is marked as occupied, typically using a colored light indicator located above the parking spot. However, these conventional systems are unable to capture any characteristics of the object occupying the spot, such as whether the object is a vehicle, what type of vehicle, whether the vehicle is parked properly, whether the object is occupying multiple spots, etc.

In contrast, the current system allows for determining whether designated spaces (e.g., parking spots) are occupied by objects, such as vehicles, by leveraging image data from image sensors, such as cameras, that capture the designated spaces in fields of view of the image sensors. Using the approaches described herein, the image data can be used to determine which particular spaces are occupied by objects, the types of objects in the spaces, and other associated metadata. The metadata may be used to provide enhanced monitoring of an area that includes the designated spaces (e.g., a parking structure), such as to trigger alerts, detect anomalies, and track an object at different locations in the area. Further, as opposed the conventional systems which require a separate sensor device to detect occupancy for each parking spot, a single device (e.g., a camera device) may be used to detect occupancy for multiple designated spaces, thereby reducing the number of components as well as the complexity and cost of installation of the system.

To determine an occupancy status of a designated space once an object is detected, a region of a field of view of an image sensor that includes the object may be determined from image data representative of the field of view. The object may be detected, for example, using a machine learning model trained to delineate, from the image data, one or more of a front, a top, a back or other particular portion of an object in the field of view. The region of the field of view may be representative of the delineated portion. An amount of intersection, overlap, and/or proximity between the region of the field of view and a region of interest (ROI)

of the field of view that corresponds to the designated space may be determined. For example, the ROI may be represented using a line and the amount of intersection, overlap, and/or proximity may be the length of the line that falls within the region. The amount of intersection, overlap, and/or proximity may be used to determine the occupancy status of the designated space, which may indicate that the object is at least partially occupying the designated space, and/or a confidence that the object is at least partially occupying the designated space.

In some cases, rather than manually calibrating all ROIs for designated spaces, the ROIs can be learned from image data captured over a period of time. For a designated space, this may include determining, from the image data, initial regions of the field of view for different times, where each initial region includes an object based at least in part on detecting the object in the field of view. The ROI may then be generated based at least in part on aggregating the initial regions of the field of view.

In some cases, a field of view used to detect occupancy statuses for designated spaces may include one or more areas that do not correspond to the designated spaces. For example, the field of view may include multiple rows of designated spaces, but the field of view may be best suited for detecting occupancy statuses for one of those rows. At least some embodiments described herein may use a horizon line (e.g., a horizontal line) to divide an area of the field of view that includes the designated spaces best suited for the field of view from other areas of the field of view that may include other designated spaces. The area of the field of view may be used to detect the designated spaces while the other areas may be disregarded to both reduce processing load and to reduce the likelihood of detection errors. In some examples, the horizon line may be manually calibrated. In other examples, the horizon line may be automatically calibrated, for example, by determining, from image data, initial regions that include an object and correspond to respective ones of the designated spaces for different times. In still other examples, the horizon line may start with a pre-determined initial calibration and automatically learned over time. Locations (e.g., heights) of the initial regions in the field of view can be used to determine the horizon line such that it divides an area of the field of view that includes the locations from an area of the field of view that does not include the locations.

Additional aspects of the present disclosure relate to multi-sensor object tracking. Some conventional approaches to tracking objects using sensors employ single camera tracking where each camera captures a video stream, and the objects are tracked based on inferring visual similarities across frames. However, the same object can look very different from different perspectives of different cameras, under different lighting conditions, and for different camera configurations, which may result in missed detections of an object or false positives. Other conventional approaches to tracking objects include GPS tracking where each object transmits its GPS coordinates. However, GPS has limited accuracy, which can make it difficult to distinguish between objects that are in close proximity or to precisely place an object. This accuracy can be further limited by GPS signal reception which is often poor in urban canyons and enclosed areas, such as parking structures.

In contrast, disclosed embodiments provide various approaches to tracking objects using multiple sensors that are distributed across an area. These approaches leverage both image data representative of fields of view of multiple image sensors, such as cameras, and spatial information regarding the area, to provide precise object tracking across the sensors. In addition, these approaches may allow for tracking of an object to be effectively handed-off as an object leaves one field of view and enters another, as well as effectively accounting for gaps in sensed data, such as where the object becomes obscured in a field of view or reenters the field of view from a gap in the sensed data.

Approaches described herein may track objects within particular regions in the fields of view (e.g., aisles of parking structures) of multiple image sensors to form trajectories within those regions. The trajectories from different regions of different fields of view may be merged to form a single trajectory for a particular object, thereby leveraging tracking information from multiple image sensors that can compensate for any deficiencies of the individual trajectories. These approaches may receive first image data representative of a first field of view of a first image sensor and second image data representative of a second field of view of a second image sensor. First image coordinates of a first object may be identified from the first image data, and second image coordinates of a second object may be identified from the second image data. The first image coordinates may be used to track a first trajectory of the first object in the first region of interest, and the second image coordinates may be used to track a second trajectory of the second object in the second region of interest. A combined trajectory may be generated from the first trajectory and the second trajectory based at least in part on determining that the first object and the second object are a same object, along with associated metadata.

In further respects, approaches described herein may use multiple sets of global coordinates of an object that are derived using image data for different fields of view. The global coordinates may be grouped and used to create a tracked trajectory of the object in a monitored area, thereby accounting for potential errors in individual sets of global coordinates, which may result from deriving the global coordinates from image data. In these approaches, first global coordinates of an object in a monitored area that correspond to first image coordinates of the object in a first field of view of at least a first image sensor may be received. Also, second global coordinates of the object in the monitored area that correspond to second image coordinates of the object in a second field of view of at least a second image sensor may be received. The first global coordinates and the second global coordinates may be grouped into a cluster based at least in part on evaluating associated attributes. The cluster may be used to generate a portion of a trajectory of the object in the monitored area.

Further aspects of the present disclosure relate to various architectures and configurations for smart area monitoring systems, as well as visualization and processing techniques. For example, as opposed to presenting video of an area captured by cameras, 3D renderings may be generated and played from metadata extracted from sensors around the area.

With reference to FIG. 1A, FIG. 1A is an example system diagram of a smart area monitoring system 100, in accordance with some embodiments of the present disclosure. It should be understood that this and other arrangements described herein are set forth only as examples. Other arrangements and elements (e.g., machines, interfaces, functions, orders, groupings of functions, etc.) may be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by entities may be carried out by hardware, firmware, and/or software. For instance, various functions may be carried out by a processor executing instructions stored in memory.

The smart area monitoring system 100 may include, among other things, a perception system 102, a semantic analysis system 104, and a visualization system 106. The perception system 102, the semantic analysis system 104, and the visualization system 106 may be communicatively coupled over a network(s) 110. The network 110 may include multiple networks, or a network of networks, but is shown in simple form so as not to obscure aspects of the present disclosure. By way of example, the network 110 may include one or more wide area networks (WANs), one or more local area networks (LANs), one or more public networks such as the Internet, and/or one or more private networks. Where the network 110 includes a wireless telecommunications network, components such as a base station, a communications tower, or even access points (as well as other components) may provide wireless connectivity.

The perception system 102 may include, for example, a sensor data processor 112, an object detector 114, an occupancy determiner 116, an object attribute determiner 118, an intra-feed object tracker 120, a global location determiner 122, a region of interest (ROI) calibrator 124, a separation calibrator 126, a location calibrator 128, a camera calibrator 130, a metadata manager 132, a storage manager 134, and a communications manager 136. The semantic analysis system 104 may include, for example, an inter-feed object tracker 138, an anomaly detector 140, an analytics engine 142, a query engine 144, a state manager 146, an event detector 148, and a communication manager 150. The visualization system 106 may include, for example, a visualization generator 152, a presentation manager 154, and a communication manager 156.

Figure 2:
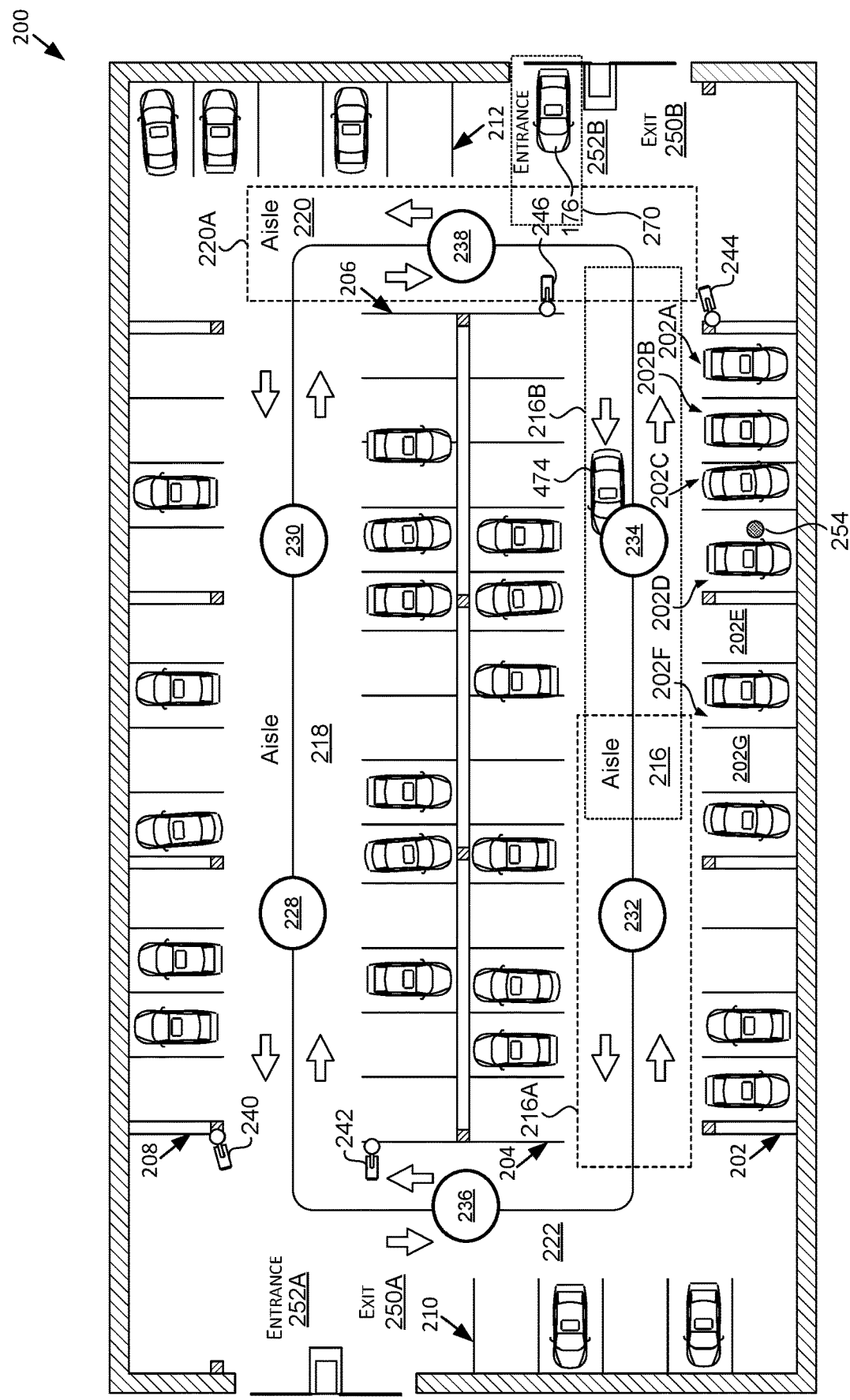
FIG. 2 is a diagram illustrating an example of an area of an environment which may be monitored using a smart area monitoring system, in accordance with some embodiments of the present disclosure.

The perception system 102 may be configured to receive and process sensor data 162 captured by one or more sensors in an area of an environment being monitored, of which an area 200 of FIG. 2 is used as an example herein. The perception system 102 may also generate, using the sensor data 162, metadata that is descriptive of the area 200 (e.g., using computer vision and inference techniques). The semantic analysis system 104 may analyze the metadata, such as to determine states of the area 200 (e.g., to record which ROIs are occupied, which objects are moving, object locations, etc.), detect anomalies in the area 200, detect events in the area 200, track objects in the area 200, apply analytics to any of the forgoing, and/or process queries against any of the forgoing. The visualization system 106 may receive data from the semantic analysis system 104 and/or the perception system 102 to generate and present one or more visualizations related to the area 200, which may be represented by visualization data 166 (e.g., occupancy heat maps, dashboards, 3D recreations of the states of the area 200, etc.).

As mentioned herein, the perception system 102 may be configured to receive and process sensor data 162 captured by one or more sensors in the area 200. The sensor data processor 112 may be configured to process the sensor data 162, such as to dewarp one or more fisheye images generated using the sensor(s)—such as the image 164A—to extract one or more surfaces from one or more images represented by the sensor data 162—such as a surface 302 (FIGS. 3A, 4A), a surface 304 (FIG. 3A), and a surface 406 (FIG. 4B) from the image 164A—and/or to decode the sensor data 162 (e.g., video data). The object detector 114 may be configured to detect objects from the sensor data 162, such an object(s) depicted in one or more of the surface 302, the surface 304, the surface 406, the image 164A, and/or an image 164B. The object attribute determiner 118 may be configured to determine object attributes, such as of objects that may be detected using the object detector 114. The occupancy determiner 116 may be configured to determine occupancy statuses with respect to one or more ROIs represented in the sensor data 162, such as using object detections from the object detector 114. The intra-feed object tracker 120 may be configured to track motion of objects within a feed of the sensor data 162—such as a single-camera feed—and may employ the object detections from the object detector 114 and the object attributes (e.g., to generate one or more object trajectories for a feed). The global location determiner 122 may be used to determine global locations of objects, such as of objects that may be detected using the object detector 114.

The ROI calibrator 124 may be used to determine and/or define the ROIs in a field(s) of view of sensors that provide the sensor data 162. The separation calibrator 126 may be used to determine and/or define one or more areas in the field(s) of view of the sensors that may contain ROIs. The location calibrator 128 may be used to determine and/or define mappings between local locations and global locations. The camera calibrator 130 may be used to determine and/or define the one or more surfaces and/or dewarping parameters for dewarping the fisheye image(s). The metadata manager 132 may be configured to generate metadata that is descriptive of the area 200, such as of the detected objects, the object attributes, the locations, and/or trajectories thereof. The storage manager 134 may be configured to manage storage of any of the various data used by the perception system 102, such as the sensor data 162, the processed sensor data 162, and/or the metadata.

Also as mentioned herein, the semantic analysis system 104 may analyze the metadata, such as to determine states of the area 200, detect anomalies in the area 200, detect events in the area 200, track objects in the area 200, apply analytics to any of the forgoing, and/or process queries against any of the forgoing. In some examples, the semantic analysis system 104 may not process any sensor data (e.g., the sensor data 162), and may rely on the metadata provided by the metadata manager 132 from a description of the area 200. For example, the inter-feed object tracker 138 may be configured to use the global locations of the objects determined using the global location determiner 122 to track motion of the objects within multiple feeds of the sensor data 162, such as a multiple camera feeds (e.g., to generate one or more object trajectories for the feeds, such as by merging trajectories from the intra-feed object tracker 120). The state manager 146 may be configured to determine and/or manage states of the area 200 (e.g., occupancy statuses for ROIs, object trajectories, events, etc.). The anomaly detector 140 may be configured to detect the anomalies in the area 200. The analytics engine 142 may be configured to perform the analytics in the semantic analysis system 104. The event detector 148 may be configured to detect the events in the area 200. Further, the query engine 144 may be configured to process the queries in the semantic analysis system 104.

As further mentioned herein, the visualization system 106 may receive data from the semantic analysis system 104 and/or the perception system 102 to generate and present one or more visualizations related to the area 200 (e.g., represented by visualization data 166). The visualization generator 152 may be configured to generate the visualization data 166 that is representative of the visualization(s). Also, the presentation manager 154 may be configured to manage presentation of the visualization(s).

The communications manager 136, the communications manager 150, and/or the communications manager 156 may each be configured to manage communications received by its respective system (e.g., comprising sensor data, image data, and/or metadata) and/or provided by the respective system (e.g., metadata, visualization data, sensor data, image data, query results, event data, etc.), such as amongst any of the perception system 102, the semantic analysis system 104, the visualization system 106 and/or other components that may be included in the smart area monitoring system 100. Additionally or alternatively, the communications manager 136, the communications manager 150, and/or the communications manager 156 may manage communications within the respective system.

Where a communication is received and/or provided as a network communication, the communications manager 136, the communications manager 150, and/or the communications manager 156 may comprise a network interface which may use one or more wireless antenna(s) and/or modem(s) to communicate over the network(s) 110. For example, the network interface may be capable of communication over Long-Term Evolution (LTE), Wideband Code-Division Multiple Access (WCDMA), Universal Mobile Telecommunications Service (UMTS), Global System for Mobile communications (GSM), CDMA2000, etc. The network interface may also enable communication between objects in the environment (e.g., vehicles, mobile devices, etc.), using local area network(s), such as Bluetooth, Bluetooth Low Energy (LE), Z-Wave, ZigBee, etc., and/or Low Power Wide-Area Network(s) (LPWANs), such as Long Range Wide-Area Network (LoRaWAN), SigFox, etc. In examples, any combination of the communications described herein may be between components of a computing device 1100 over a bus 1102 of FIG. 11, and/or may be over the network(s) 110.

Example of an Area that May be Monitored

FIG. 2 is a diagram illustrating an example of the area 200 of an environment which may be monitored using the smart area monitoring system 100, in accordance with some embodiments of the present disclosure. The area 200 may be any suitable area, such as a floor of a parking structure, an entire parking structure, a parking lot, an event venue (e.g., a stadium, a convention center, etc.), a region of an outdoor environment, such as downtown and/or suburban areas, a shopping mall, a store, a warehouse, a travel hub (e.g., an airport), an amusement park, and/or a building or floor thereof.

In the example of FIG. 2, the area 200 includes a floor of a parking structure. The area 200 may include one or more regions that may be occupied by an object, such as a vehicle, a person, an animal, a package, etc. While vehicles are primarily used as examples herein, they may more generally be referred to as objects. Each region of the area 200 may be a designated ROI of the smart area monitoring system 100, which may have an individual (e.g. unique) address and/or identifier within the smart area monitoring system 100. Examples of the ROIs include one or designated spots or spaces (e.g., parking spots, rooms, seats, shelf-spaces, drawers, compartments, etc.) which may be occupied by one or more objects for an extended period of time (e.g., which may be defined by and/or assigned one or more rules and/or parameters of the smart area monitoring system 100). For example, as the area 200 is of a parking structure, the spots may include parking spots, of which parking spots 202A, 202B, 202C, 202D, 202E, 202F, and 202G are individually labeled. In various examples, at least some of the spots may be arranged in rows, such as a row 202 which includes the parking spots 202A, 202B, 202C, 202D, 202E, 202F, and 202G. Other examples of rows include rows 204, 206, 208, 210, and 212.

Other examples of the ROIs include one or designated aisles (or thoroughfares, passageways, roads, hallways, etc.) or portions thereof which may be occupied by one or more objects to reach or access one or more spots and/or to traverse the area 200 (e.g., which may be defined by and/or assigned with one or more rules and/or parameters of the smart area monitoring system 100). In various examples, an object may remain in an aisle for a limited period of time (e.g., relative to a spot), such as to reach a spot. As examples, the area 200 includes aisles 216, 218, 220, and 222, which each may include any number of aisle regions (e.g., ROIs). For example, the aisle 216 include may include an aisle region 216A and an aisle region 216B. In various examples one or more of the aisles may be defined by one or more rows of spots, as shown.

The area 200 may also include one or more sensors which may be used to generate one or more portions of the sensor data 162. For example, multiple sensors may be deployed in a distributed arrangement around the area 200. The sensor(s) may include at least one sensor capable of generating sensor data representative of at least some aspect of an environment. For example, and without limitation, the sensor(s) may comprise any combination of an image sensor(s), puck sensor(s), global navigation satellite systems (GNSS) sensor(s) (e.g., Global Positioning System (GPS) sensor(s)), RADAR sensor(s), ultrasonic sensor(s), LIDAR sensor(s), inertial measurement unit (IMU) sensor(s) (e.g., accelerometer(s), gyroscope(s), magnetic compass(es), magnetometer(s), etc.), microphone(s), stereo camera(s), wide-view camera(s) (e.g., fisheye cameras), infrared camera(s), surround camera(s) (e.g., 360 degree cameras), long-range and/or mid-range camera(s), speed sensor(s) (e.g., for measuring the speed of a vehicle), vibration sensor(s), steering sensor(s), brake sensor(s) (e.g., as part of a brake sensor system), motion sensor(s), temperature sensor(s), proximity sensor(s), and/or other sensor type.

In the example of FIG. 2, the area 200 includes cameras 228, 230, 232, 234, 236, 238, 240, 242, 244, and 246. One or more of the cameras may, for example, be a specialized camera device equipped with processors that are used to at least partially implement the object attribute determiner 118 to execute automatic recognition techniques such as automatic number-plate recognition (ANPR), also known as automatic license-plate recognition or reader technology (ALPR), license-plate recognition (LPR) technology, etc. Additionally or alternatively, one or more of the cameras may be general surveillance cameras or other types of cameras used to capture image data (e.g., video data), and image recognition/inference techniques may be applied at least partially by the object attribute determiner 118 to the captured image data to detect and identify the license plate and/or other attribute information (color, make and model, size, etc.) of vehicles.

In some examples, one or more of the cameras may be bullet cameras (or more generally non-fisheye lens cameras, such as box style cameras). Also, one or more of the cameras may be fisheye lens cameras capable of capturing images in a 360-degree field of view (FoV). For example, a bullet camera(s) may be installed at controlled access points such as entrances or exits of the area 200 and/or rooms or regions thereof to capture objects entering and exiting the area. In the example shown, the cameras 242 and 244 may be bullet cameras installed to monitor exits 250A and 250B of the area 200. Also, the cameras 240 and 246 may be bullet cameras installed to monitor entrances 252A and 252B of the area 200. The image 164B shown in FIG. 1 and FIG. 3B may correspond to the field of view of the camera 246 in FIG. 2 as the vehicle 176 arrives at the area 200. The image 364 shown in FIG. 3C and may correspond to the field of view of the camera 244 at a later time when the vehicle 176 leaves the area 200.

Camera devices may also be installed for monitoring designated spaces or spots of the area 200. While non-fisheye lens cameras may be used, in some examples, one or more of these cameras may be fisheye lens cameras, and may be installed on a ceiling or a wall of a structure (or a pole for outdoor areas) such that the field of view of each camera may include at least portions of one or more rows of spots as well as the aisles leading to the row(s).

In FIG. 2, the cameras 228, 230, 232, 234, 236, 238 may be examples of such cameras. For example, the field of view of the camera 234 may include at least portions of the rows 202 and 204 of spots (e.g., the spots 202A, 202B, 202C, 202D, 202E, 202F) as well as the aisle region 216B of the aisle 216. The image 164A shown in FIG. 1 and FIG. 3A may correspond to the field of view of the camera 232 in FIG. 2.

By including at least a portion of a spot in a field of view of a camera (e.g., a fisheye or non-fisheye camera) the sensor data 162 may include image data representative of an object(s) in the spot. The occupancy determiner 118 may leverage the image data to determine an occupancy status for the spot. Additionally or alternatively, by including at least a portion of an aisle in a field of view of a camera (e.g., a fisheye or non-fisheye camera) the sensor data 162 may include image data representative of an object(s) in the aisle. The intra-feed object tracker 120 may leverage the image data to track an object as it moves through the aisle and/or the occupancy determiner 118 may leverage the image data to determine an occupancy status for the aisle (or region thereof). Further, by including at least a portion of an entrance or exit of the area 200 in a field of view of a camera (e.g., a fisheye or non-fisheye camera) the sensor data 162 may include image data representative of an object(s) entering or exiting the area 200. The intra-feed object tracker 120 may leverage the image data to track an object as it enters or exits the area 200.

In any of these examples, the object detector 114 may analyze the image data to detect and/or identify an object in the area 200, such as within an image of the area 200 and/or a field of view(s) of a sensor in the area 200 (e.g., using object perception). The object detector 114 may analyze the image data to extract and/or determine a presence and/or location(s) of one or more objects in an image(s) represented by the image data and/or in the environment. This may include the object detector 114 determining a bounding box of an object and/or location coordinates of the object in an image (e.g., four coordinate pairs of corners of a bounding box) and/or one or more confidence values associated with a detection. The object detector 114 may employ, for example, one or more machine learning models to determine one or more object attributes of an object. For example, and without limitation, the machine learning model(s) may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), and/or other types of machine learning models.

Also, in any of these examples, the object attribute determiner 118 may analyze the image data to extract and/or determine one or more object attributes of an object (e.g., using object perception), such as any of those described herein, or other attributes. The object attribute determiner 118 may employ, for example, one or more machine learning models to determine one or more object attributes of an object. For example, and without limitation, the machine learning model(s) may include any type of machine learning model, such as a machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), and/or other types of machine learning models. In some examples, the object attribute determiner 118 may be at least partially integrated into the object detector 114. Additionally or alternatively, the object attribute determiner 118 may use outputs from the object detector 114 to analyze the image data. For example, the object attribute determiner 118 may analyze location(s) of an object detected using the object detector 114 and/or may only analyze object detections that have a confidence score(s) exceeding a threshold value(s).

As examples, the object detector 114 and/or the object attribute determiner 118 may implement object perception using machine learning model(s) (e.g., a neural network(s)) that may be specifically configured (e.g., trained) to recognize certain objects and/or features/attributes of the objects. Examples of attributes the object attribute determiner 118 and/or the object detector 114 may determine from the sensor data 162 includes one or more of a license plate and/or other attribute information (color, make and model, etc.) of a vehicle, a type of object (e.g., vehicle, person, parcel, other, a location(s) (e.g., in the area 200, such as global or local coordinates), a pose, a current and/or observed velocity, a maximum velocity, a predicted velocity, at least one dimension (e.g., physical dimensions such as length, width, footprint, height, etc.), a current and/or observed acceleration or deceleration, a maximum acceleration or deceleration, a predicted acceleration or deceleration, a mass, a reaction time, and/or other attributes of an object. One or more of the attributes may represent an observed or visible attribute(s) of the object (e.g., a location/position, make, model) and one or more of the attributes may represent an inferred or latent attribute(s) of the object (e.g., maximum acceleration). Further, one or more of the attributes may applied to a lookup table(s) or otherwise used to lookup, determine, and/or calculate one or more attributes associated with the object. As an example, a license plate may be used to lookup an employee identifier or other associated attributes of the object.

The cameras 240, 242, 244, and 246 (e.g., non-fisheye camera) may be well suited to capture a front or rear of a vehicle, such as for the object detector 114 and/or the object attribute determiner 118 to capture a driver 366, a license plate 368, a color, a make and/or a model of the vehicle 176. The metadata manager 132 may store any combination of this information in association with an object identifier of an object and/or an object detection, video frame, etc. By positioning the cameras 240, 242, 244, and 246 at the entrances 252A and 252B and the exits 250A and 250B of the area 200, this information may be leveraged for the duration that the object is within the area 200.

The cameras 232, 234, 236, and 238 (e.g., fisheye cameras) may be well suited to capture a top of a vehicle, such as for the object detector 114 and/or the object attribute determiner 118 to capture or update the color, the make and/or the model of the vehicle 176 and/or for the intra-feed object tracker to track the object throughout aisles of the area 200. Further, the occupancy determiner 116 may use the cameras 232, 234, 236, and 238 to determine occupancy statuses of spots in the area 200, as the spots may also be sufficiently visible in the fields of view. Thus, a single camera may be used to monitor an aisle(s) and a spot(s) reducing the number of cameras needed to monitor the area 200. As indicated in FIG. 3A, fields of view of the cameras 232, 234, 236, and 238 may each include multiple spots, such that the occupancy determiner 116 may use each of the cameras 240, 242, 244, and 246 to determine occupancy statuses of multiple spots in the area 200, as multiple spots may be sufficiently visible in each of the fields of view. Thus, a single camera may be used to monitor multiple spots reducing the number of cameras needed to monitor the area 200.

In addition to or instead of using image data for any of these various purposes, "puck" sensors, comprising a magnetometer and pre-processing capability may be used for further vehicle sensing information (e.g., location tracking, motion detection, etc.). For example, the occupancy determiner 118 may use a puck sensor 254 at the parking spot 202D to determine the occupancy status in addition to or instead of an analysis of the image data from the camera 234. However, the puck sensor 254 may not trigger where a vehicle is not directly over the puck sensor 254, as shown in FIG. 2. Therefore, analyzing the image data may be more reliable.

Examples of Architectures for a Smart Area Monitoring System

Figure 11:
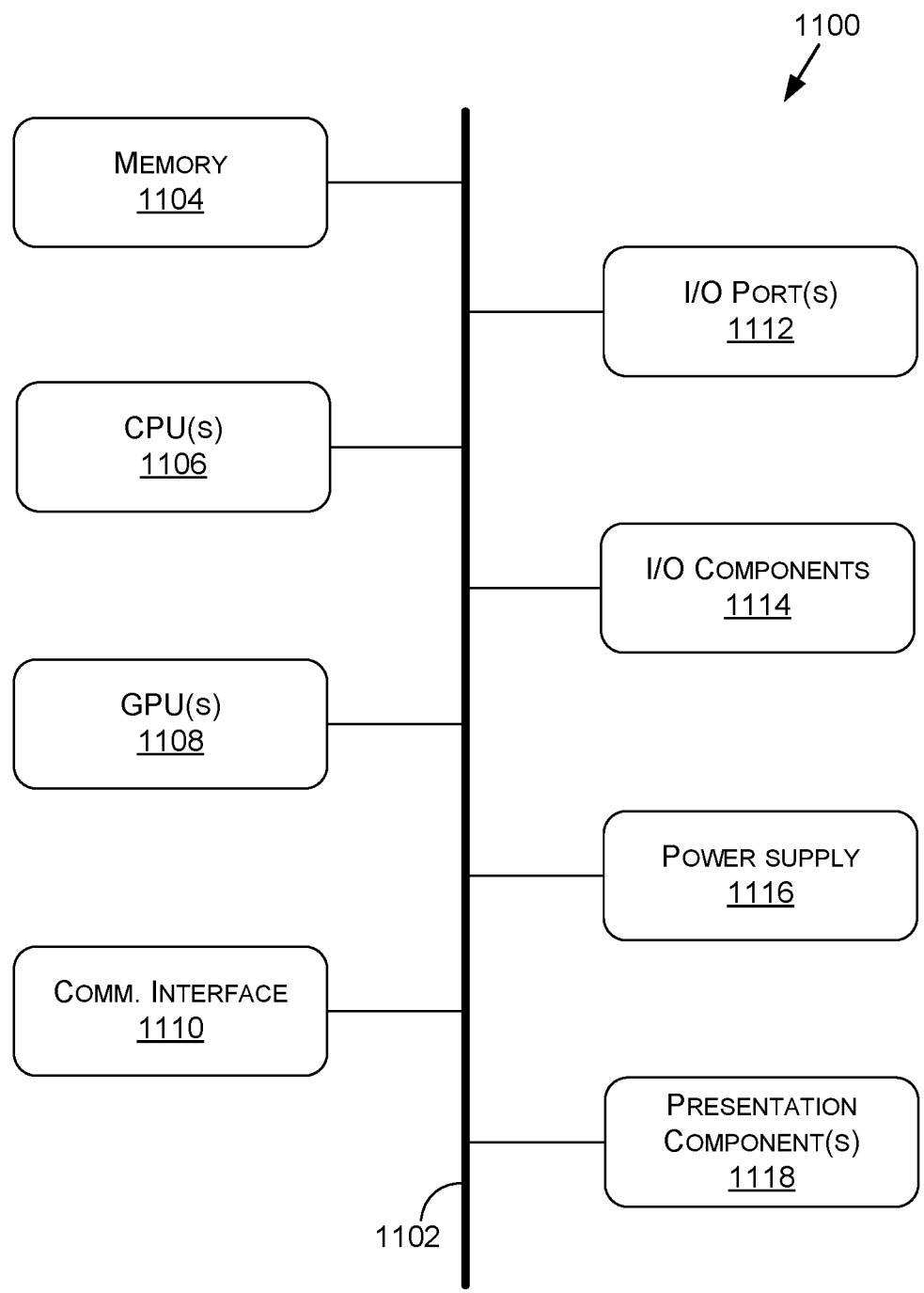
FIG. 11 is a block diagram of an example computing environment suitable for use in implementing some embodiments of the present disclosure.

The perception system 102 may be implemented, for example, as a software platform executing on one or more computing devices, such as a server(s), which may correspond to the computing device 1100 of FIG. 11. The computing device(s) 1100 may be positioned locally or proximately (e.g., on-premises) relative to an area to be monitored, such as the area 200 of FIG. 2. The perception system 102 may apply image recognition techniques (e.g., using the object detector 114, the occupancy determiner 116, the object attribute determiner 118, and/or the intra-feed object tracker 120) to extract metadata from images captured by image sensors (and/or other sensors) in or around an area, such as the area 200 (e.g., a monitored structure). Some or all of the image recognition techniques may be executed as processing tasks by one or more graphical processing units (GPUs) in the local one or more computing devices. According to some examples, some or all of the image recognition techniques may be executed by one or more GPUs in computing devices remotely positioned from the area, such as in a distributed (e.g., cloud) computing environment. In still further examples, some or all of the processing may be performed by a combination of GPUs from local and remote computing environments.

In some examples, the perception system 102 may be implemented using one or more instances of a high performance platform for deep learning inference and video analytics, such as the DeepStream SDK by NVIDIA Corporation. For example, the perception system 102 may support multi-stream video parsing and decoding where each stream may be processed at least partially using a respective data processing pipeline. FIG. 1B is a diagram illustrating an example of a data processing pipeline 170, which may be used by the smart area monitoring system 100, in accordance with some embodiments of the present disclosure. FIG. 1C is a diagram illustrating an example of another data processing pipeline 172, which may be used by the smart area monitoring system 100, in accordance with some embodiments of the present disclosure.

Each stream may comprise a feed of the sensor data 162 from one or more sensors. Examples are described in which each feed and/or stream comprises a single-camera feed, although any number of cameras and/or other sensors may provide the sensor data 162 for a stream, or feed, in various examples.

For example, in FIG. 2, each of the cameras 228, 230, 232, 234, 236, 238, 240, 242, 244, and 246 may correspond to a respective single-camera feed. Image data from the cameras 228, 230, 232, 234, 236, 238, 240, 242, 244, and 246 may be provided to one or more servers of the perception system 102, which may then be processed in parallel. A separate instance of the data processing pipeline 170 of FIG. 1B may be used to perform the processing for each feed that corresponds to the cameras 228, 230, 232, 234, 236, and 238 (e.g., fisheye cameras covering aisles and/or spots). Further, a separate instance of the data processing pipeline 172 of FIG. 1C may be used to perform the processing for each feed that corresponds to the cameras 240, 242, 244, and 246 (e.g., non-fisheye cameras covering entrances or exits). The data processing pipeline of a feed or stream may be used to extract the metadata from the sensor data 162 that correspond to the feed, which may then be provided to the semantic analysis system 104 (e.g., within the feed).

The data processing pipeline 170 of FIG. 1B is described with respect to the camera 232 by way of example. The data processing pipeline 170 for the camera 232 may include the sensor data processor 112 receiving, from the camera 232, the sensor data 162 that corresponds to the camera 232 (e.g., image data). The sensor data processor 112 may decode portions of the sensor data 162 that correspond to the camera 232. Image data generated by the cameras may be compressed and/or encoded according to one or more data formats, including (without limitation) YUV, IP, and RAW data. In examples where the camera 232 is a fisheye camera, the sensor data processor 112 may use camera calibration settings from the camera calibrator 130 to dewarp or otherwise process images represented by the image data, such as the image 164A. This may result in the sensor data processor 112 determining or identifying one or more surfaces in the images. For example, the sensor data processor 112 may dewarp the image 164A to generate the surfaces 302, 304, and 406, shown in FIGS. 3A, 4A, and 4B. For example, each input video may be dewarped into multiple (e.g., five) "surfaces." From a single input video, the sensor data processor 112 may generate, for example, three separate video channels, one of each row of designated spaces (e.g., parking spaces), and one channel for the aisle. The surfaces 302 and 304 of FIG. 3A and the surface 406 of FIG. 4B are examples of the three surfaces. However, in various example any number of changes and surfaces may be generated (e.g., for more aisles and/or rows).

The camera calibration settings may be configured such that the surfaces generated and/or determined by the sensor data processor 112 each include one or more ROIs. For example, the surface 302 may be configured to include at least the parking spots 202A, 202B, 202C, 202D, 202E, and 202F. Similarly, the surface 302 may be configured to include particular parking spots from the row 204. Also, the surface 406 may be configured to include the aisle region 216B. The sensor data processor 112 may provide the processed image data (e.g., the surfaces 302, 304, and 406) to the object detector 114. In some examples, a separate sub-feed is generated by the sensor data processor 112 for each surface 302, 304, 406, and each surface 302, 304, 406 may be processed in parallel for any portion of the remainder of the data processing pipeline 170.

The object detector 114 may analyze the image data representative of the surfaces 302, 304, and 406 to detect one or more objects depicted at least partially in the surfaces 302, 304, and 406 (e.g., in parallel). For example, for the surfaces 302 and 304 that correspond to a spot and/or row of spots the object detector 114 may use one or more machine learning models ("MLMs")—such as, but without limitation a deep neural network architecture—trained to detect the front or back of a parked vehicle(s) and/or other type of object. The vehicle front or back may be marked by a rectangular bounding box as output. For example, for the surface 302, the object detector 114 may output coordinates that define bounding boxes 402A, 402B, 402C, 402D, and 402F of FIG. 4A, each corresponding to a detected object. In other examples, the objects may be detected using different approaches. For the surface 406 that corresponds to an aisle, the object detector 114 may use one or more MLMs (e.g., a deep neural network architecture) trained to detect a top of a vehicle(s) and/or other type of object. The vehicle top may be marked by a rectangular bounding box as output. For example, for the surface 406 of FIG. 4B, the object detector 114 may output coordinates that define a bounding box 404, corresponding to a detection of a vehicle 474. In other examples, the object(s) may be detected using different approaches.

The occupancy determiner 116 may be configured to determine occupancy statuses with respect to one or more of the ROIs represented in the sensor data 162, such as by analyzing the surfaces 302, 304, and 406. The analysis may be based at least in part on object detections from the object detector 114. For example, the occupancy determiner 116 may use the bounding boxes 402A, 402B, 402C, 402D, and 402F of FIG. 4A to determine occupancy statuses for the parking spots 202A, 202B, 202C, 202D, and 202F. Further, a lack of a detected object may be used to determine an occupancy statue for the parking spot 202E. Similarly, the occupancy determiner 116 may use the bounding boxes 404 of FIG. 4B to determine an occupancy status for the aisle region 216B. Although a single detected object is shown, multiple objects may be detected.

To determine the occupancy status for each ROI, the occupancy determiner 116 may use ROI calibration data from the ROI calibrator 124 that defines the ROI in a field of view of a camera. For the surface 302, the ROI calibration data may be representative of ROI lines 408A, 408B, 404C, 404D, 404E, and 404F corresponding to parking spots 202A, 202B, 202C, 202D, 202E, and 202F, respectively. For the surface 406 the ROI calibration data may be representative of the aisle region 216A.

Additionally or alternatively, to determine the occupancy status for each ROI, the occupancy determiner 116 may use separation calibration data from the separation calibrator 126 that defines one or more areas in a field of view of a camera and/or within a surface that may include an ROI for the feed. For the surface 302, the separation calibration data may be representative of a separation line 410 (e.g., a horizon line) and/or a separation line 412 of FIG. 4A. The occupancy determiner 116 may use the separation line 410 to discard and/or refrain from analyzing object detections above the separation line 410 (e.g., an object detection 414) and/or to discard image data above the separation line 410 in determining occupancy statuses for the surface 302. Additionally or alternatively, the occupancy determiner 116 may use the separation line 412 to discard and/or refrain from analyzing object detections to a particular side (e.g., the right) of the separation line 412 (e.g., an object detection 414) and/or to discard image data to the side of the separation line 412 in determining occupancy statuses for the surface 302. In any example, the sensor data processor 112 may be used to crop-out and/or black out one or more particular areas of an image that are not be analyzed for object occupancy based on the separation data. This may occur prior to or after object detection.

In some examples, where image data (e.g., the surface 302) is determined by the occupancy determiner 116 to correspond to a parked vehicle(s) or a spot is otherwise determined to be occupied, extracted metadata may be forwarded to the semantic analysis system 104 without processing by the intra-feed object tracker 120 and/or the global location determiner 122. In contrast, image data (e.g., the surface 406) determined by the occupancy determiner 116 to correspond to a moving vehicle(s) or other object may be passed to the and/or the intra-feed object tracker 120 for further processing (e.g., tracking) and metadata extraction before transmission to the semantic analysis system 104.

The global location determiner 122 may emit the global coordinates in which an object was observed in a global reference frame, which may be common across all sensors. The location calibrator 128 may calibrate each sensor to emit the object's global coordinates when an object is identified. The global reference frame may be geo-coordinates (longitude, latitude and altitude) or a Euclidian space that identifies the position of the object in the wide-area, as examples. In the case of a static sensor, such as magnetic loop or puck sensor, such a calibration may be in-situ; meaning that if those sensors detect an object, the object presence is the actual location of the sensor. For cameras, the calibration may be performed by mapping the camera's FoV to a global reference frame.

The location calibrator 128 may calibrate location data for the cameras using any suitable approach (e.g., checkerboard based calibration). For every object detected (e.g., a vehicle), a camera may use the location data to emit the global coordinates and global time information, or this information may otherwise be determined from the image data from the camera (e.g., on a perception server). In some examples, an object's coordinates may be computed using a transformation matrix to map the camera or image coordinates to the global coordinates. Such a transformation matrix may be computed in the calibration phase by performing a perspective transformation between the camera FoV and the global reference frame. Each sensor and/or stream may also assign an object identifier to an identified object. The sensor and/or stream may assign one identifier to one object, even if the same object is detected across consecutive time-periods.

The intra-feed object tracker 120 may be configured to track motion of objects within a feed (and/or sub-feed) of the sensor data 162—such as within a single surface—and may employ the object detections from the object detector 114 and optionally object attributes from the object attribute determiner 118 (e.g., to generate one or more object trajectories for a feed). The intra-feed object tracker 120 may also use the occupancy status of one or more of the ROIs from the occupancy determiner 116 to track motion of objects within a feed of the sensor data 162. For example, the intra-feed object tracker 120 may determine location coordinates and/or trajectories of each object within a feed and/or surface (the location coordinates and/or trajectories may correspond to locations of bounding boxes over time).

The global location determiner 122 may determine based at least in part on a location(s) of an object that is provided by the intra-feed object tracker 120 as a local image location(s) and/or a local area location(s) within the area 200, a location(s) of the object in a global space. To do so, the global location determiner 122 may use location calibration data from the location calibrator 128 to map the local location(s) to a global location(s).

The metadata manager 132 may provide metadata generated before, during, and/or after the data processing pipeline 170 to the semantic analysis system (e.g., in the feed, sub-feed, or otherwise). The metadata may be, for example, in a JSON, XML, or any other descriptive format. A metadata message(s) could be provided for each frame, time, and/or period of time in a feed.

The data processing pipeline 172 of FIG. 1C is described with respect to the camera 246 by way of example. The data processing pipeline 172 for the camera 246 may include the sensor data processor 112 receiving, from the camera 246, the sensor data 162 that corresponds to the camera 246 (e.g., image data). The sensor data processor 112 may decode portions of the sensor data 162 that correspond to the camera 232. The sensor data processor 112 may use camera calibration settings from the camera calibrator 130 to determine or identify one or more surfaces in the images or a surface may not be used.

The object detector 114 may analyze the processed image data to detect one or more objects depicted at least partially in an image represented by the image data. For example, the object detector 114 may use one or more MLMs (e.g., a deep neural network architecture) trained to detect the front or back of a vehicle(s) and/or other type of object. The vehicle front or back may be marked by a rectangular bounding box as output. For example, for the image 164B, the object detector 114 may output coordinates that define a bounding box 420 around the vehicle 176. In other examples, the objects may be detected using different approaches.

The object attribute determiner 118 may determine one or more attributes of the vehicle 176 based at least in part on the bounding box 420.

The intra-feed object tracker 120 may be configured to track motion of the vehicle and may employ the object detection(s) from the object detector 114 and optionally object attributes from the object attribute determiner 118 (e.g., to generate one or more object trajectories for the feed). For example, the intra-feed object tracker 120 may determine location coordinates and/or trajectories of the object (the location coordinates and/or trajectories may correspond to locations of bounding boxes over time).

The global location determiner 122 may determine based at least in part on a location(s) of an object that is provided by the intra-feed object tracker 120 as a local image location(s) and/or a local area location(s) within the area 200, a location(s) of the object in a global space. To do so, the global location determiner 122 may use location calibration data from the location calibrator 128 to map the local location(s) to a global location(s).

The metadata manager 132 may provide metadata generated before, during, and/or after the data processing pipeline 172 to the semantic analysis system (e.g., in the feed, a sub-feed, or otherwise).

The metadata manager 132 may use the communications manager 136 to transmit metadata to the semantic analysis system through a Representational State Transfer (REST) application programming interface (API). The metadata may be communicated as, for example, an occupancy map indicating occupancy and vacancy status information for defined spots and/or aisles, and object attributes for detected objects in the map.

The extracted metadata provided by the metadata manager 132 to the semantic analysis system 104 may include, without limitation, image characteristics such as whether an image (e.g., the image 164A or the image 164B) includes motion, whether the motion is attributable to a movement by a vehicle (e.g., the vehicle 176), certain characteristics or attributes of the vehicle, and/or an identification or position of parking spaces or other designated areas (e.g., ROIs) a vehicle may be occupying in the area. The captured images may be used as input in one or more neural networks (e.g., of the object detector 114, the occupancy determiner 116, the object attribute determiner 118, and/or the intra-feed object tracker 120) trained to perform one or more of entity (e.g., vehicle) detection, attribute recognition, movement detection, and designated space detection.

The semantic analysis system 104 may combine the metadata extracted from the sensor data 162 by the perception system 102 for system-information to perform system or area-wide analysis for communication and operational insights. For example, data from multiple sensors (e.g., the metadata) may be fused by the inter-feed object tracker to understand holistic movement of objects in wide-area. For example, the same object detected in multiple cameras (with overlapping fields of view) may be consolidated into a single object. The entire trajectory of the object (e.g., a vehicle) across multiple cameras may be determined by fusing data from multiple cameras across time, and object features, or attributes, may be attached to the trajectories (e.g., vehicle's make, model and license plate). Examples of approaches are described with respect to FIGS. 6A-6C.

In terms of the number of cameras used to track objects, and the number of objects being tracked, the architecture of the smart area monitoring system 100 may be highly scalable. The scale may be naturally increased since it lends itself to being deployed hierarchically. Several such architectures (for example at a block level) could be integrated into a holistic tracking system implemented centrally (e.g., at the city level in the cloud) that orchestrates the entire smart area monitoring system 100. Each instantiation would then represent a "cell" that works together to provide city wide coverage.

The distributed nature of the architecture may result in signature generation that is performed at the source (the area 200) while correlation and matching may be performed centrally by the semantic analysis system 104. This may allow the computational requirements to be spread out across the architecture and also provide resilience in case a single camera or perception server were to encounter a failure. The state manager 146 may store any of the various information about objects entering and being tracked by the various sensors in a central entity designated as a "tracking hub." The tracking hub may be responsible for storing tracking states (e.g., signatures), storing locations of objects over time (e.g., as global, or real-world coordinates). The state manager 146 may store state data of the area 200 (e.g., in the tracker hub or otherwise)—and optionally additional areas being monitoring—in a scalable, low latency database. The state data, or information, may include a collection of tuples containing time, location and visual signature parameters for each of the objects in the area(s) simultaneously. The inter-feed object tracker 138 may be a service implemented in a redundant manner across several nodes, thereby providing high availability.

The architecture may provide for identifying vehicles even if they were sporadically not visible to one or more cameras within the system due to gaps in coverage. It may achieve this, based at least in part, on applying spatio-temporal constraints while correlating different sightings. These constraints may be based on static inputs (such as maps, road layouts) and dynamically generated information such as movement of other vehicles in the system during the periods of interest.

The signature generation and comparison functionality of the semantic analysis system 104 may be integrated into the rest of the architecture in a decoupled manner, allowing for it to be replaced or modified without perturbing the rest of the architecture.

The semantic analysis system 104 may be implemented as a software stack for real-time streaming and batch analysis that includes an event fabric and big data stack for scalable distributed asynchronous solutions. The semantic analysis system 104 may, for example, be implemented on one or more server devices (e.g., on the cloud). Further, whereas the perception system 102 may be positioned locally or proximately (e.g., on-premises) relative to an area to be monitored, such as the area 200 of FIG. 2, the semantic analysis system 104 may be positioned remotely or distant from at least one area to be monitored, such as the area 200 of FIG. 2.

In some examples, the multiple instances of the perception system 102 may be deployed at different locations, such as at different parking structures and/or other areas to be monitored. As another example, different floors of the same parking structure may include an independent deployment of the perception system 102. A single instance of the semantic analysis system 104 may receive metadata from any of the various instances of the perception system 102, and may track states of the different perception systems together (e.g., using a common time-stamping, state tracking, etc.) to provide cross-area aggregation and analysis of the metadata. The different instances of the perception system 102 may be similar to or different than one another. For example, each may generate and provide metadata to the semantic analysis system 104, but the way the metadata is generated (e.g., using one or more of the data processing pipelines 170 and/or 172) and/or the format of the metadata may vary.

The semantic analysis system 104 (e.g., the communications manager 150) may expose an API for visualizations of the areas being monitored by the smart area monitoring system 100 (e.g., the area 200). The visualization generator 152 and the presentation manager 154 of the visualization system 106 may seamlessly consume data about the objects detected (e.g., vehicles), their features or attributes (e.g., make, model, color) and their global coordinates (e.g., longitude and latitude). This may include the communications manager 150 of the semantic analysis system 104 continuously feeding information about changes in the environment as, for example, vehicles move around in the area 200. The components of the visualization system 106 may also have the ability to fetch a state(s) of one or more areas that is determined by the state manager 146 at any previous time t (for a historical stream(s)) or current time (for a live stream(s)).

The visualization system 106 may be implemented using an asynchronous protocol for communicating data from a server to a client application (e.g., a web browser), such as web-sockets. The client may initially send a time(s) at which a state(s) of an area (e.g., the area 200) is to be displayed (e.g., a startTimestamp) and a location(s) (e.g., a level of a parking garage, a sub-area, etc.). The asynchronous protocol endpoint may send a query to the query engine 144 (e.g., at a data store) and based on the query, the communications manager 150 of the semantic analysis system 104 may continuously send updates (e.g., from the data store) to the visualization system 106 at periodic intervals (e.g., less than 10 updates per second, such as 2 updates per second) to the visualization system 106. These updates may have the following format:

```
{
   "timestamp": "2018-02-28T00:36:00.253Z"
   "vehicles": [
      {
         "color": "blue",
         "garageLevel": "P1",
         "id": "CarID1",
         "licensePlate": "ABCDEF",
         "licenseState": "CA",
         "orientation": 331.6863802591925,
         "state": "moving",
         "removed": 0,
         "make": "Audi",
         "model": "A4",
         "type": "Sedan",
         "x": -3.908655765221166,
         "y": -59.16542559052793,
         "lat": 37.371139363582714,
         "lon": -121.96720241187167,
            "highlight": true,
            "overlayText": "Vehicle stalled on aisle"
      },
      ...
   ]
}
```

A list of vehicles, their attributes and possible text to be displayed (e.g., in case of an anomaly detected by the anomaly detector 140) may be indicated in this format. The amount of data sent to the visualization system 106 may also be reduced. For example, if the object stays in the same position for a long duration (e.g., is parked) and the attributes or text does not change, no updates may be sent. The visualization system 106 may request (e.g., query) at any point for data from any timestamp, at which point a server(s) of the semantic analysis system 104 may seamlessly start streaming the data.

The visualization system 106 may use the updates to update a 3D rendering of the area with one or more objects. While the updates may be periodic, the 3D rendering may interpolate one or more updated values (e.g., location and orientation data of an object) in order to display a smoother transition. Using this approach, the bandwidth required for sending the updates may be much lower than what would be needed to stream videos, and may impose lower load on the network. This approach may also facilitate generating the visualizations however the client and/or host sees fit (e.g., privacy preserving, lighting effects) immaterial of how image data used to generate the metadata was captured.

Examples of ROI Occupancy Detection

The present disclosure provides, in part, various approaches for determining whether particular spots and/or other ROIs of an area are occupied. These approaches are described with respect to the smart area monitoring system 100 of FIG. 1A and the area 200 by way of example only and may be implemented in any suitable system. Further, in some examples, the smart area monitoring system 100 may use different approaches for determining whether particular spots and/or other ROIs of an area are occupied (e.g., using the occupancy determiner 116).

As mentioned herein, the occupancy determiner 116 may be configured to determine occupancy statuses with respect to one or more ROIs represented in the sensor data 162. The occupancy determiner 116 may analyze image data (and optionally other sensor data, such as associated puck sensor data) to determine one or more occupancy statuses of one or more designated ROIs represented at least partially in the image data. For example, the occupancy determiner 116 may be used to determine occupancy statuses for one or more of the spots, aisles, aisle regions, and/or other designated ROIs in the smart area monitoring system 100. An occupancy status for an ROI may generally indicate whether an object is occupying the ROI and/or an amount the object is occupying the ROI. In some examples, the occupancy status may include a binary value, or flag, indicating whether an ROI is occupied (e.g., 0 for unoccupied, 1 for occupied). In further examples, the occupancy status may include a level of confidence, or a confidence score, indicating a computed confidence in whether an ROI is occupied. The confidence score may, for example, range from 0 for a lowest confidence the ROI is occupied (and/or conversely a highest confidence the ROI is unoccupied) to 1 for a highest confidence the ROI is occupied (and/or conversely a lowest confidence the ROI is unoccupied).

Figure 4D:
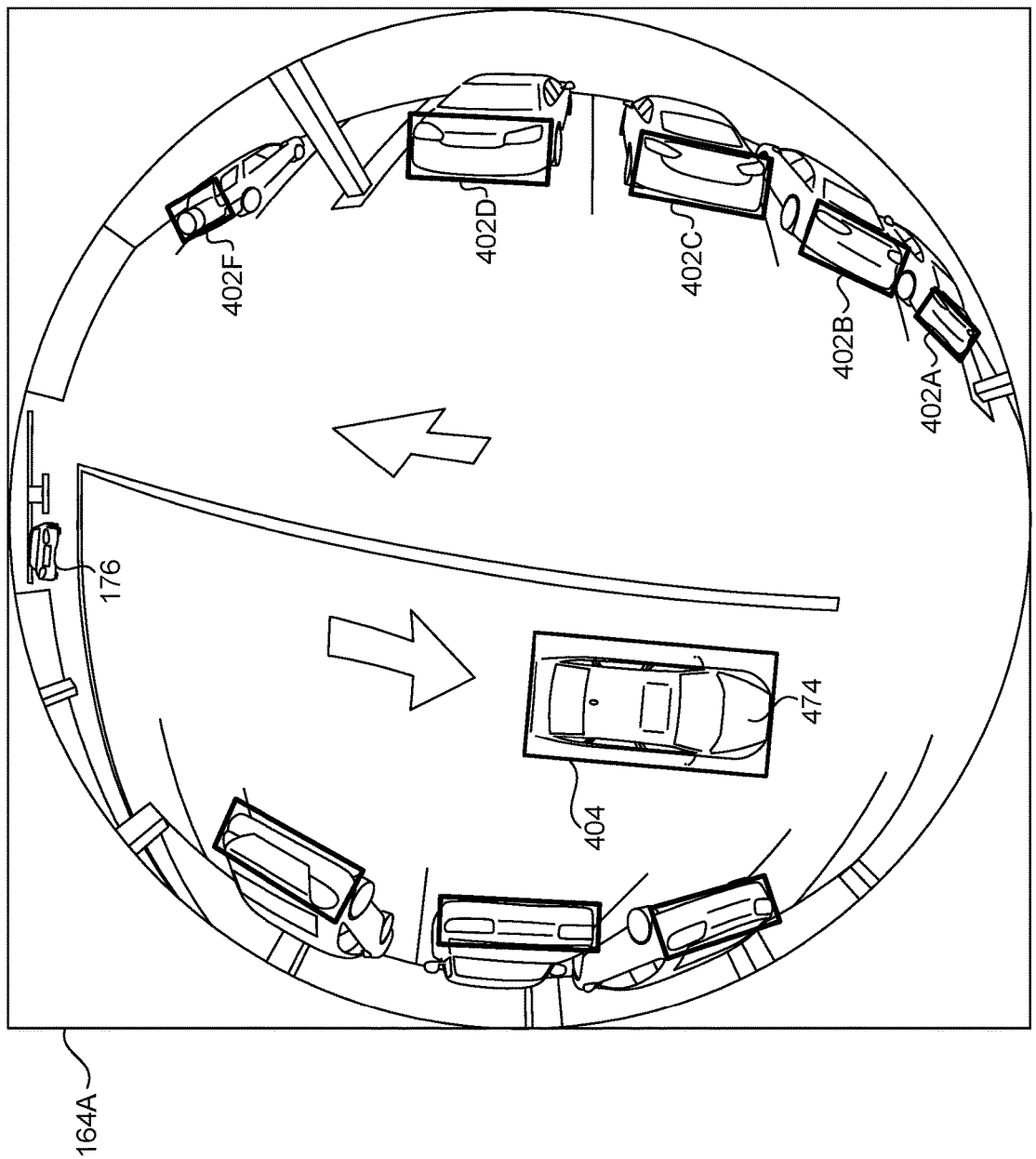
FIG. 4D is a diagram used to illustrate examples of detecting the occupancy of ROIs, in accordance with some embodiments of the present disclosure.

While image data representative of surfaces may be analyzed to determine occupancy statuses, such as the surfaces 302, 304, and 406, the occupancy determiner 116 may generally operate using any suitable image data, such as image data representative of the image 164A, the image 164B, or the image 164C. FIGS. 4A, 4B, 4C, and 4D are used to illustrate examples of detecting the occupancy of ROIs, in accordance with some embodiments of the present disclosure. For example, FIG. 4A may correspond to examples where the ROIs are spots, such as the parking spots 202A, 202B, 202C, 202D, 202E, and 202F. FIG. 4B may correspond to examples where the ROIs are aisles and/or aisle regions, such as the aisle region 216B and/or the aisle 216. FIG. 4C may correspond to examples where the ROIs are entrances or exits, such as the entrance 252B. FIG. 4D may correspond to other examples where the ROIs are spots, such as the parking spots 202A, 202B, 202C, 202D, 202E, and 202F. For example, FIG. 4D may be similar to FIG. 4A, but where occupancy detection is performed on image data representative of a fisheye image, whereas FIG. 4A may correspond to where occupancy detection is performed on image data representative of a non-fisheye image and/or a dewarped image.

Generally, the image data may be representative of an image that corresponds to a field(s) of view of one or more sensors, such as a camera. For example, the image may depict at least a portion of the field of view of a camera. Further, at least a portion of the field of view(s) that correspond an image may include, cover, or otherwise correspond to one or more ROIs of an area. In various examples, the ROI(s) included in the image data may be based at least in part on ROI calibration settings from the ROI calibrator 124 and/or the camera calibration settings from the camera calibrator 130. For example, the ROI calibration settings may define a set of one or more ROIs for a particular feed, sub-feed, and/or sensor(s).

As an example, the camera 234 may have a fixed field of view such that the field of view always includes at least the parking spots 202A, 202B, 202C, 202D, 202E, 202F. Thus, the ROI calibration settings may specify that the occupancy determiner 116 is to determine occupancy statuses for at least one or more of the parking spots 202A, 202B, 202C, 202D, 202E, 202F for a feed or sub-feed that corresponds to the image 164A and/or the surface 302. In the example of FIG. 4A, the set of ROIs may be associated with the surface 302 (e.g., defined by the camera calibration settings), which may be configured to always include the parking spots 202A, 202B, 202C, 202D, 202E, 202F (or may be used to indicate when the surface 302 includes one or more of the parking spots 202A, 202B, 202C, 202D, 202E, 202F).

The occupancy determiner 116 may determine, from the image data, a region(s) of the field of view that include at least a portion of the object. For example, the region(s) may be based at least in part on locations of detected objects (e.g., in image space) from the object detector 114, such as the bounding boxes. The occupancy determiner 116 may use the regions to determine occupancy statuses of ROIs associated with the image data. For example, the occupancy determiner 116 may use the bounding boxes 402A, 402B, 402C, 402D, 402F, and 414 to determine occupancy statuses for the parking spots 202A, 202B, 202C, 202D, 202E, and 202F associated with the surface 302. Similarly, the occupancy determiner 116 may use the bounding box 404 to determine an occupancy status for the aisle region 216B associated with the surface 406, or the bounding box 420 to determine an occupancy status for the entrance 252B (and/or an entrance region 270, which is optional and not labeled in FIG. 4C) associated with the image 164B.

To determine occupancy statuses of ROIs associated with the image data using a region, the occupancy determiner 116 may compare the region to one or more of the set of ROIs associated with the image data (e.g., of the field(s) of view of the camera(s)). The comparison may be based at least in part on a location(s) of the region (e.g., associated with the object detection) and a location(s) of the one or more ROIs (e.g., in image space). The occupancy status of an ROIs may be based on the comparison indicating whether the location(s) of the region corresponds to the location(s) of the ROI (e.g., the ROI is occupied) or the region does not correspond to the location(s) of the ROI (e.g., the ROI is not occupied). For example, the level of confidence, or confidence score, for the ROI may be based at least in part on the comparison, such as an amount or level of similarity between the locations. Other factors may be used to compute and/or determine the confidence score, such as a confidence value associated with a detection of the region (e.g., output by the object detector 114) and/or a detection of an object in the ROI using a puck sensor.

In some examples, the comparison for an ROI includes the occupancy determiner 116 determining an amount of intersection, overlap, and/or proximity between the region and the ROI. For example, with respect to FIG. 4A, the location of the parking space 202A in FIG. 4A that is compared to the bounding boxes 402A, 402B, 402C, 402D, 402F, and/or 414 may be a location of an ROI indicator line 404A (e.g., in image space). The amount of intersection, overlap, and/or proximity between the ROI indicator line 404A and the bounding box 402A may correspond to the amount (e.g., the length, extent, or other measurement) of the ROI indicator line 404A that is within the bounding box 402A. For example, the occupancy determiner 116 may determine a length of the intersection and/or overlap and a maximum length 406A of an ROI indicator line that could intersect with the bounding box 402A (e.g., the diagonal along a direction of the ROI indicator line 404A). The occupancy determiner 116 may then compute a ratio between the maximum length 406A and the length of the intersection and/or overlap. Where the ratio exceeds a threshold value (e.g., >0.5), the occupancy determiner 116 may determine the parking spot 202A is occupied and set the occupancy status accordingly. Additionally or alternatively, the confidence score for the parking spot 202A may be based at least in part on the ratio. In various examples, a confidence score may be computed for each object detection. Also, a confidence score may be proportional to the length of the ROI indicator line 404A within the bounding box. Maximum confidence may be obtained if the bottom and top sides of the bounding box is cut by the ROI indicator line 404A.

With respect to FIG. 4B, a similar or different approach may be used by the occupancy determiner 116. For example, the location of the aisle region 216B and/or the aisle 216 that is compared to the bounding box 404 may be a location of the aisle region 216B (e.g., in image space as shown in FIG. 4B). Thus, rather than an ROI indicator line, the occupancy determiner 116 may use a polygon or other shape that is representative of a location(s) of an ROI. The amount of intersection, overlap, and/or proximity between the aisle region 216B and the bounding box 404 may correspond to the amount (e.g., the area, length, or extent) of the aisle region 216B that is within the bounding box 404. For example, the occupancy determiner 116 may determine an area or length of the intersection and/or overlap and a maximum area or length of the aisle region 216B that could intersect with the bounding box 402A (e.g., the area of the bounding box 404). The occupancy determiner 116 may then compute a ratio between the maximum area or length and the area or length of the intersection and/or overlap. Where the ratio exceeds a threshold value (e.g., >0.5), the occupancy determiner 116 may determine the aisle region 216B is occupied and set the occupancy status accordingly. Additionally or alternatively, the confidence score for the aisle region 216B may be based at least in part on the ratio. Where a length is used, the ratio may be determined similar to the approach described for the ROI indicator line 404A. Further, in various examples, the location(s) of the aisle region 216B may be represented using one or more ROI indicator lines and/or the location(s) of the parking spot 202A may be represented using one or more polygons or other shapes.

In examples where the occupancy determiner 116 determines occupancy statuses for an entrance and/or exit of the area 200, such as using the image 164B, it may use similar or different approaches as described with respect to the surface 302 and the surface 406.

To determine an occupancy status for an ROI, the occupancy determiner 116 may employ separation data from the separation calibrator 126 to determine and/or define one or more areas in the field(s) of view of the sensors and/or images that may contain ROIs. For example, for the surface 302, the separation data from the separation calibrator 126 may define an area below the separation line 410 and/or the area to the left of the separation line 412 as containing the set of ROIs for the surface 302 (e.g., in image space). In some examples, the separation data is representative of one or more separation lines that defines the area, such as the separation line 410 and/or the separation line 412. Any number of separation lines may be provided in the separation data. While the separation line 410 spans horizontal edges of the surface 302 and the separation line 412 spans vertical edges of the surface 302, in other examples, one or more separation lines may span a horizontal and vertical edge. Also while separation lines are used to define areas in some examples, separation polygons or other shapes may be used to define the areas.

In determining occupancy statuses for a set of ROIs using an image, the occupancy determiner 116 may, for example, discard the regions associated with detected objects that fall outside of the area(s) defined by the separation data. For example, the occupancy determiner 116 may only compare the ROI indicator lines of FIG. 4A to bounding boxes that are within the area. Thus, bounding box 414 may not be compared to a location(s) of an ROI, thereby preserving processing power. This may be beneficial to filter out objects detected in regions of the area 200 that do not correspond to surface 302. For example, another row of parking spots may be visible in an image or surface behind a row of parking spots that includes the set of ROIs being monitored using the image or surface. This may often result in vehicles being detected in the image or surface from the other row of parking spots (e.g., when the object detector 114 is trained to identify the front or read of a vehicle). The separation line 410 may be used to quickly discard these detections. Similarly, more parking spots may be visible in an image or surface from the row of parking spots that includes the set of ROIs being monitored using the image or surface. This may often result in vehicles being detected in the image or surface from the other parking spots. The separation line 412 may be used to quickly discard these detections. For example, the parking spot 202G may be visible to the camera 234 as indicated in FIG. 4A, but sensor data from the camera 232 may be used to determine an occupancy status for the parking spot 202G. While separation data is described as being used for determining occupancy statuses for spots, they may also be used for aisles and/or other types of ROIs.

In any example, the occupancy determiner 116 may be implemented using an MLM(s), such as a neural network. The MLM(s) may receive any combination of the inputs, such as an image (e.g., to a CNN), an ROI indicator line(s) and a corresponding bounding box(es), a separation line(s), etc., and may output a confidence score(s) for a ROI(s).

Figure 5:
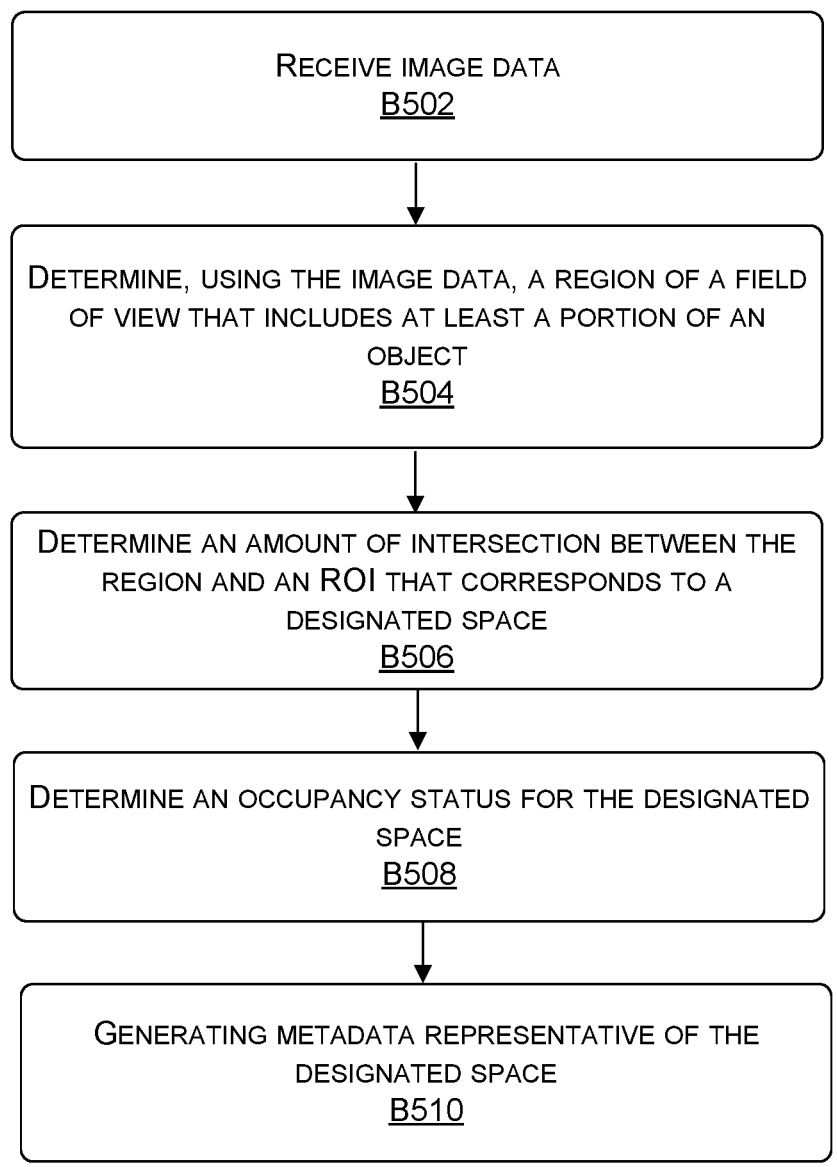
FIG. 5 is a flow diagram showing the method for detecting the occupancy of an ROI, in accordance with some embodiments of the present disclosure.

FIG. 5 is a flow diagram showing the method 500 for detecting the occupancy of an ROI, in accordance with some embodiments of the present disclosure. The method 500 may apply to the examples of any of FIGS. 4A, 4B, 4C, 4D, or other examples.

The method 500, at block B502, includes receiving image data. For example, the communications manager 136 of the perception system 102 may receive the sensor data 162 from one or more sensors. The sensor data may include image data representative of a field of view of at least one image sensor, such as the camera 234. The field of view may include the objects 450A, 450B, 450C, 450D, and 450F and the parking spots 202A, 202B, 202C, 202D, 202E, 202F, and 202G of the area 200.

The method 500, at block B504, includes determining, using the image data, a region of a field of view that includes at least a portion of an object. For example, the object occupancy determiner 116 may determine, from the image data, regions of the field of view that include at least a portion of the objects 450A, 450B, 450C, 450D, and 450F. The regions may correspond to the bounding boxes 402A, 402B, 402C, 402D, and 402F of FIG. 4A, which may be determined using the object detector 114.

The method 500, at block B506, includes determining an amount of intersection between the region and an ROI that corresponds to a designated space. For example, the occupancy determiner 116 may for the region corresponding to the bounding box 402A, an amount of intersection between the region and an ROI of the field of view that corresponds to the parking space 202A. To do so, the occupancy determiner 116 may determine an amount of the ROI indicator line 404A that falls within the bounding box 402A. A similar approach may be used for each of the bounding boxes 402A, 402B, 402C, 402D, and 402F and the ROI indicator lines 404A, 404B, 404C, 404D, and 402F.

The method 500, at block B508, includes determining an occupancy status for the designated space. For example, the occupancy determiner 116 may determine an occupancy status for the parking spot 202A based at least in part on the amount of intersection of the ROI indicator line 404A with the bounding box 402A. A similar approach may be used for each of the parking spots 202A, 202B, 202C, 202D, and 202F. For example, the occupancy determiner 116 may determine that the parking spots 202A, 202B, 202C, 202D, and 202F are each occupied. The occupancy determiner 116 may also determine the parking spot 202E is not occupied based at least in part on none of the bounding boxes 402A for the surface 302 intersecting with the ROI indicator line 404E.

The method 500, at block B510, includes generating metadata representative of the designated space. For example, the metadata manager 132 may generate metadata that indicates and/or is representative of the occupancy status for any of the parking spots 202A, 202B, 202C, 202D, 202E, and 202F.

In some examples, the occupancy determiner 116 may use one or more MLMs, such as a convolutional neural network with, for example, a Long-Short-Term-Memory (LSTM) architecture, to determine occupancy statuses for one or more ROIs. The MLM(s) may be trained in a supervised fashion by data representative of a diversity of views from the cameras, including differing lighting conditions and various backgrounds naturally occurring in the observed structure or area. In these examples, the calibration data from the ROI calibrator that is used by the occupancy determiner 116 may correspond to the trained MLM. For example, images from a camera(s) may be provided as input to a MLM (e.g., to a CNN with an LSTM), and the MLM may be trained to output an occupancy status for one or more ROIs corresponding to the images. As an example, for an image, the MLM may output a sequence of occupancy status (e.g., 0, 0, 1, 0, 0, etc.). The example output above may be interpreted as having 2 empty spots on the left of a camera's FoV, one vehicle parked in the middle, and two spots empty to the right. Using a MLM may simplify the determination of calibration data used to determine occupancy statuses.

Though well-suited for data acquisition and automated analysis, usage of the fish-eye lenses for 360-degree imaging create images that then have to be dewarped for human observers to recognize objects in the video frames. This represents an additional processing step and corresponding consumption of a certain amount of computational resources. According to alternative embodiments, a method is provided to directly detect objects using deep learning methods.

To detect objects directly, preferred embodiments directly train a Convolutional Neural Network (CNN) to determine localization of objects in the scene, thereby reducing the need for a dewarper. Traditional CNN training uses an image which is rectangular, say with height of 1080 pixels, and width of 1920 pixels. A convolutional mask is normally a square such as 3×3 or 5×5 pixel mask. After a few layers for feature calculation, the next stage is used for object detection. During this stage, "proposals" are made for deciding if a desired object is present or absent. These region proposals are invariably rectangular and are aligned with the image edges. In other words, all sides of the rectangle are parallel to the sides of the image.

Though well-suited for data acquisition and automated analysis, usage of the fisheye lenses for 360-degree imaging may create images that then have to be dewarped for human observers to recognize objects in video frames. Further, certain computer vision algorithms may be simpler to implement on non-fisheye images, such as dewarped fisheye images. This represents additional processing and corresponding consumption of computational resources. According to some examples described herein, the object detector 114 may detect objects from fisheye images using deep learning methods. This may allow the smart area monitoring system 100 to avoid dewarping images, such as the image 164A. For example, the data processing pipeline 170 may be implemented without dewarping the image 164A. The sensor data processor 112 may or may not still extract surfaces from images, or may extract fewer surfaces, which may still be warped.

The object detector 114 may detect one or more objects from a fisheye image one or more neural networks, such as using deep learning methods. To do so, the object detector 114 may use a trained a CNN to determine localization of objects in an image, thereby reducing or eliminating the need for a dewarper or dewarping process.

In contrast, the present disclosure provides, in part, for increasing the degree of freedom for the bounding box around an object. For example, the rectangle may be rotated, such that the sides may not be parallel to the sides of the image. FIG. 4D depicts examples of bounding boxes that may be output by the object detector 114 from the image 164A using these approaches. By allowing the shapes to rotate, they may more realistically fit to an object (e.g., the back or front of a car) in a warped image. This may be achieved by training the object detector 114 using rotated bounding boxes.

Additionally or alternatively, the bounding boxes may not be limited in shape to rectangles. Instead, other polygons (e.g., parallelograms) may be used, so that the four angles are no longer constrained to be 90-degrees. In further examples, the polygons may include more than 4 sides. This may allow a better fit to an object (e.g., the back or front of a car). Also, the convolutional mask of the object detector 114 may not be a square, and other shapes may be used instead. Using these approaches, in addition to omitting dewarping of images, the smart area monitoring system 100 may also not need to reference extrinsic or intrinsic camera parameters. Thus, the camera calibrator 130 may not need to calibrate the cameras and the camera calibration data may be inherent in the trained neural network(s) of the smart area monitoring system 100. For example, this may be used to avoid manual determination and calibration of camera parameters, which may be a time-consuming process, particularly when the number of deployed cameras is large, and especially since environmental factors may cause the cameras to be inadvertently re-positioned or re-oriented from their calibrated condition, and require readjustment or additional calibration.

Thus, in various examples, as opposed to conventional CNNs where the search space for objects is confined to rectangles whose sides are parallel to the image sides, the disclosure provides for bounding boxes that may be a general shape polygon allowing for rotation, for non 90-degree angles, for more than 4 sides, and the use convolutional masks that may not be rectangular themselves. This may result in the object detector 114 finding objects, such as backs or fronts of cars, that are much better defined than would be using conventional CNNs with the CNNs learning to detect cars without assuming that cars are always horizontal on a flat surface. The object detector 114 using any of these various unconventional approaches may be used for general purpose object detection, and is not limited to use in detecting cars or other objects in the smart area monitoring system 100.

Examples of Calibrating ROIs

The calibration data provided by the ROI calibrator 124 may, for example, use specific parameters to represent locations of one or more of the ROIs (e.g., aisles) as a grid of discrete, contiguous rectangular zones. The calibration data provided by the ROI calibrator 124 may also use coordinates in image space to represent locations of one or more other ROIs (e.g., parking spaces). Each ROI (e.g., corresponding to a parking space and aisle regions) may be mapped to real world space by the global location determiner 122.

The ROI calibrator 124 may, in some examples, be used to calibrate the ROIs in a feed, a sub-feed, and/or a field(s) of view of a camera. For example, the ROI calibrator 124 may be used to calibrate a location(s) of the ROIs, such as the locations of the ROI indicator lines 404A, 404B, 404C, 404D, and 402F, and/or the aisle region 216B used by the occupancy determiner 116. The ROI calibrator may operate at any suitable time, such as prior to, after, or during deployment of the smart area monitoring system 100. In various examples, the ROIs may be dynamically updated while the smart area monitoring system 100 is deployed and operated and/or using data collected during the deployment and operation.

In some examples, this calibration may be performed automatically by the ROI calibrator 124. An example is described with respect to the ROI indicator line 404A and the parking space 202A, but a similar approach may be used for other ROIs. The sensor data processor 112 may receive image data representative of the field of view of the camera 234 at different times, such as over a period of time (e.g., a day, a week, and month, etc.). The object detector 114 may be used to determine regions in the field of view that correspond to detected objects from images that correspond to the different times. For example, the object detector 114 may analyze the surface 302 at different times to determine bounding boxes similar to the bounding box 402A as vehicles park and leave the parking space 202A. The ROI calibrator 124 may learn the location of line-based ROIs based on the assumption that most vehicles are parked properly, and each spot gets occupied for a minimum time span in the duration over which it is trained. For example, where a spot is not occupied for a minimum duration of time, a detection may be discarded, or weighted lower in determining an ROI. As a further example, where a spot is not occupied for a minimum duration of time an object may not be detected.

Because different vehicles may park in the parking space 202A, and other factors, the bounding boxes may have different shapes, sizes, and/or locations within the surface 302 and/or the field of view. For example, one of the bounding boxes may be similar to the bounding box 402A, but closer to the bottom or top of the surface 302, another may be similar, but smaller either horizontally or vertically, etc. The ROI indicator line 404A may correspond to an aggregation of one or more of the regions associated with the detected objects. For example, the ROI indicator line 404A may correspond to a combination (e.g., average) of diagonals (e.g., maximum diagonals) of any number of the bounding boxes (similar to the maximum length 406A). To determine the ROI indicator line 404A, the ROI calibrator 124 may, for example, average or otherwise statistically combine the bounding box coordinates and use the diagonal of the average bounding box (using a weighted average or otherwise).

For example, with the knowledge that the surface 302 is to include six ROIs, a clustering algorithm may be configured to cluster the detected object locations into six clusters (e.g., using k-means), or at most six clusters. The object locations within a cluster may then be combined to form a representative ROI for a designated spot. For example, where a particular object or similar object (e.g., same make and model of vehicle) occupies the field of view at a higher frequency than a sufficiently different object, the ROI indicator line 404A may resemble that particular object or similar object more than the different object. This may, for example, result in the system learning which spots are designated for compact vehicles vs. larger vehicles, such as SUVs, and/or to trigger alerts when objects that are too large or too small are occupying a spot. This concept may be extended to warehouses to determine when the wrong objects may be placed on a shelf.

In some examples, a location of a designated spot may be known and a cluster and/or object locations closest to the designated spot (and/or within a threshold distance) may be used to determine the ROI for the spot. Additionally or alternatively, the locations of the designated spots may be used as inputs to the clustering algorithm. Also, in some cases a designated spot could be created and registered with the system for one or more of the clusters and/or determined ROIs. In some cases, an ROI may not be determined for and/or assigned to a designated spot where the frequency of occupancy is below a threshold value. For example, where a cluster has less than a threshold number of observations, an ROI may not be determined from the cluster. As a further example, a designated number of clusters may be selected based at least in part on the frequency of occupancy, such as the six clusters with the top number of object detections for a surface and/or field of view known to include six spots.

Also, as indicated herein, the cluster, or groups of detections used to learn ROIs and/or designated spots, and/or object detections used to detect occupancy apart from the training, may be used to learn typical attributes of objects for particular ROIs, and the anomaly detector 140 may compare detected objects occupying the ROIs and/or designated spots to the learned attributes to trigger anomalies. For example, the anomaly detector 140 may learn typical object sizes (e.g., to detect a large vehicle in a compact spot), orientations, locations (e.g., to detect a vehicle parked between two spots), durations of occupancy (e.g., to detect a vehicle that may be exceeding a time limit for a spot), frequencies of occupancy (e.g., the same vehicle parked frequently may indicate a reserved spot and may be detected via a license plate), etc.

As another example, the diagonals of the bounding boxes may be determined and statistically combined to form the ROI indicator line 404A. While the ROI indicator line 404A is used as an example, similar approaches may be used where a location(s) of an ROI corresponds to a shape or polygon to statistically derive one or more dimensions of that shape or polygon. The diagonals of the bounding boxes generated for vehicles to the left of the center of the field of view may be slanted to the right in a "/" shape, those to the right of the center may be slanted in a "\" shape, and those in the middle in a "I" shape. Bounding box calculation may be used to determine occupancy with respect to the ROI indicator line 404A since parking lane markings (e.g., lines on a floor of a parking area) may not be reliable for determination of spot occupancy due to occlusions and other properties that do not carry over from the 3D world to the 2D images.

The present disclosure may provide a self-learning algorithm that can be used by the occupancy determiner 116 to determine if a spot is full or empty. While a rectangular ROI for a parking space may be used, in some cases it may be unwieldy, such as due to the perspective distortion in 360-degree images for examples that use fisheye lenses. The may lead to an ROI that occupies portions of multiple spots. The line-based ROI, such as the ROI indicator line 404A may alleviate these challenges and may be adapted for different sizes of vehicles. A line-based ROI may, for example, have an angle with the vertical which is one half of the angle of the hypotenuse to the vertical.

In addition to or instead of automatic calibration, the ROI calibrator 124 may be used to at least partially manually calibrate locations of one or more ROIs. For example, the calibration may be based at least in part on a 2-dimensional marking on the floor of the area 200 and the sensor data 162 and/or other sensor data, with a 3D object such as a vehicle is occupying a particular location, such as a parking spot. The sensor data may be from, without limitation, a camera mounted at a particular location in the area 200, such as on the ceiling of a garage. From the point of view of the sensor, the wheels of the vehicle may not be visible, while the vehicle itself may be clearly visible.

Because of the 3D nature of the field of view of the camera, if a marker, such as a bounding box is placed on the vehicle showing its back or its front at some distance above the ground, it may not be clear where the vehicle is actually parked depending on the angle of the camera. A solution to this problem may be implemented by using manual calibration for each camera defining an ROI, and if an object (e.g., a vehicle) is detected in such a way that the bounding box of its front or back intersects with the ROI, the corresponding spot may be characterized as occupied.

Examples of Calibrating Separation Data

In some examples, calibration of the separation data may be performed automatically by the separation calibrator 126. An example is described with respect to the separation line 410, but a similar approach may be used for other separation data. The sensor data processor 112 may receive image data representative of the field of view of the camera 234 at different times, such as over a period of time (e.g., a day, a week, and month, etc.). The object detector 114 may be used to determine regions in the field of view that correspond to detected objects from images that correspond to the different times. For example, the object detector 114 may analyze the surface 302 at different times to determine bounding boxes similar to any of the various bounding boxes of FIG. 4A as vehicles park and leave the parking spots. The separation calibrator 126 may learn the location of the separation line 410 based on the assumption that most vehicles are parked properly, and each spot gets occupied for a minimum time span in the duration over which it is trained.

Because different vehicles may park in the parking spaces, and other factors, the bounding boxes may have different shapes, sizes, and/or locations within the surface 302 and/or the field of view than what is shown in FIG. 4A. The separation line 410 may correspond to an aggregation of one or more of the regions associated with the detected objects across one or more of the parking spots. For example, separation line 410 may correspond to a combination of a height of any number of bounding boxes. To determine the separation line 410, the separation calibrator 126 may, for example, average, cluster, or otherwise statistically combine the bounding boxes into one or more groups (e.g., a group for each ROI). For example, with the knowledge that the surface 302 is to include six ROIs, a clustering algorithm could be configured to cluster the detected object locations into six clusters (e.g., using k-means), or at most six clusters. The separation line 410 may be based at least in part of the heights of the aggregated bounding boxes across the ROIs, such as along the tops of the bounding boxes. While the separation line 410 is used as an example, similar approaches may be used to derive other separation lines or to otherwise determine areas in which object detections may be analyzed to determine occupancy statuses for ROIs. Similar methods can be used to separate other parts of an image that may contain corners, junctions, traffic lanes, unusable portions of the structure or area, and generally all objects that are not of interest in determining occupancy statuses for ROIs.

In some examples, the object detector 114 may include a deep learning (DL) neural network deployed to perform inference on the sequence of images coming from a video camera and dewarped to produce the frame corresponding to the surface 302. The DL neural network may produce no output when there are no vehicles in the field of view of the camera 234. When a vehicle arrives and parks in a spot, the DL neural network may output a bounding box. As time passes the illumination in the environment may change due to changes in natural lighting, other ambient lighting (e.g., artificial lights), or due to additional reflective surfaces. Therefore, in each subsequent frame the location of the bounding box may be slightly modified. The separation calibrator 126 may average or cluster these bounding boxes to obtain a representative bounding box(es). Over time, a different vehicle may be parked in each spot, and the detections may vary in both size and exact location. These boxes may be averaged together to determine the separation line 410.

A particular example of an approach for determining a separation line follows. A specific time interval [0-t] during which the visible part of the garage goes from empty to full may be selected and image data that is representative of images from a camera from that time interval may be determined. The object detector 114 may inference, from the image data, the back or front of each parked vehicle (e.g., as bounding boxes). The median height of the ensemble of bounding boxes may be calculated by the separation calibrator 126. The maximum height above the lower edge of one or more of the images is measured to eliminate vehicles that are not in the row and effectively removing the effect of occluding pillars. The separation calibrator 126 may then calculate the separation line (e.g., the separation line 410) bisecting the angle formed by the vertical line and the second hypotenuse of the bounding box. The occupancy determiner 116 may use the intersection over the union of the separation line 410 and a bounding box to determine which vehicle is parked in which spot.

Examples of Camera Calibration

In examples where the sensor data processor 112 dewarps image data, the camera calibrator 130 may provide camera calibration data, which references camera-specific calibration data (parameters) used by the sensor data processor 112 to separate the portions of image data corresponding to aisles from the portions of the image data that correspond to designated spaces captured by a camera (and/or other types of surfaces). The camera calibration data may include camera intrinsic and/or extrinsic parameters.

Calibration may be performed by placing markers at known locations in the area 200, mapping the locations to image coordinates, and extrapolating correspondences for other image coordinates (including ROI coordinates) to coordinates in world space. Using the camera calibration data, pixel positions in an image captured at that specific camera may be mapped to real-world coordinates, thereby providing a translation between image coordinates to world coordinates. Each camera in a monitored area may have separate (unique) parameters for calibration. Once camera calibration is performed, ROIs of images generated by a particular camera may also be defined to correspond to specific regions (such as, without limitation, parking spaces, parking spaces designated for particular vehicles, portions of an aisle, etc.) in the real world.

In some examples, the sensor data processor 112 uses the calibration data to segment pixels and/or other data values from image data into the distinct surfaces using automated artificial intelligence techniques, such as computer vision or neural network inferencing. Where the sensor data processor 112 performed dewarping, this may be performed using cylindrical or other geometrical projections.

Examples of Object Trajectory Tracking

The present disclosure provides, in part, various approaches to tracking objects using multiple sensors that are distributed across an area, such as the area 200. These approaches may leverage both image data representative of fields of view of multiple image sensors, such as cameras, and spatial information regarding the area, to provide precise object tracking across the sensors. In addition, these approaches may allow for tracking of an object to be effectively handed-off as an object leaves one field of view and enters another, as well as effectively accounting for gaps in sensed data, such as where the object becomes obscured in a field of view or reenters the field of view from a gap in the sensed data. These approaches are described with respect to the smart area monitoring system 100 of FIG. 1A and the area 200 by way of example only and may be implemented in any suitable system. Further, in some examples, the smart area monitoring system 100 may use different approaches for tracking objects (e.g., using the occupancy inter-feed object tracker 138).

Approaches to tracking described herein may use image data from camera devices distributed throughout an environment, such as the area 200, and may be be extended over large areas such as a city where the size of the area(s) being observed surpasses the field of view of any single camera. Due to deployment constraints, there may be limited control on placement and area wide coverage of the cameras. Disclosed approaches provide solutions to query the presence and whereabouts of a particular object in an observed area of interest, as they traverse the area of interest, during which they may appear and disappear within the fields of view of the various cameras.

Disclosed approaches allow for re-identification and tracking of an object across multiple sensors using visual cues, location and speed of objects, and other information or attributes of detected objects and/or trajectories. In various examples, the system may consolidate the spatial, temporal and/or visual information from individual sensors to re-identify the objects in a wide-area. When two detections and/or trajectories are identified as the same object, the attributes of the same object that identifies with several detections may be transferred as one object. The attributes of the object may be one or more of an object identifier, a size, a vehicle license plate number, a make or model for a vehicle object, person information for a face detected in association with a vehicle (e.g., in, entering, and/or leaving), and/or other examples of attributes described herein.

In some respects, the intra-feed object tracker 120 of the perception system 102 may be used for per-stream, or feed, tracking (e.g., within the data processing pipelines 170 or 172). For example, each camera and/or sensor feed or sub-feed (e.g., captured image/video data) may be processed by the intra-feed object tracker 120. Any suitable "single camera tracking" methods may be used to maintain association of objects (e.g., object detections of from the object detector 114) between frames. Without loss of generality, each perception server may process more than one stream.

Figure 6A:
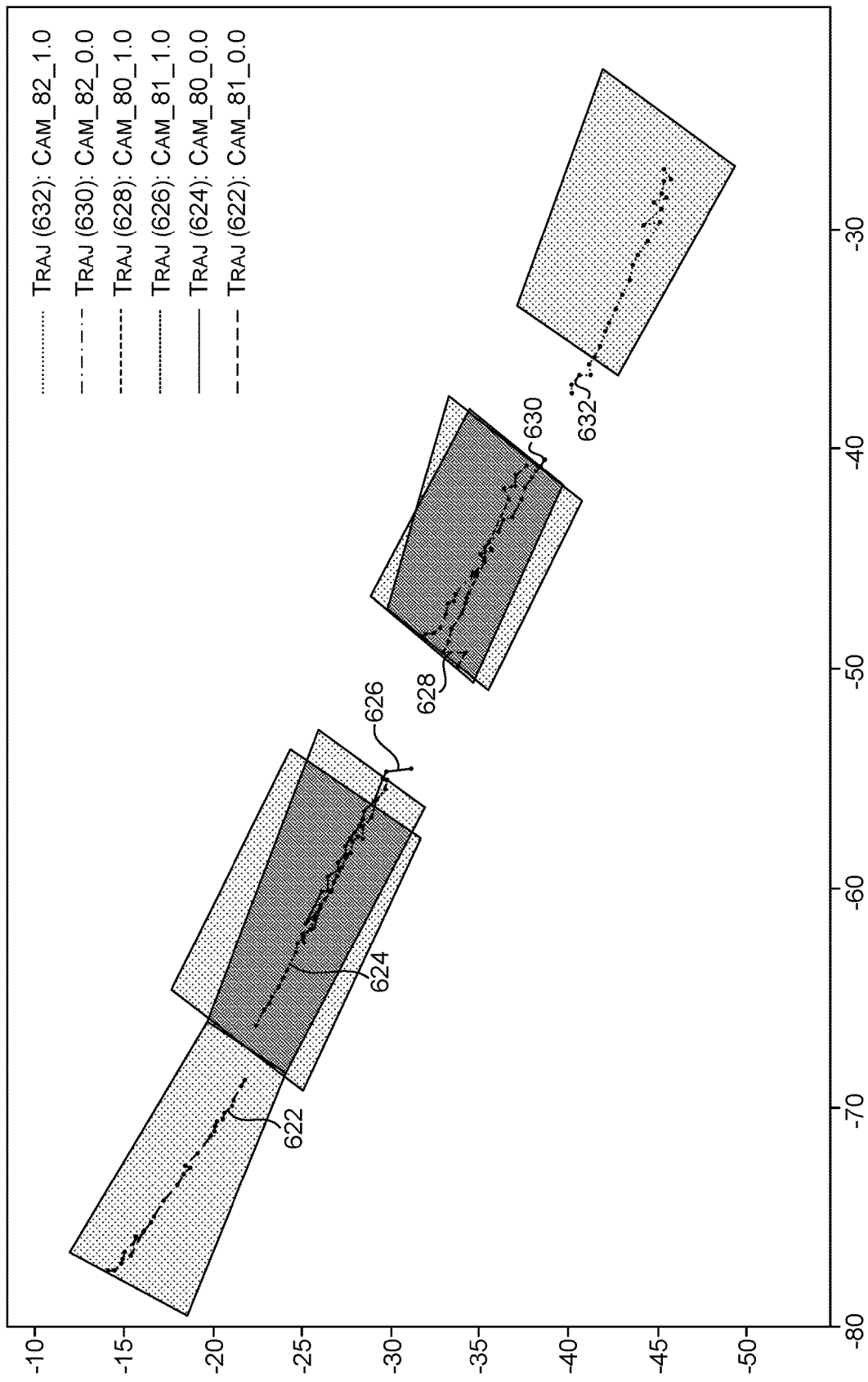
FIG. 6A illustrates a graph of examples of object trajectories which may be determined by sensors of a smart area monitoring system, in accordance with some embodiments of the present disclosure.

FIG. 6A illustrates a graph of examples of object trajectories which may be determined by sensors of a smart area monitoring system, in accordance with some embodiments of the present disclosure. Each of the trajectories 622, 624, 626, 628, 630, and 632 may correspond to the same object as it enters and exits the FoV of various sensors of the area 200. For example, the trajectories 622, 624, 626, 628, 630, and 632 may correspond to an object as it moves down an aisle(s). Each of the trajectories may, for example, be generated by the intra-feed object tracker 120 of an associated feed, or sub-feed. While trajectories are illustrated as points, the points may be based at least in part on bounding boxes, or other object detection regions generated using the object detector 114. For example, a point of a trajectory in FIG. 6A shown may represent multiple the four corners of a bounding box. Internally, the smart area monitoring system 100 may analyze trajectories by processing multiple points that correspond to an object detection, or may determine a single point for each object detection (e.g., a centroid of a bounding box).

Some of the trajectories 622, 624, 626, 628, 630, and 632 in FIG. 6A may be from the same feed, or sub-feed (e.g., the same surface and/or camera). For example, the object may have been at least partially obstructed from the FoV of a camera, resulting in the intra-feed object tracker 120 generating a new trajectory once the object reappeared (e.g., with a new local object identifier). Others of the trajectories 622, 624, 626, 628, 630, and 632 in FIG. 6A may include points that were generated concurrently while the object was located at the same real-world locations. For example, the FoV of different cameras may overlap, with the intra-feed object tracker 120 associated with each camera separately generating object trajectories.

The inter-feed object tracker 138 of the semantic analysis system 104 may be used to form a common trajectory for the object from the trajectories 622, 624, 626, 628, 630, and 632. For example, the inter-feed object tracker 138 may be used to determine the trajectories 622, 624, 626, 628, 630, and 632 of tracked objects actually correspond to the same object, and may "stitch" the trajectories together to form a single trajectory associated with a global object identifier of the object. Any object attributes and other metadata, which may be associated with the trajectory points (e.g., video frames) and the local object identifier of the intra-feed object tracker(s) 120 may be associated with corresponding trajectory points (e.g., video frames) and the global object identifier.

The inter-feed object tracker 138 may be used to track objects across streams, feeds, or sub-feeds. In the example of the smart area monitoring system 100, the inter-feed object tracker 138 is part of the semantic analysis system 104 and operates on the metadata generated by the perception system 102 (e.g., by associating time-stamped metadata and/or other frame-based data with a common object). In other examples, the inter-feed object tracker 138 may be implemented at least partially in the perception system 102 (and may optionally leverage computer vision for any of its various functionalities).

When the inter-feed object tracker 138 determines a detected object is a new object, the inter-feed object tracker 138 may assign a global tracking identifier to the object and begin tracking the object in the area 200. This may be based at least in part on the intra-feed object tracker 120 determining when an object enters the area 200. For example, this may occur at designated entries and/or exits to the area 200, such as the entrances 252A, 252B or the exits 250A, 250B. To illustrate the forgoing, the inter-feed object tracker 138 may assign a global tracking identifier to the vehicle 176 at the entrance 252B based at least in part on one or more object detections (e.g., by the object detector 114) of the vehicle 176 using image data from the camera 246.

As the object moves through the FoV of one camera and appears in the FoV of a new camera, or feed, the inter-feed object tracker 138 may establish the identity (e.g., global tracking identifier) of the object in that FoV based at least in part on the object already being present in the FoV of another camera. This may form a "chain of tracking" that enables the object to be "handed off" from one camera to the next as it traverses the area 200. For example, when the vehicle 176 reaches the aisle 220 from the entrance 252B, the inter-feed object tracker 138 may associate the global tracking identifier determined based at least in part on image data from the camera 246 with object information (e.g., metadata) determined based at least in part on image data from the camera 238. The vehicle 176 may similarly be handed off using the camera 238 and the camera 234 when the vehicle 176 enters the aisle region 216B from the aisle 220.

In some examples, the state manager 146 stores any of the various information about objects entering and being tracked by the various sensors in and data store(s), such as the tracking hub, that may be responsible for storing tracking states (e.g., signatures) and locations of objects over time (e.g., as global, or real-world coordinates). The state manager 146 may store state data of the area 200 (e.g., in the tracker hub or otherwise)—and optionally additional areas being monitoring. The state data, or information, may include a collection of tuples containing time, location and visual signature parameters for each of the objects in the area(s) simultaneously.

The inter-feed object tracker 138 may use the stored data to associate objects captured at various times in multiple cameras by applying signature matching and spatio-temporal considerations. The signature extraction and matching functionality may be integrated in a decoupled manner and may change over time.

Examples of Grouping Locations and/or Object Trajectories to Form an Object Trajectory Approaches described herein for determining object trajectories may use multiple sets of coordinates (e.g., global coordinates) of an object that are derived using image data for different fields of view. The coordinates may be grouped and used to create a tracked trajectory of the object in a monitored area, thereby accounting for potential errors in individual sets of coordinates, or duplicate trajectory data, which may result from deriving the coordinates from image data. For example, disclosed approaches may be used to create the single trajectory from the trajectories 622, 624, 626, 628, 630, and 632 of FIG. 6A. However, the disclosed approaches may more generally be performed on location coordinates which may not necessarily be part of a tracked trajectory, and which may have been generated using different sensors. Further, the location coordinates may be global or local coordinates in various examples.

Disclosed approaches may, for example, use multiple sets of location coordinates of an object that are derived using image data for different fields of view. For example, the location coordinates may be global coordinates from the global location determiner 122, or local coordinates (e.g., prior to being mapped to global coordinates). In any example, the location coordinates may correspond to points of a trajectory generated by the intra-feed object tracker 120 (e.g., the trajectory 630) and/or generated by the object detector 114 (e.g., without necessarily being formed into a trajectory).

In these approaches, first location coordinates of an object that correspond to first image coordinates of the object in a first field of view of at least a first image sensor and second location coordinates of the object in the monitored area that correspond to second image coordinates of the object in a second field of view of at least a second image sensor may be received. The first location coordinates and the second location coordinates may be grouped into a cluster based at least in part on evaluating associated attributes (e.g., generated by the object attribute determiner 118 and/or the object detector 114). The cluster may be used to generate a portion of a trajectory of the object in the monitored area.

By clustering the location coordinates, location coordinates that correspond to the same object, but detected in different fields of view (e.g., at approximately the same time), may be associated with one another and used to form a common trajectory of the object. For example, the cameras 228, 230, 232, 234, 236, 238 and other sensors may independently determine location coordinates based at least in part on object detections for a given time (or period of time). Each of these location coordinates may be associated with a same timestamp, for example. Some of these location coordinates may correspond to the same object, but detected using a different camera. Others of these location coordinates may correspond to different objects, such as different objects detected using the same camera. By clustering the location coordinates, sets of the location coordinates that correspond to the same object may reliably be determined and used to form a trajectory.

Various factors may be used to cluster the location coordinates, such as distances between the location coordinates. However, some location coordinates that are near one another may actually belong to different objects. For example, two vehicles or people may pass by one another in the aisle 216. Thus, using only distance based criteria may result in location coordinates the correspond to different real-world objects being associated with the same object. In various examples, by evaluating associated attributes of the location coordinates (e.g., generated by the object attribute determiner 118 and/or the object detector 114), the location coordinates may be more reliably grouped. Thus, more accurate trajectories may be formed from the location coordinates. For example, a group of location coordinates may correspond to a single point and time of a common trajectory. Location coordinates from a subsequent time, or period of time, may similarly be grouped and added to the trajectory to extend the trajectory for an object.

Figure 6B:
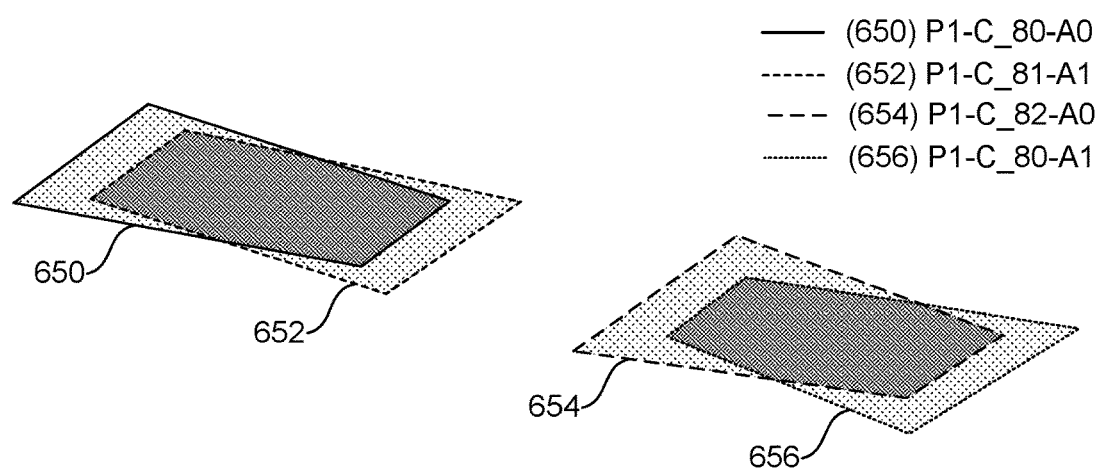
FIG. 6B illustrates a graph of examples of locations of detected objects which may be grouped into common objects, in accordance with some embodiments of the present disclosure.
Figure 6B:
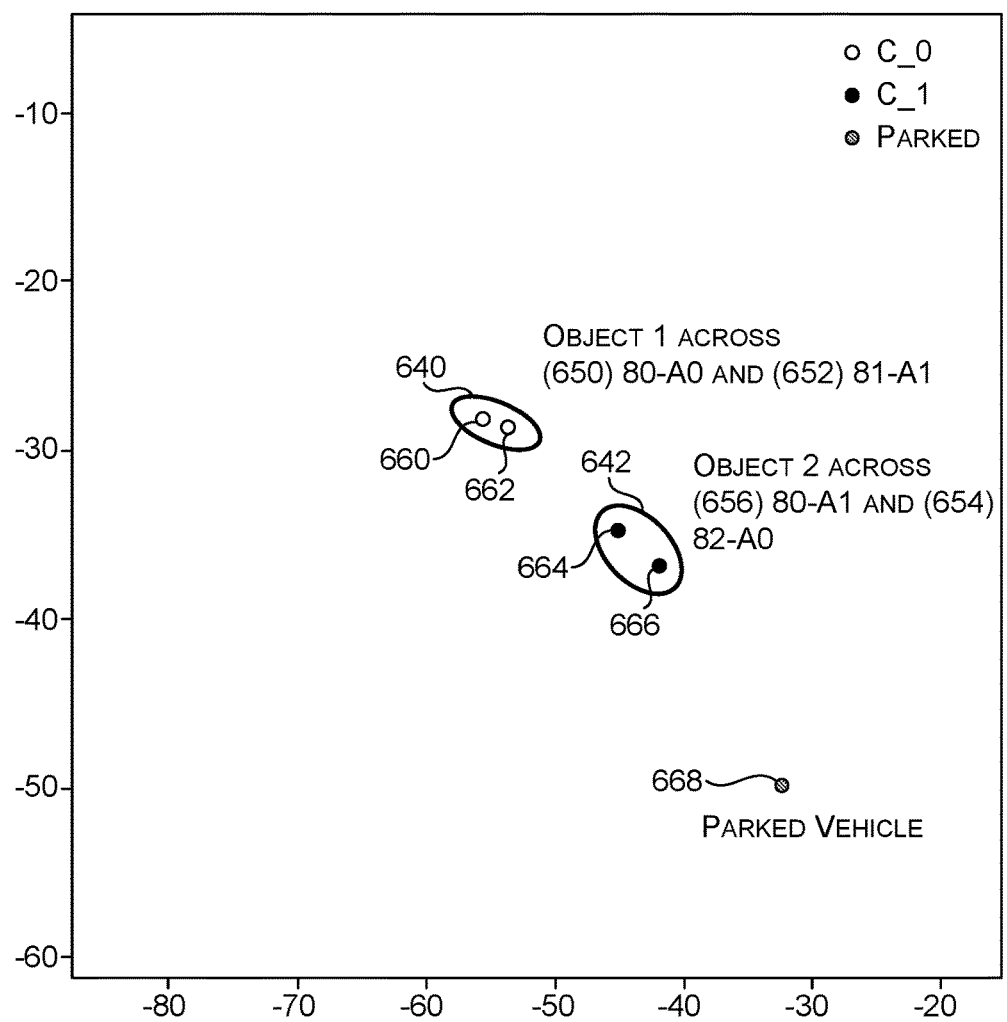

FIG. 6B illustrates a graph of examples of locations of detected objects which may be grouped into common objects, in accordance with some embodiments of the present disclosure. FIG. 6B shows location coordinates 660, 662, 664, 666, and 668, which may be generated by the smart area monitoring system 100 for a given time, or period of time. The location coordinates 660 and 662 may correspond to a first object detected in different fields of view of different cameras. For example, the object may be located in an overlapping portion of regions 650 and 652 of the fields of view of the cameras. The location coordinates 664 and 666 may also correspond to a second object detected in different fields of view of different cameras. For example, the object may be located in an overlapping portion of regions 654 and 656 of the fields of view of the cameras. The location coordinates 668 may correspond to a third object, such as a parked vehicle which may be in a field of view of a camera (e.g., in an aisle or parking spot). Using approaches described herein, the inter-feed object tracker 138 may properly form a cluster 640 from the location coordinates 660 and 662 and a cluster 642 from the location coordinates 664 and 666, for example, by applying a clustering algorithm to the location coordinates 660, 662, 664, 666, and 668.

The clustering of location coordinates may use the information of different objects observed across different sensors to identify whether two objects in two different sensors are possibly the same object. In some approaches, this may be performed by spatial clustering of objects using clustering algorithms such as DBSCAN and Hierarchical clustering. The feature vector for each object may be corresponding (X, Y) location coordinates (e.g., global or real-world coordinates) in a 2D space. However, such an approach may not consider the sensor information during clustering, which might lead to false clustering. For example, if two objects are detected in a single camera and are nearby in space, the algorithm may cluster the objects as a single object. In other examples, a sensor-aware object clustering algorithm may be used that clusters intra-period (or time) records from possibly different cameras.

The clustering algorithm may, for example, receive as inputs for a given time or period of time various information for each object (e.g., in the form of tuples). The inputs may include, for example, an object identifier id_i for object i, such as the local object identifier. The inputs may also include the location coordinates, such as where (x_i, y_i) may refer to the X, and Y location coordinates of the object i. The inputs may also include a sensor identifier(s) of the sensor(s) that detected the object, which may be represented as s_i for the object i. The inputs may further include overlap data indicating which sensors may detect the same object. This may be in the form of an "Overlap matrix" (OL), where OV(s_i, s_j)=1 of the sensors s_i and s_j may detect a same object; else it is set to 0. Using the overlap data may helps in eliminating spurious matching of two different objects as one.

In some examples, the clustering algorithms also uses a distance matrix "d" as an input where d[i, j] describes the physical distance (e.g., in meters) between the objects. The distance matrix d may be refined based at least in part on sensor overlap data.

A distance function defined by the distance matrix may not be a mathematical metric, but may violate the triangular inequality. This may make the distance matrix unsuitable for standard clustering algorithms. In these cases, a hierarchical clustering algorithm may be used with "complete clustering" to account for the non-metric nature of the distance matrix. In doing so, the tree or dendrogram generated by the algorithm may be cut at a threshold to get clusters of objects.

The threshold may be set by using information about the typical speeds (the parameter can be learned or can be input from an expert) and the period of time at which the clustering is performed. As a specific and non-limiting example, the threshold may be set to 10 meters.

In various examples, if the two objects are detected in sensors which do not overlap (e.g., according to the overlap data), the clustering algorithm may not cluster the objects into the same cluster, or may have a reduced chance of including them in the same cluster. For example, in examples where a distance matrix is used, the distance between two objects may be set to infinity (or a large number) if the two objects are detected in sensors which do not overlap (e.g., OV(s_i, s_j)=0).

Also in various examples, if two objects are detected in the same sensor and have the same object identifier, the clustering algorithm may always cluster the objects into the same cluster, or may have an increased chance of including them in the same cluster. For example, if two objects are detected by the same sensor and have the same object identifier, then the distance may be set to be zero in the distance matrix (in examples where a distance matrix is used).

Other examples of attributes that may be input into the clustering algorithm for an object or otherwise used for clustering include any of the various attributes that may be determined by the object attribute determiner 118, such as make, model, color, license plate number, object type (e.g., person, vehicle, etc.), bounding box shape, visual identifiers or attributes, etc. In some cases, a MLM(s), such as a neural network may be used to cluster or otherwise group location coordinates of objects (e.g., to determine location coordinates and/or trajectories correspond to the same object). The MLM may take as an input any of the various clustering inputs described herein. Further the MLM may output a score representative of a likelihood input location coordinates correspond to a same object. As another example, the MLM may output values used for the distance matrix.

After clustering, each cluster is likely to correspond to the same object. For each cluster, the attributes of the objects may be transferred (e.g., assigned the same identifier, such as a global object identifier). The cluster may be associated with a trajectory that may have been generated using clusters from any number of previous times or time periods. As the location coordinates may be different, they may be smoothed in the trajectory, such as by using an online Kalman filter. Also, the direction of movement may be computed.

Figure 7:
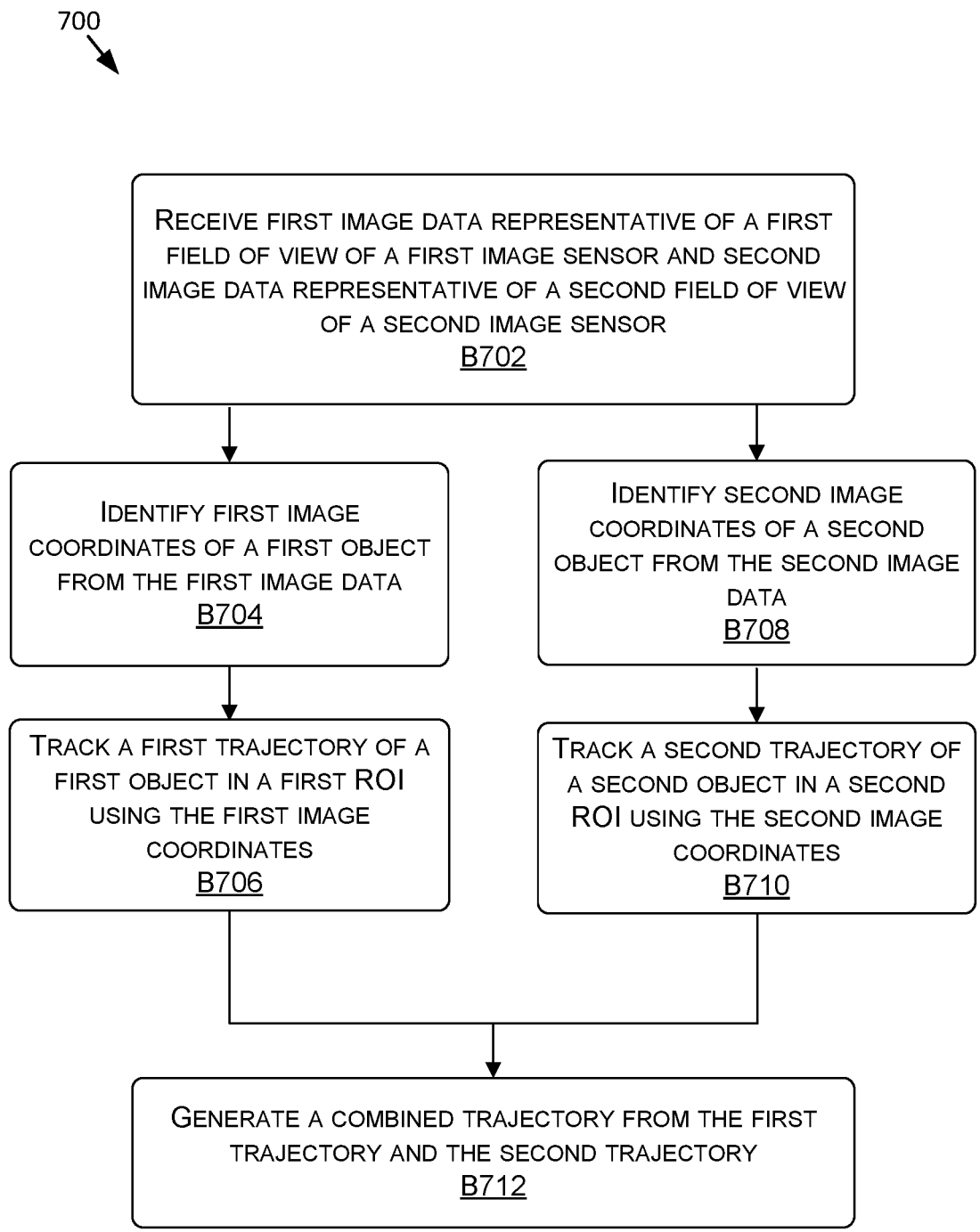
FIG. 7 is a flow diagram showing a method for combing trajectories for an object, in accordance with some embodiments of the present disclosure.

FIG. 7 is a flow diagram showing a method for combing trajectories for an object, in accordance with some embodiments of the present disclosure.

The method 700, at block B702, includes receiving first image data representative of a first field of view of a first image sensor and second image data representative of a second field of view of a second image sensor. For example, the sensor data processor 112 of the perception system 102 may receive image data representative of a field of view of the camera 234. The sensor data processor 112 of the perception system 102 may also receive image data representative of a field of view of the camera 232. In some examples, it may be different instances of the sensor data processor 112 that receives the first image data and the second image data, such as in the data processing pipeline 170. This may also be true for other components mentioned in describing the method 700, but for simplicity, only a single component may be referenced.

The method 700, at block B704, includes identifying first image coordinates of a first object from the first image data.

For example, the object detector 114 may identify image coordinates of a first object (e.g., of a bounding box) from the first image data based at least in part on detecting the first object in the aisle region 216B of the field of view of the camera 234.

The method 700, at block B706, includes tracking a first trajectory of a first object in a first ROI using the first image coordinates. For example, the intra-feed object tracker 120 may track, based at least in part on the first image coordinates, a first trajectory of a first object in the aisle region 216B. The first trajectory may, for example, correspond to the trajectory 630 of FIG. 6A.

The method 700, at block B708, includes identifying second image coordinates of a second object from the second image data. For example, the object detector 114 may identify image coordinates of a second object (e.g., of a bounding box) from the second image data based at least in part on detecting the second object in the aisle region 216A of the field of view of the camera 232.

The method 700, at block B710, includes tracking a second trajectory of a second object in a second ROI using the second image coordinates. For example, the intra-feed object tracker 120 may track, based at least in part on the second image coordinates, a second trajectory of a second object in the aisle region 216A. The second trajectory may, for example, correspond to the trajectory 628 of FIG. 6A.

As indicated in FIG. 7, the blocks B704 and B706 may optionally be performed at least partially in parallel with the blocks B708 and B710, such as where they are processed as separate streams (e.g., in different instances of the data processing pipeline 170).

The method 700, at block B712, includes generating a combined trajectory from the first trajectory and the second trajectory. For example, the inter-feed object tracker 138 of the semantic analysis system 104 may generate a combined trajectory from the first trajectory and the second trajectory (e.g., the trajectory 628 and the trajectory 630). This may be based at least in part on determining the first object and the second object are the same object. Any suitable approach may be used, such as clustering location coordinates of trajectory points (e.g., using the method 800 of FIG. 8). Further, in various examples, this may be performed, at least partially, as the first trajectory and the second trajectory are being generated and/or after the first trajectory and the second trajectory are generated. Additionally, the combined trajectory may in some cases replace, at least partially, a previous trajectory generated from the first trajectory and the second trajectory (e.g., during or after those trajectories and generated and/or updated). The state manager 146 may record the trajectory as state data.

Figure 8:
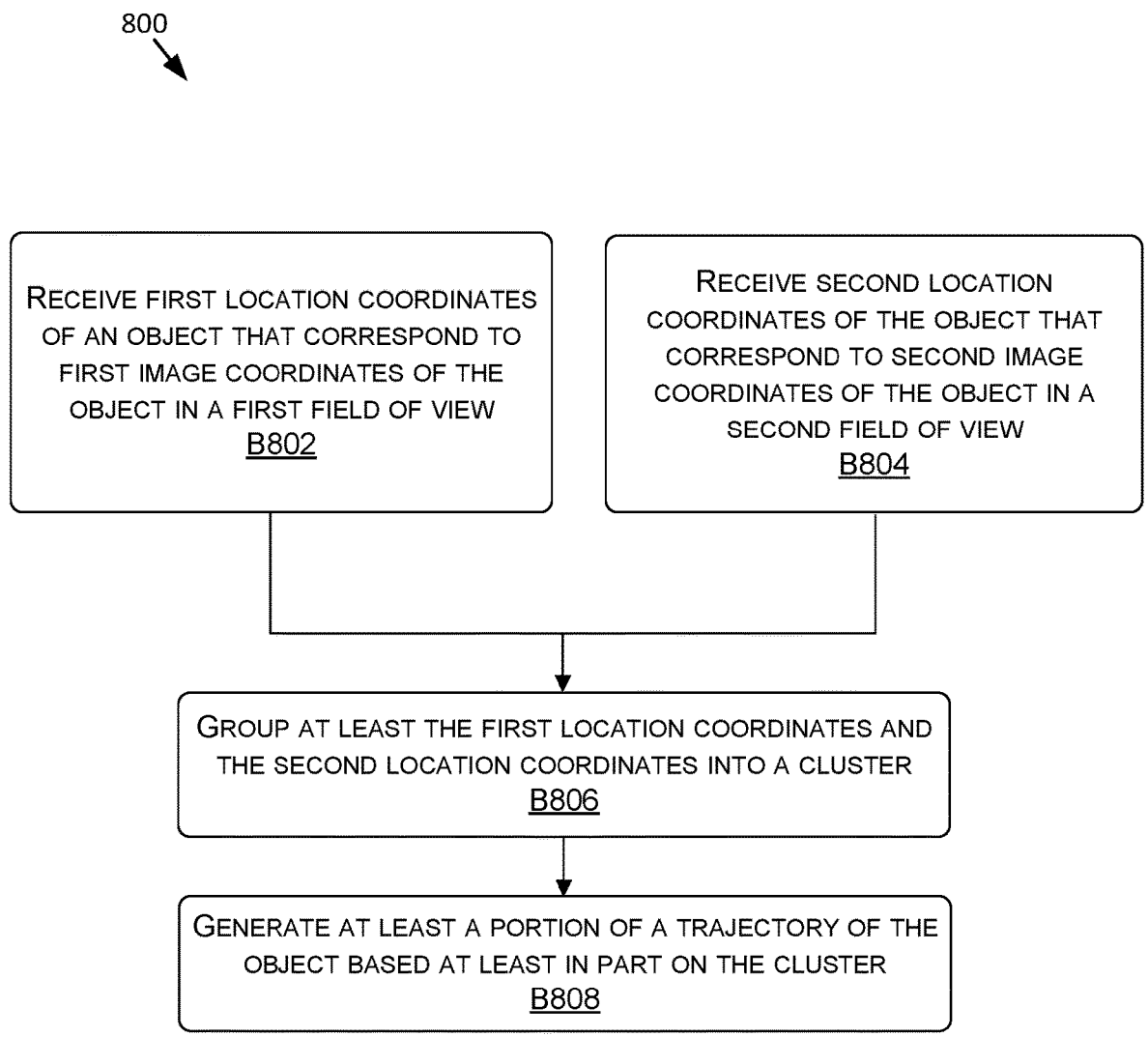
FIG. 8 is a flow diagram showing a method for grouping locations of objects from different sensors to form a trajectory, in accordance with some embodiments of the present disclosure.

FIG. 8 is a flow diagram showing a method for grouping locations of objects from different sensors to form a trajectory, in accordance with some embodiments of the present disclosure.

The method 800, at block B802, includes receiving first location coordinates of an object that correspond to first image coordinates of the object in a first field of view. For example, the inter-feed object tracker 138 of the semantic analysis system 104 may receive first global coordinates (e.g., generated by the global location determiner 122) of an object in a monitored area that correspond to first image coordinates of the object as depicted in a first field of view of the camera 234.

The method 800, at block B804, includes receiving second location coordinates of the object that correspond to second image coordinates of the object in a second field of view. For example, the inter-feed object tracker 138 of the semantic analysis system 104 may receive second global coordinates (e.g., generated by the global location determiner 122) of the object in the monitored area that correspond to second image coordinates of the object as depicted in a second field of view of the camera 232.

As indicated in FIG. 8, the blocks B802 and B804 may optionally be performed at least partially in parallel, such as where they are processed as separate streams (e.g., received from different instances of the data processing pipeline 170).

The method 800, at block B806, includes grouping at least the first location coordinates and the second location coordinates into a cluster. For example, the inter-feed object tracker 138 may group at least the first global coordinates and the second global coordinates into a cluster based at least in part on evaluating attributes associated with the first global coordinates and the second global coordinates. As an example, the cluster may be the cluster 640 and the first and second global coordinates may be the location coordinates 660 and 632.

The method 800, at block B808, includes generating at least a portion of a trajectory of the object based at least in part on the cluster. For example, the inter-feed object tracker 138 may generate at least a portion of a trajectory of the object based at least in part on the cluster using any suitable approach, such as those described herein.

Examples of Per-Period Aggregation

In various examples, each sensor may provide for object detections at a very high frequency. For example, a camera might detect objects at 30 frames per second (when object detection is integrated into the camera). However, the smart area monitoring system 100 may use a lower granularity of tracking such as to reduce computational requirements and/or network bandwidth. Such down-sampling may also be used where the end use-case does not need object tracking at such a fine-time level of granularity. In some approaches, the sensing rate (e.g., of object detections) may be adjusted such that it matches application rate. This may not be feasible in some cases, such as where the sensors are serving multiple applications that may require different levels of granularity. Also, there may be errors in object detection, which may be overcome by intelligent algorithms before down-sampling.

The present disclosure provides, in part, approaches for streaming intelligent down-sampling while preserving the ability for applications to specify a sampling rate (e.g., 2 samples per second), and the algorithm may aggregate (e.g., cluster or group) the object detections observed across each time period (e.g., 0.5 seconds). Each stream, or feed, from each sensor (e.g., per-sensor stream) may maintain a window corresponding to the period of time (e.g., 0.5 seconds). In each period, objects with the same identifier may be aggregated. Based on the time-series of location coordinates, an appropriate coordinate may be chosen to be transmitted to the next stage. In one simple approach, the latest location coordinate of the object may be transmitted to the next stage. However, there may be noise in object detections. For example, a vehicle's bounding box may be larger due to false detection of boundaries. Hence, the location coordinates of the trajectory of the object (e.g., the combined trajectory) may be smoothed out (e.g., using a Kalman filter) and the most recent smoothed location coordinates may be sent on to the next stage. Thus the down-sampling algorithm may, for example, be run at the edge of the smart area monitoring system 100 to avoid large information being sent across the network.

Examples of Inter-Time Object Matching

The present disclosure further provides approaches for identifying the objects observed by the perception system 102 in multiple time-periods. At times no sensor of an object tracking system may detect an object in an area due to coverage holes. For example, a particular region may not be covered by any of the cameras or other sensors, vehicles may be in a tunnel which may frustrate GPS-based trackers, etc. Disclosed approaches allow for the smart area monitoring system 100 to handle transient object disappearances.

In various examples, multiple objects may be observed at each time-period, or time. Using disclosed approach, the inter-feed object tracker 138 may be capable of matching each object (e.g., cluster and/or location coordinates) in one time-period to the most appropriate object in the next time-period such as to form a trajectory for the object or to otherwise associate different clusters or location coordinates with the same object.

Greedy schemes for matching an object with its nearest counterpart in the other time-period may not be suitable. In disclosed approaches, the detected objects may be represented in two time-periods (t−1 and t) as a bi-partite graph. An edge may be drawn between two objects based on the distance between the graph (the edge weight may be refined later). The algorithm "Hungarian assignment problem" may be used, which may match objects in each partition of the graph such that it minimizes the total weight of the matched edges. Mathematically, the following equation may be used for matching:

$$\text{Minimize}$$
$$\sum_{i \in A} \sum_{j \in T} C(i, j) x_{ij}$$

subject to the constraints $$\sum_{j \in T} x_{ij} = 1 \text{ for } i \in A,$$

$$\sum_{j \in A} x_{ij} = 1 \text{ for } i \in T,$$

$$x_{ij} \geq 0 \text{ for } i, j \in A, T.$$

where $C(i,j)$ is the cost matrix which defines the edge weight between two objects i and j, and $x\_\{ij\}$ is the matching variable. If $x\_\{ij\}=1$ then the objects i and j may be matched.

The cost matrix may be computed as follows by initializing the cost matrix to the distance between the two objects (distance matrix). Some sensors may provide the same object identifiers to the objects across a few time-periods. For example, the intra-feed object tracker 120 (e.g., of a camera device) may assign the same object identifier to an object as long as the object is detected in consecutive video frames. To match such identified objects, the $C(i,j)$ may be set to zero if objects i and j are detected by the same camera and have same identifiers. Based at least in part on the speed of movement (e.g., inferred through learning or input by experts), infeasible matchings may be eliminated. The distance threshold may be set to a pre-determined distance, such as 10 meters, such that if the distance between two objects is greater than 10 m, the distance may be set to infinite. Transient object disappearances may also be handled. If an object is not matched in one time-period, such objects may be "carried over" to the next matching period.

Figure 6C:
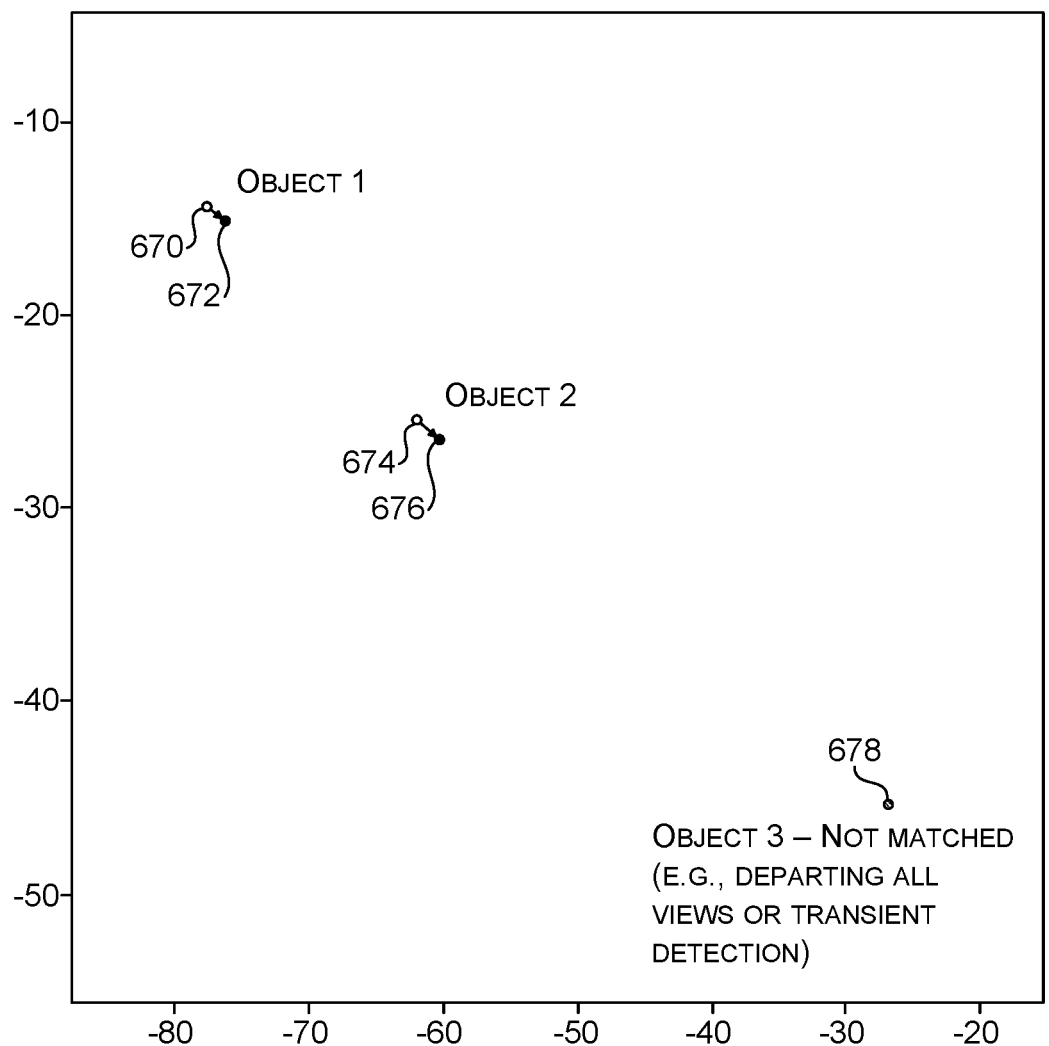
FIG. 6C illustrates a graph of examples of inter-time object matching, in accordance with some embodiments of the present disclosure.

FIG. 6C illustrates a graph of examples of inter-time object matching, in accordance with some embodiments of the present disclosure. FIG. 6C may illustrate inter-time matching of objects. Points 670 and 672 (e.g., location coordinates and/or clusters) may correspond to objects at time-period (t−1). Points 672 and 676 may correspond to the objects at time-period t. The matching may be represented by the arrows. Note that there may be objects that are not matched to any object, such as the object corresponding to point 678.

Examples of Visualizations

The perception system 102 may monitor each ROI (e.g., parking space, aisle, section of a road, etc.) to determine object behavior—for example, if a vehicle is parked in that spot or not using pre-defined regions of interest the event detector 148 may record this as an event and/or the anomaly detector 140 may trigger an anomaly. In monitoring the objects, image coordinates of detected object may be translated to world coordinates corresponding to unique addresses for each parking spot or other ROI. The cameras may all be connected to a wired or wireless IP network. The result of analysis performed by the semantic analysis system 104 may be available at a main server(s) (e.g., a server executing the semantic analysis system 104), and may be communicated using WiFi or other wireless technologies to a software application (e.g., Mobile App) available to the public.

A driver in the vicinity of the parking structure or other monitored area may use the application on a device, such as the vehicle, a mobile phone, or other user device, to send a query to the server, which may be processed by the query engine 144. Queries may in some examples be performed remotely as well. The query may, for example, ask how many parking spaces are currently available. The application may also query the location or "address" of the nearest spot. The server may reply to this query by providing the number of available spots. The server may also provide a listing of available spot locations, and/or the floor and space address of the nearest empty spot or the spots on a particular floor, section of a structure, or other area. In some examples a search analytics web application may be used as a means to communicate with the user device.

FIG. 1A shows an example occupancy dashboard 180, which may be generated by the visualization generator 152 and presented by the presentation manager 154 in response to the query. The count can be given for the entire garage, or per each floor, or sections of a given floor. A map of the structure or of each floor may be included in the application to communicate the locations of the open spots using flashing green dots or other indicators. The metrics may be updated on the occupancy dashboard 180 as events are detected in the area 200. Further occupancy may be provided by spot type (e.g., reserved, handicapped, general use, motorcycles, electric vehicles, hydrogen vehicles, designated vehicles, natural gas vehicles, visitors, employees, etc.).

Figure 9A:
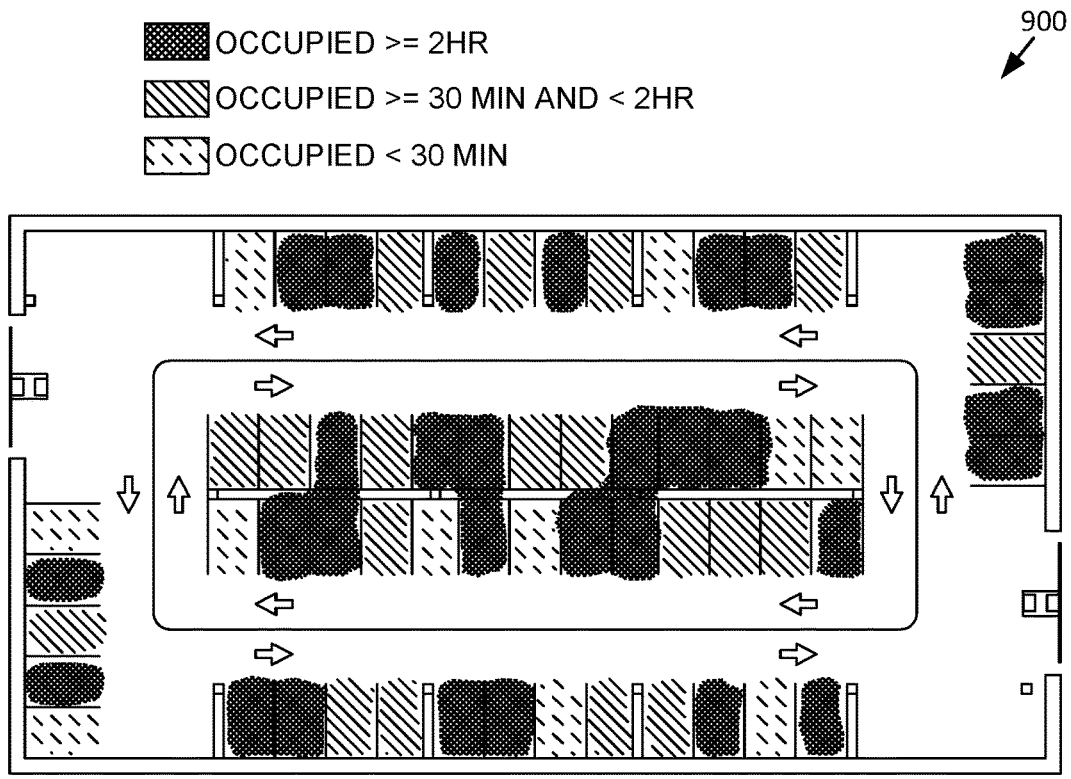
FIG. 9A illustrates an example of an occupancy heat map visualization that may be generated using a smart area monitoring system, in accordance with some embodiments of the present disclosure.
Figure 9B:
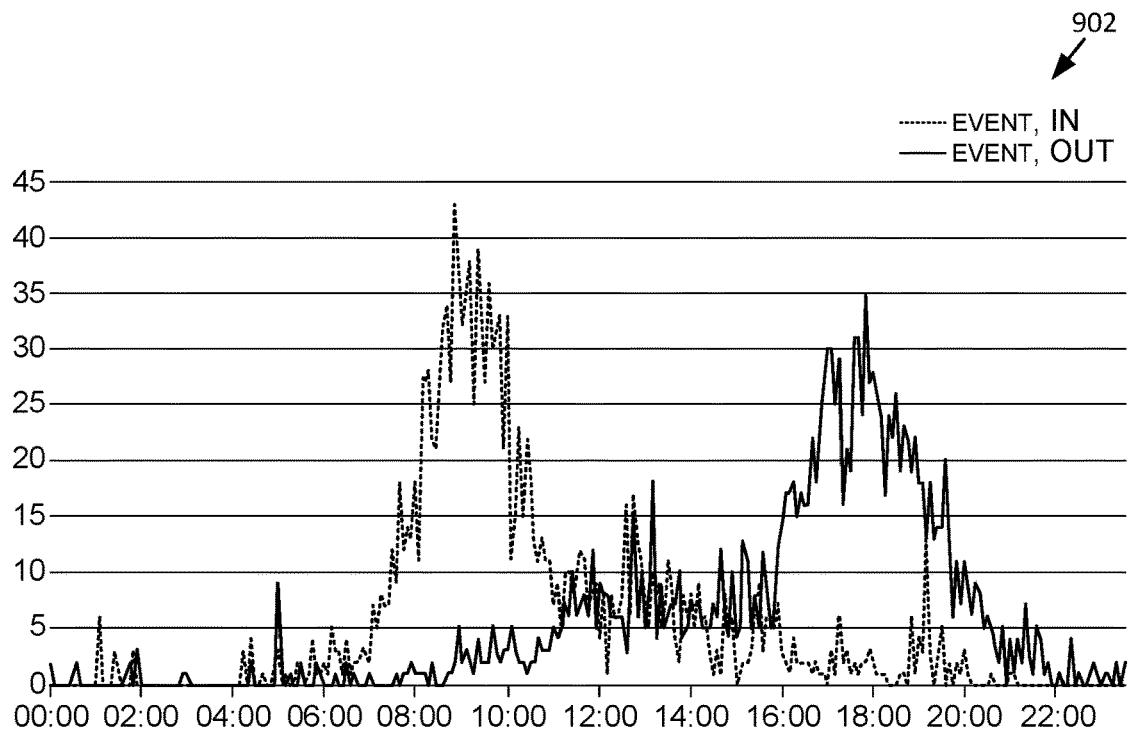
FIG. 9B illustrates an example of a traffic graph visualization that may be generated using a smart area monitoring system, in accordance with some embodiments of the present disclosure.

In further examples, and as illustrated in FIG. 9A, a heat map 900 of the occupied spots may be generated by the visualization generator 152 and presented by the presentation manager 154, such as to assist in easy communication of areas with several open spots. Heat maps could be for current time, or over the past several minutes or hours, which may be specified in the query. FIG. 9B illustrates a further example of a traffic graph visualization 902 that may be generated using the smart area monitoring system 100, in accordance with some embodiments of the present disclosure.

Another application of the monitored data may be to report parking information to vehicle owners or operators who need assistance in relocating their vehicle. When a parking structure is sufficiently large or nondescript, vehicle drivers or owners may have difficulty remembering where the vehicle was parked. Other applications may arise when the person looking for the car (e.g., a friend, law enforcement officer, etc.) was not the person who parked the vehicle and the vehicle owner is not available or does not remember the information.

The smart area monitoring system 100 may provide a process for monitoring and tracking parking information for individual vehicles. When a vehicle enters the garage, a camera (e.g., LPR camera) may read the plate, and the other (360-degree) camera may extract features from the top view of the vehicle. As the vehicle moves through the aisles of the garage, successive cameras may extract similar features to track the vehicle. When the vehicle is parked at a parking spot, the system may assign its license plate to its location. This information may reside in a server (e.g., of the semantic analysis system 104). Using the application, such as on the user's mobile phone, the user may request this information from the server via a query.

Figure 10A:
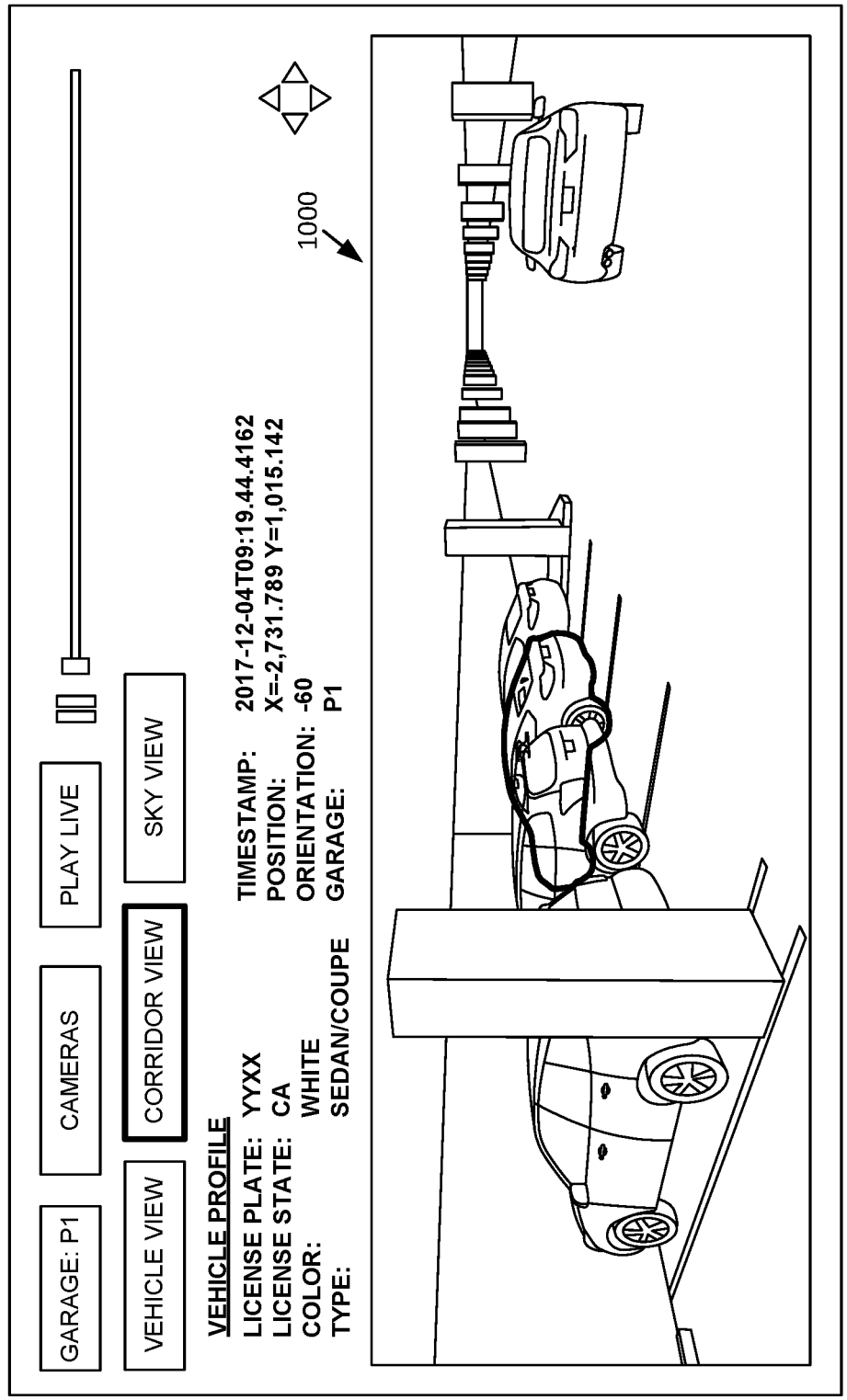
FIG. 10A illustrates an example of a corridor view visualization that may be generated using a smart area monitoring system, in accordance with some embodiments of the present disclosure.

The server may provide the information in any number of formats, including (without limitation), the floor and number of the parking spot, the location on a map of the structure or floor, and/or can include live visual shots of a corridor view, such as a corridor view 1000 of FIG. 10A. The corridor view 1000 may be presented live and in real-time and may be used to help users navigate a path to their vehicle. Various approaches described herein allow for information of an area to be collected and processed in real time, with as much granularity as desired by users both in time (last few seconds, last few minutes, last few 10-minute blocks) and in space (individual parking spots, sections, floors, or entire garage, or indeed multiple garages in the same shopping center, or in the city) to provide real time visualizations, or forensic, past time visualizations.

Figure 10B:
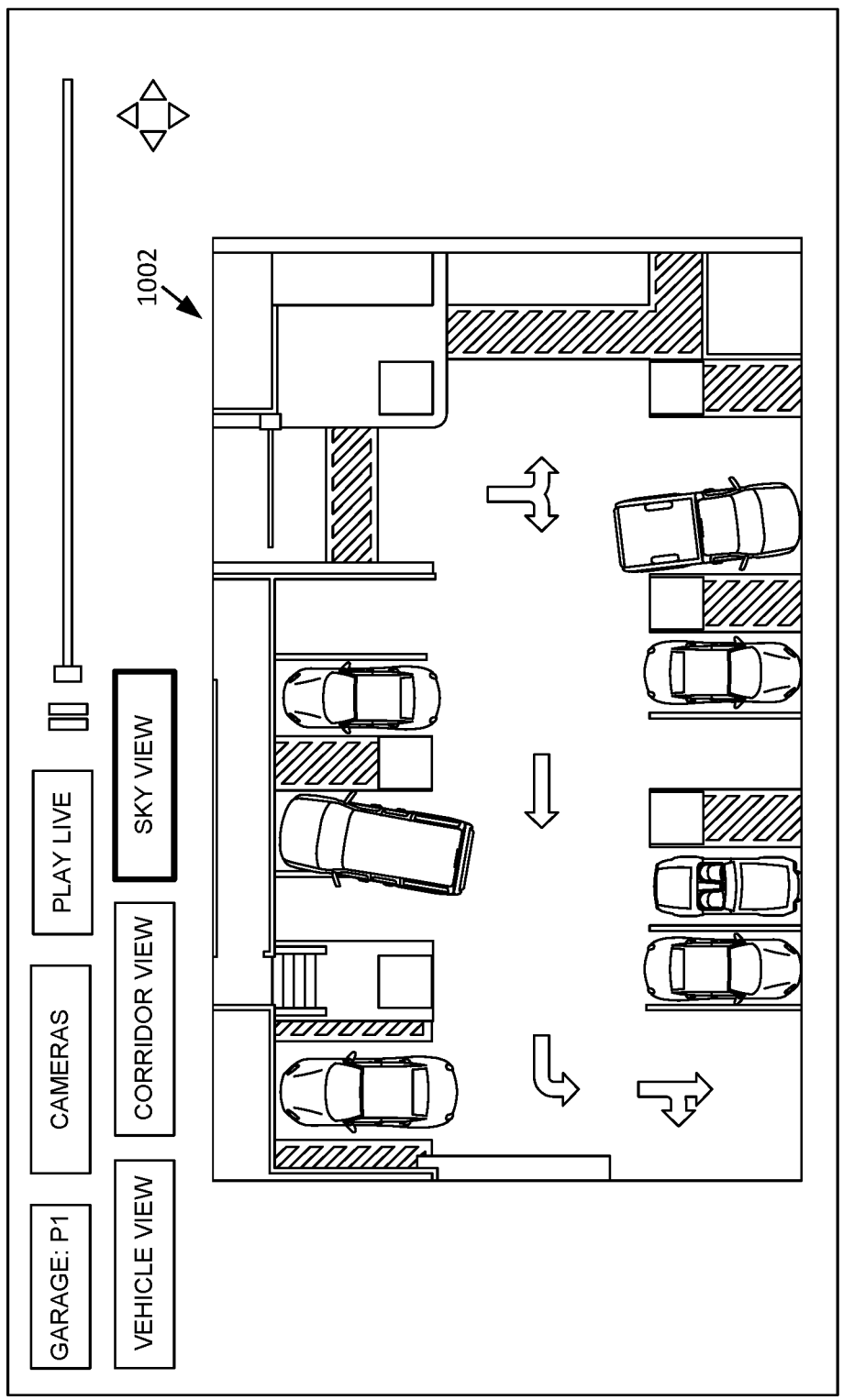
FIG. 10B illustrates an example of a sky view visualization that may be generated using a smart area monitoring system, in accordance with some embodiments of the present disclosure.
Figure 10C:
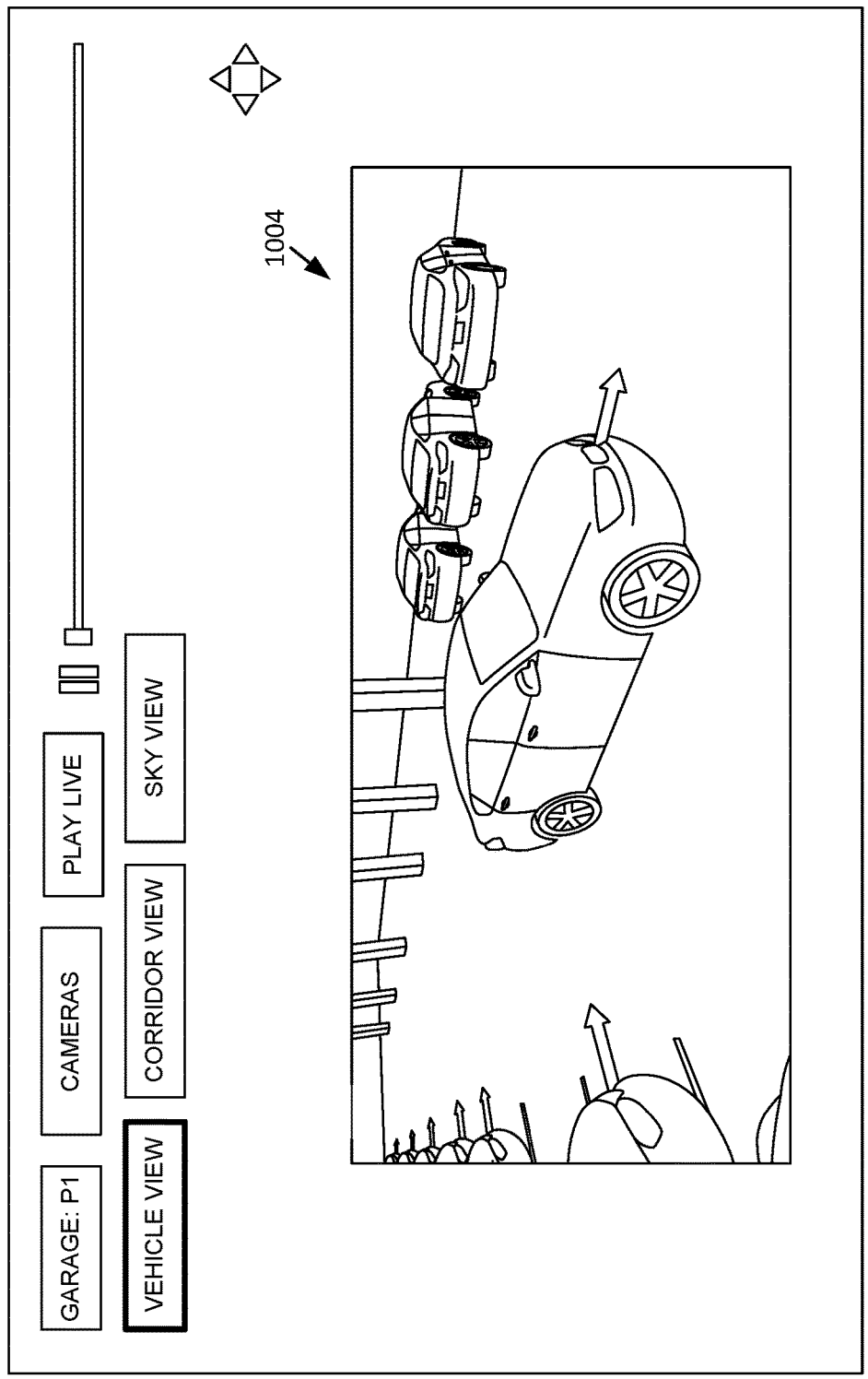
FIG. 10C illustrates an example of a vehicle view visualization that may be generated using a smart area monitoring system, in accordance with some embodiments of the present disclosure.
Figure 10D:
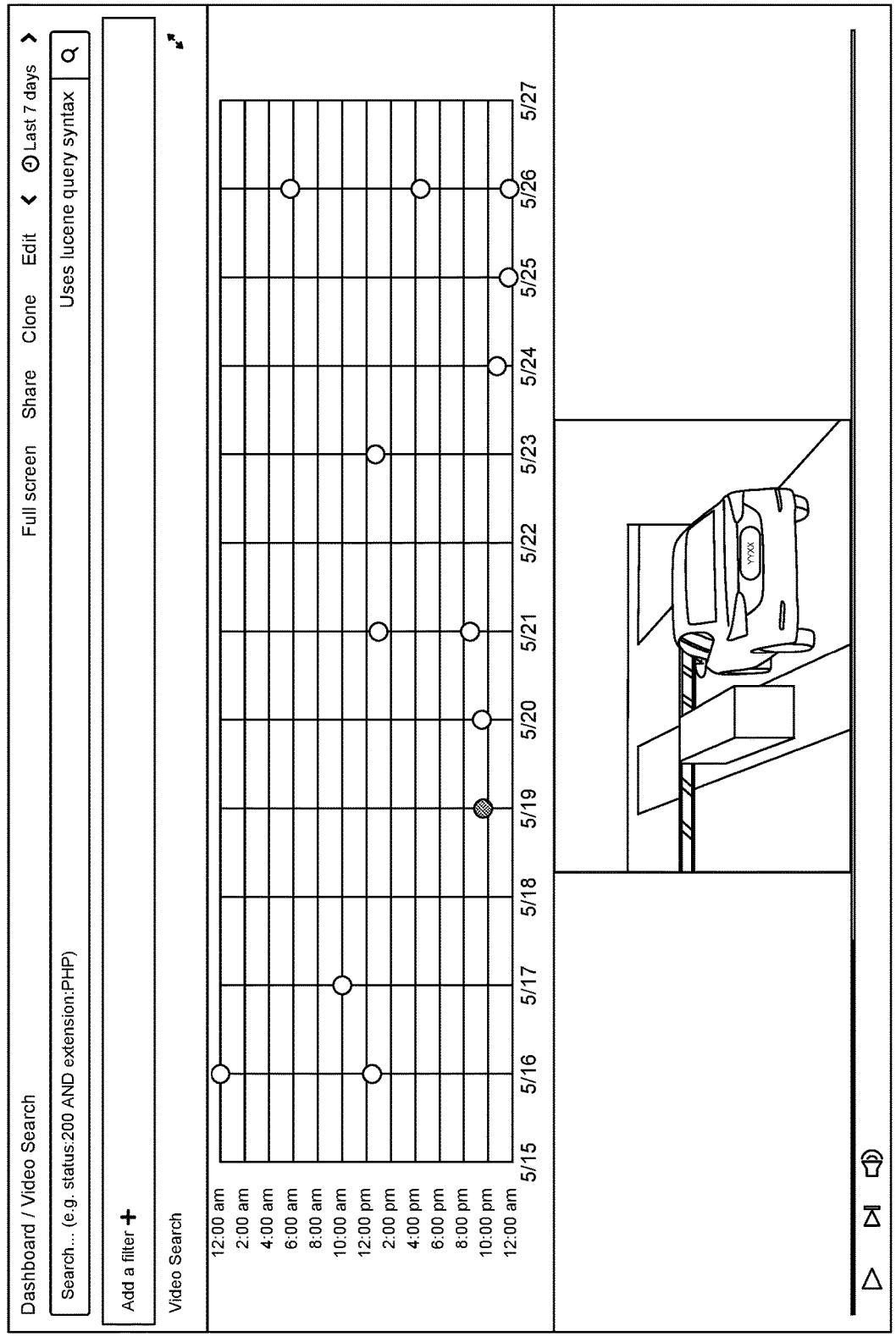
FIG. 10D illustrates an example of a search and playback interface that may be generated using a smart area monitoring system, in accordance with some embodiments of the present disclosure.

Data from the perception system 102 and the semantic analysis system 104 may be rendered by the visualization generator 152 as 3D interactive visualizations. The user of the application may choose to view real-time and/or custom time-frame data feeds that support multiple views for each level or other section of an area or areas that are monitored. These may include, as examples, the corridor view 1000 of FIG. 10A, a sky view (birds-eye view) 1002 of FIG. 10B, and/or a vehicle view 1004 of FIG. 10C. A camera view of one or more particular cameras may also be provided, which may or may not be a 3D rendering. Any of the various views may be completely or partially rendered by the visualization generator 152 (e.g., in 3D). Further, video searching capability may be offered through a user interface (e.g., graphical interface executing on a mobile client device), such as the user interface 1006 of FIG. 10D.

The corridor view 1000 may show the view from the corridor. It may show the vehicles and the corridors. The user may select a level, a time interval (or start time), or a position to stand, and may rotate in all angles. The sky view 1002 may show the view from the top. Objects such as the vehicles, walls, pillars, etc. may be shown but without a roof. The user may select a garage level or time interval (or start time). The vehicle view 1004 may provide the view from 360-degrees from a vehicle (e.g., user selected). A camera view may show the view from a camera. It may show the vehicles and corridors as seen from a camera perspective. The user may select a level, a camera, or a time interval (or start time).

Each of the views may be presented as 3D renderings, rather than real images or video. By consolidating multiple sensors and cameras into one view, the presented visualization allows an observer to quickly make sense of what is happening in the scene instead of watching multiple videos from different cameras (some of which may be in a difficult-to-interpret fisheye format). User interactivity may also be increased as users may switch between different views, rotate, etc. This enables users to interact richly with the environment to observe details, which may not occur when viewing real video footage.

Also, user privacy may be preserved, as the rendering is within the control of the software. For example, privacy concerns may be eliminated by not rendering privacy revealing aspects of the scene (e.g., faces, license plates, car interiors, etc.). For example, conventional approaches to monitoring areas uses real video footage of a monitored area and cannot be directly applied in scenarios where privacy concerns arise. Videos often depict rich features such as people's identity, the clothes they are wearing, and the license-plate of a vehicle. In some scenarios, such personally identifiable information should not be exposed to other users (or a vast majority of the surveillance monitoring personnel). These problems may be avoided using disclosed approaches that generate 3D renderings of a monitored area.

The visualization generator 152 may use fused data from the various sensors to render each object and/or the monitored area as desired. Privacy may be preserved for certain users based on the access-control policies. The visualization generator 152 may also fetch other meta information regarding the monitored area (e.g., CAD designs of buildings, maps and city buildings, and camera locations and parameters) from other data sources to enrich the visualization experience.

In some examples, the visualization generator 152 renders the specific model of the objects (e.g., make and model of the vehicle as stated) in the location provided by the metadata. The license Plate may be displayed on the vehicle (e.g., when viewable). The views presented may allow for playback of a garage-state from a given time t. Movement may be rendered smoothly (using interpolation or other approaches). Two snapshots of the state data may be provided to the visualization generator 152 per second as the metadata, however, any suitable frequency may be used. Vehicle movement may be presented as smooth (e.g., vehicle speed, wheels turning, etc.). Vehicles may be rendered with artificially tinted windows so that person inside is not seen. Vehicle and metadata about the vehicle may be presented with the views, such as make, model, color, licenseState, licensePlate, CarType, moving or not, garage level, position, orientation, camera identifier, camera level, camera location (x, y, z), etc. A CarType may be, for example, an SUV, a van, a coupe, a sedan, a motorcycle, *Vespa*, or a bicycle, etc.

Examples of Anomaly Detection

The anomaly detector 140 may detect non-temporal anomalies. Non-temporal anomalies may include parking by unauthorized vehicles, such as (without limitation): an employee in a visitor's reserved location, or for a vehicle parking in a reserved spot (say for charity winner, or for handicapped, or other reasons). Other anomalies include a vehicle parked in such a way as to take up two spots, or parked in a no-parking zone, or even abandoned on a drive way, or blocking other vehicles, etc. etc. Anomalies may be defined, for examples, by (programmed) rules, and a collection of such rules may also be applied using other rules. For example, the same set of rules may apply for every day of the week, apply only during week days, apply during certain hours say from 8:00 am to 5:00 pm, or the configuration of the parking spot may change from hour to hour depending on demand. For example, the number of spots reserved for visitors may increase during days when a big event such as a conference is planned. All of these can be either programmed automatically ahead of time, or they may be configurable through a user interface available to various departments, for example to the marketing or sales department, or facilities such as during periods of construction or repair in some parts of the garage. Changes to designated parking spots may be performed by the smart area monitoring system 100 automatically and/or by sending signals to electronic signage in the area 200 that indicates the designation for the parking spot(s).

Given a set of rules defining what is permitted and what is not allowed, the smart area monitoring system 100 may apply these rules to every parking spot that is being monitored, or with additional specificity, such as to every aisle (e.g., to enforce lane direction), certain regions, or even certain parking spots. The anomaly detector 140 may generate alerts and take actions such as send an email or text to an offending employee or other user.

In some examples, the anomaly detector 140 may learn both the rules as well as the actions to take for anomalies using deep learning models. Data accumulated by the semantic analysis system 103 over time within a monitored area and among multiple monitored areas may be used a dataset to train neural networks, which may monitor the information (e.g., state data) to learn to recognize anomalous behavior. This learning may be based on the pattern of normal use. As the smart area monitoring system 100 may continually collect data about the vehicles and users of the garage, this data may be used to evaluate a pre-defined cost function. Such a cost function may balance the importance of one set of rules against another set of rules and allocate the limited amount of resources accordingly.

In various example, the anomaly detector 140 may detect temporal anomalies using a multi-sensor aggregation approach implemented with camera based sensors and the perception system 102. The camera sensors may generate a video stream that may be used by the perception system 102 to detect multiple objects and by the event detector 148 of the semantic analysis system 104 to generate metadata for each and every event that occurs within a garage or building. An example event metadata is shown below.

```
▽ {}
    "messageid" : "e1daeab1-dcfd-4760-a33b-1d59d63906ab"
    "mdsversion" : "1.0"
    "@timestamp" : "2018-01-05T04:51:43.463Z"
    "used" : 20
    ▽ "place" : {}
        "id" : "1"
        "name" : "endeavor"
        "type" : "building/garage"
        ▶ "location" ; {}
        ▶ "aisle" : {}
    ▶ "sensor" : {}
    ▶ "analyticsModule" : {}
    ▽ "object" : {}
        "id" : "532"
        ▽ "vehicle" : {}
            "type" : "SUV/Van"
            "make" : "Toyota"
            "model" : "RAV4"
            "color" : "white"
            "confidence" : 0.8919384908874824
            "license" : "LZ7VZI"
            "licenseState" : "CA"
        ▶ "bbox" : {}
        ▶ "signature" : [3]
            "speed" : 0.0
            "direction" : 0.0
            "orientation" : 0.0
        ▶ "location" : {}
        ▽ "coordinate" : {}
            "x" : -76.6289231845166
            "y" : -14.19546919136043
            "z" : 3.0
    ▶ "event" : {}
        "videoPath" : "http://metrovideodey/play.html?videoPath\u003d./videos/cam_80_capture-20'
```

As a vehicle/object moves through a monitored area, various events with respect to the vehicle may be generated, such as vehicle entry, vehicle exit, vehicle parked, vehicle moving in aisle etc. Each instance of event metadata may contains detailed information about the time of the event, the location of the event, other information pertaining to the area and object.

For example, for camera-based sensors, a vehicle path may be traced as: (t1,x1,y1,z1), (t2,x2,y2,z2), (t3,x3, y3,z3), . . . where t=a timestamp, (x, y, z) are the global coordinates of the location of the vehicle/object at time t. The vehicle path may then be featurized as: (dt, dx, dy, dz)=difference of the consecutive time, x, y and z. Similarly, other sensor relevant attributes for the given vehicle/object may be append to the feature vector. Anomaly detection may be performed using an unsupervised machine learning algorithm.

Examples of Automatic Data Corruption Detection

Occasionally, the data generated by camera sensors may be subject to undesirable effects that compromise the quality of the data. These effects may be the result of a variety of factors during generation, compression, or transmission. Video data may be subject to real time streaming protocol (RTSP) corruption, in which portions of the image may be distorted and/or unusable for their intended purpose, which may produce bad information that can propagate through the system and create false alarms or fail to raise alarms. Aspects of the present disclosure provide a computer vision approach to detected if a frame is RTSP corrupted.

When an image is corrupted by missing packets, the resulting corrupted image may have certain characteristics. For example, each row of pixels in the lower third of the image may be a duplicate of each other. According to disclosed approaches, an image processing or computer vision method may be used to calculate the average difference between one or more regions of the image, and if the average difference is below a threshold "theta" then an RTSP error may be detected. A deep learning model using one or more neural networks may be used to learn the value of theta by examining a number of error-free and corrupted frames. In other examples, the entire analysis may be performed with a neural network—such as a multi-layer perceptron or a convolutional neural network—that may be trained to recognize patterns of good images from corrupted images using a 2-class classification. A combination of both computer vision and deep learning may be used in some examples, such as by using computer vision techniques when the degree of packet loss is small, leading to a more uniform corrupted image, and using deep learning techniques when there is a greater variety in the resulting image corruption.

Images generated by each camera device may be used as input, and processed using one or more of the methods described above. When a frame is determined to be corrupted, the system may output a flag or alert indicating that the frame is affected by incorrect or lost transmission of RTSP packets. The system may use this flag to discard the results from these corrupted frames. Additionally, a camera that repeatedly produces corrupted images may be identified, and may be reset or rebooted (e.g., using software), re-configured, or replaced. Automatically determining whether a frame is RTSP-corrupted has additional benefits like helping tune parameters (bit-rate, frame-rate) in bandwidth limited camera deployments.

Examples of Computing Devices

FIG. 11 is a block diagram of an example computing device 1100 suitable for use in implementing some embodiments of the present disclosure. Computing device 1100 may include a bus 1102 that directly or indirectly couples the following devices: memory 1104, one or more central processing units (CPUs) 1106, one or more graphics processing units (GPUs) 1108, a communication interface 1110, input/output (I/O) ports 1112, input/output components 1114, a power supply 1116, and one or more presentation components 1118 (e.g., display(s)).

Although the various blocks of FIG. 11 are shown as connected via the bus 1102 with lines, this is not intended to be limiting and is for clarity only. For example, in some embodiments, a presentation component 1118, such as a display device, may be considered an I/O component 1114 (e.g., if the display is a touch screen). As another example, the CPUs 1106 and/or GPUs 1108 may include memory (e.g., the memory 1104 may be representative of a storage device in addition to the memory of the GPUs 1108, the CPUs 1106, and/or other components). In other words, the computing device of FIG. 11 is merely illustrative. Distinction is not made between such categories as "workstation," "server," "laptop," "desktop," "tablet," "client device," "mobile device," "hand-held device," "game console," "electronic control unit (ECU)," "virtual reality system," and/or other device or system types, as all are contemplated within the scope of the computing device of FIG. 11.

The bus 1102 may represent one or more busses, such as an address bus, a data bus, a control bus, or a combination thereof. The bus 1102 may include one or more bus types, such as an industry standard architecture (ISA) bus, an extended industry standard architecture (EISA) bus, a video electronics standards association (VESA) bus, a peripheral component interconnect (PCI) bus, a peripheral component interconnect express (PCIe) bus, and/or another type of bus.

The memory 1104 may include any of a variety of computer-readable media. The computer-readable media may be any available media that may be accessed by the computing device 1100. The computer-readable media may include both volatile and nonvolatile media, and removable and non-removable media. By way of example, and not limitation, the computer-readable media may comprise computer-storage media and communication media.

The computer-storage media may include both volatile and nonvolatile media and/or removable and non-removable media implemented in any method or technology for storage of information such as computer-readable instructions, data structures, program modules, and/or other data types. For example, the memory 1104 may store computer-readable instructions (e.g., that represent a program(s) and/or a program element(s), such as an operating system. Computer-storage media may include, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which may be used to store the desired information and which may be accessed by computing device 1100. As used herein, computer storage media does not comprise signals per se.

The computer storage media may embody computer-readable instructions, data structures, program modules, and/or other data types in a modulated data signal such as a carrier wave or other transport mechanism and includes any information delivery media. The term "modulated data signal" may refer to a signal that has one or more of its characteristics set or changed in such a manner as to encode information in the signal. By way of example, and not limitation, the computer storage media may include wired media such as a wired network or direct-wired connection, and wireless media such as acoustic, RF, infrared and other wireless media. Combinations of any of the above should also be included within the scope of computer-readable media.

The CPU(s) 1106 may be configured to execute the computer-readable instructions to control one or more components of the computing device 1100 to perform one or more of the methods and/or processes described herein. The CPU(s) 1106 may each include one or more cores (e.g., one, two, four, eight, twenty-eight, seventy-two, etc.) that are capable of handling a multitude of software threads simultaneously. The CPU(s) 1106 may include any type of processor, and may include different types of processors depending on the type of computing device 1100 implemented (e.g., processors with fewer cores for mobile devices and processors with more cores for servers). For example, depending on the type of computing device 1100, the processor may be an Advanced RISC Machines (ARM) processor implemented using Reduced Instruction Set Computing (RISC) or an x86 processor implemented using Complex Instruction Set Computing (CISC). The computing device 1100 may include one or more CPUs 1106 in addition to one or more microprocessors or supplementary co-processors, such as math co-processors.

The GPU(s) 1108 may be used by the computing device 1100 to render graphics (e.g., 3D graphics). The GPU(s) 1108 may include hundreds or thousands of cores that are capable of handling hundreds or thousands of software threads simultaneously. The GPU(s) 1108 may generate pixel data for output images in response to rendering commands (e.g., rendering commands from the CPU(s) 1106 received via a host interface). The GPU(s) 1108 may include graphics memory, such as display memory, for storing pixel data. The display memory may be included as part of the memory 1104. The GPU(s) 1108 may include two or more GPUs operating in parallel (e.g., via a link). When combined together, each GPU 1108 may generate pixel data for different portions of an output image or for different output images (e.g., a first GPU for a first image and a second GPU for a second image). Each GPU may include its own memory, or may share memory with other GPUs.

The communication interface 1110 may include one or more receivers, transmitters, and/or transceivers that enable the computing device 1100 to communicate with other computing devices via an electronic communication network, included wired and/or wireless communications. The communication interface 1110 may include components and functionality to enable communication over any of a number of different networks, such as wireless networks (e.g., Wi-Fi, Z-Wave, Bluetooth, Bluetooth LE, ZigBee, etc.), wired networks (e.g., communicating over Ethernet), low-power wide-area networks (e.g., LoRaWAN, SigFox, etc.), and/or the Internet.

The I/O ports 1112 may enable the computing device 1100 to be logically coupled to other devices including the I/O components 1114, the presentation component(s) 1118, and/or other components, some of which may be built in to (e.g., integrated in) the computing device 1100. Illustrative I/O components 1114 include a microphone, mouse, keyboard, joystick, game pad, game controller, satellite dish, scanner, printer, wireless device, etc. The I/O components 1114 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of the computing device 1100. The computing device 1100 may be include depth cameras, such as stereoscopic camera systems, infrared camera systems, RGB camera systems, touchscreen technology, and combinations of these, for gesture detection and recognition. Additionally, the computing device 1100 may include accelerometers or gyroscopes (e.g., as part of an inertia measurement unit (IMU)) that enable detection of motion. In some examples, the output of the accelerometers or gyroscopes may be used by the computing device 1100 to render immersive augmented reality or virtual reality.

The power supply 1116 may include a hard-wired power supply, a battery power supply, or a combination thereof. The power supply 1116 may provide power to the computing device 1100 to enable the components of the computing device 1100 to operate.

The presentation component(s) 1118 may include a display (e.g., a monitor, a touch screen, a television screen, a heads-up-display (HUD), other display types, or a combination thereof), speakers, and/or other presentation components. The presentation component(s) 1118 may receive data from other components (e.g., the GPU(s) 1108, the CPU(s) 1106, etc.), and output the data (e.g., as an image, video, sound, etc.).

The disclosure may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

What is claimed is:

1. A method comprising:
   clustering, into one or more clusters, bounding shape information corresponding to one or more objects in first image data depicting one or more fields of view of at least one sensor, the clustering being based at least on similarities between two or more bounding shapes included in the bounding shape information;
   determining one or more values of one or more attributes of a region of interest (RoI) based at least on at least one cluster of the one or more clusters;
   assigning the RoI to a designated area in an environment based at least on a frequency of occupancy associated with the at least one cluster being above a threshold value:
   determining, using second image data, an object region that includes at least a portion of an object; and
   determining an occupancy status of the designated area based at least on comparing the object region to at least one value of the one or more values.

2. The method of claim 1, wherein the second image data is representative of the one or more fields of view of the at least one sensor.

3. The method of claim 1, wherein the bounding shape information comprises bounding shape coordinates, and determining of the one or more values of one or more attributes of the RoI includes statistically combining bounding shapes coordinates corresponding to the at least one cluster.

4. The method of claim 1, wherein the bounding shape information is determined using one or more machine learning models trained to infer bounding shapes of one or more of a front or a back of a vehicle.

5. The method of claim 1, wherein the bounding shape information is determined based at least on determining a space corresponding to at least one bounding shape has been occupied for at least a threshold duration of time.

6. The method of claim 1, wherein the clustering is performed using a clustering algorithm to generate a predetermined quantity of clusters corresponding to a predetermined quantity of RoIs in the one or more fields of view.

7. The method of claim 1, wherein the one or more values of one or more attributes define an RoI indicator line and the comparing includes determining a first length of an intersection between the RoI indicator line and the object region, wherein the occupancy status corresponds to a ratio between the first length of the intersection and a second length of the object region.

8. The method of claim 1, wherein the assigning the RoI to the designated area is further based at least on a distance between at least one bounding shape of the at least one cluster and the designated area.

9. The method of claim 1, wherein the assigning the RoI to the designated area is based at least on the at least one cluster corresponding to greater than a threshold number of object observations.

10. A system comprising:
one or more processing units to execute operations comprising:
detecting, using first image data representative of one or more fields of view of at least one sensor over a period of time, locations of one or more objects in the one or more fields of view;
grouping the locations into one or more groups based at least on proximities of the locations;
determining, using second image data, an object region that includes at least a portion of an object; and
determining a status associated with a group of the one or more groups based at least on determining the group corresponds to at least threshold quantity of object detections that correspond to the locations and based at least on comparing the object region to one or more values of one or more attributes associated with the group.

11. The system of claim 10, wherein the status indicates an anomaly in the one or more attributes for the object region.

12. The system of claim 10, wherein the one or more attributes indicate one or more of:
an object size associated with a region of interest (RoI);
an object orientation associated with the RoI;
an object location associated with the RoI;
a duration of occupancy associated with the RoI; or
a frequency of occupancy associated with the RoI.

13. The system of claim 10, wherein the status indicates one or more of:
a large vehicle is in a compact spot;
a vehicle is parked between two spots; or
a vehicle is exceeding a time limit for a spot; or
a vehicle is parked in a reserved spot.

14. The system of claim 10, the one or more values of the one or more attributes include a statistical combination of a set of locations corresponding to the group.

15. The system of claim 10, wherein the detecting of the locations uses one or more machine learning models trained to detect one or more of a front or a back of a vehicle.

16. A processor comprising:
one or more circuits to group object detections that correspond to a period of time and are associated with one or more fields of view into one or more groups,
determine an object region that includes at least a portion of an object in the one or more fields of view, and
determine a status associated with a group of the one or more groups based at least on determining the group includes at least threshold quantity of the object detections and based at least on comparing the object region to one or more values of one or more attributes associated with the group.

17. The processor of claim 16, wherein the one or more values of the one or more attributes include a statistical combination of values of the one or more attributes associated with a set of the object detections corresponding to the group.

18. The processor of claim 16, wherein the one or more circuits are further to generate the object detections using one or more machine learning models trained to detect one or more of a front or a back of a vehicle.

19. The processor of claim 16, wherein an object detection is included in the object detections based at least on determining a space corresponding to the object detection has been occupied for at least a threshold duration of time.

20. The processor of claim 16, wherein the status is associated with a designated area in an environment, the designated area assigned to the group based at least on a frequency of occupancy associated with the group being above a threshold value.

* * * * *